US011866962B2

(12) United States Patent
Valdes Rudd

(10) Patent No.: US 11,866,962 B2
(45) Date of Patent: Jan. 9, 2024

(54) SECURITY LOCKING ASSEMBLY FOR SHIPPING CONTAINER DOORS

(71) Applicant: Arturo Valdes Rudd, Miami, FL (US)

(72) Inventor: Arturo Valdes Rudd, Miami, FL (US)

( * ) Notice: Subject to any disclaimer, the term of this patent is extended or adjusted under 35 U.S.C. 154(b) by 401 days.

(21) Appl. No.: 17/322,684

(22) Filed: May 17, 2021

(65) Prior Publication Data

US 2021/0372171 A1 Dec. 2, 2021

Related U.S. Application Data

(63) Continuation-in-part of application No. 15/965,967, filed on Apr. 29, 2018, now Pat. No. 11,008,787.

(51) Int. Cl.

*E05B 83/02* (2014.01)
*E05B 47/00* (2006.01)
*E05B 65/00* (2006.01)

(52) U.S. Cl.

CPC .......... *E05B 83/02* (2013.01); *E05B 47/0002* (2013.01); *E05B 65/0003* (2013.01); *E05B 2047/0069* (2013.01)

(58) Field of Classification Search

CPC .......... E05B 83/00; E05B 83/02; E05B 83/04; E05B 83/06; E05B 47/00; E05B 47/0001–0005; E05B 2047/0069; E05B 65/00; E05B 65/0003; E05B 65/0017; E05B 65/462; E05B 77/46; E05C 7/00
USPC ........................................................... 70/91
See application file for complete search history.

(56) References Cited

U.S. PATENT DOCUMENTS 6,834,896 B2 * 12/2004 Smith ..................... E05C 19/18 292/259 R
7,278,663 B2 * 10/2007 Witchey ................ E05C 19/186 292/259 R
8,026,792 B2 * 9/2011 Powers ................... E05B 51/02 70/56
2005/0144991 A1 * 7/2005 Bravo ................... E05B 13/002 70/56
2012/0229251 A1 * 9/2012 Ufkes ..................... E05B 83/10 340/5.26
2014/0361551 A1 * 12/2014 Rickman ............... E05C 19/186 292/155

* cited by examiner

*Primary Examiner* — Nathan Cumar
(74) *Attorney, Agent, or Firm* — DANIEL S. POLLEY, P.A.

(57) ABSTRACT

A locking device for preferred securement to the locking bars located on the doors of shipping container. The device includes a main frame and two preferably J-shaped plates. The a hub portion along with a first plate define an first securement area for the locking device to a first locking bar and a movable member along with a second plate define a second securement area for the second locking bar. A lock having a main shaft is inserted into the main frame and prevents the plates from being pulled outward. The lock is maintain in positioned by a solenoid which is disposed within a portion of the main frame in a closed/locked position preventing the lock and main shaft from being pulled out of the main frame. Upon receipt of an authorized remote command or password the solenoid is caused to be retracted allowing the main shaft to be move and freeing the two plates so that they can be pulled outwards allowing the locking device to be removed from the locking bars.

12 Claims, 55 Drawing Sheets

Updated Embodient

FIGURE 5A
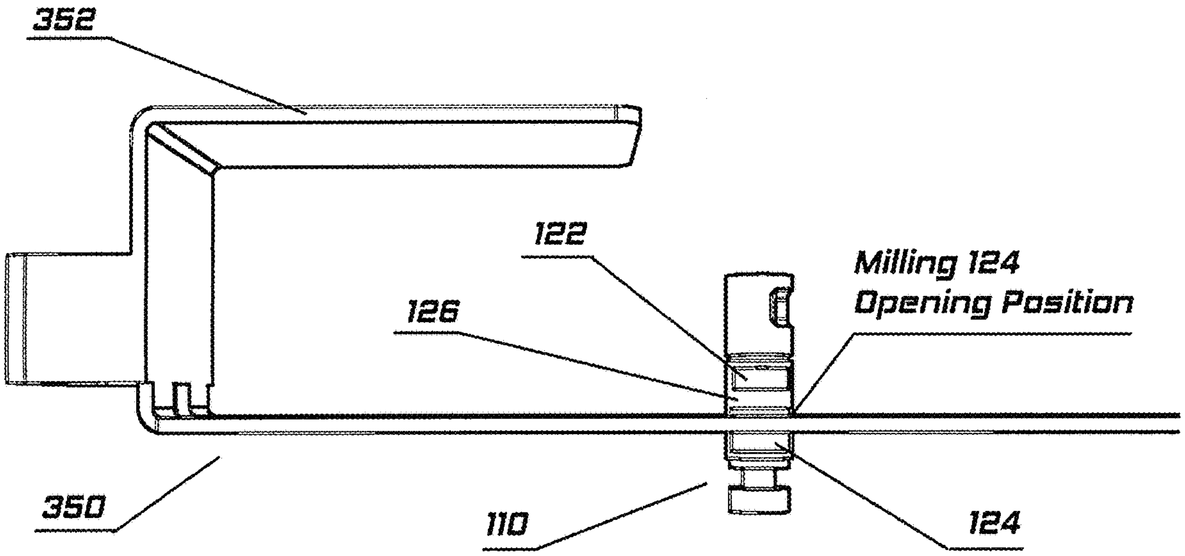
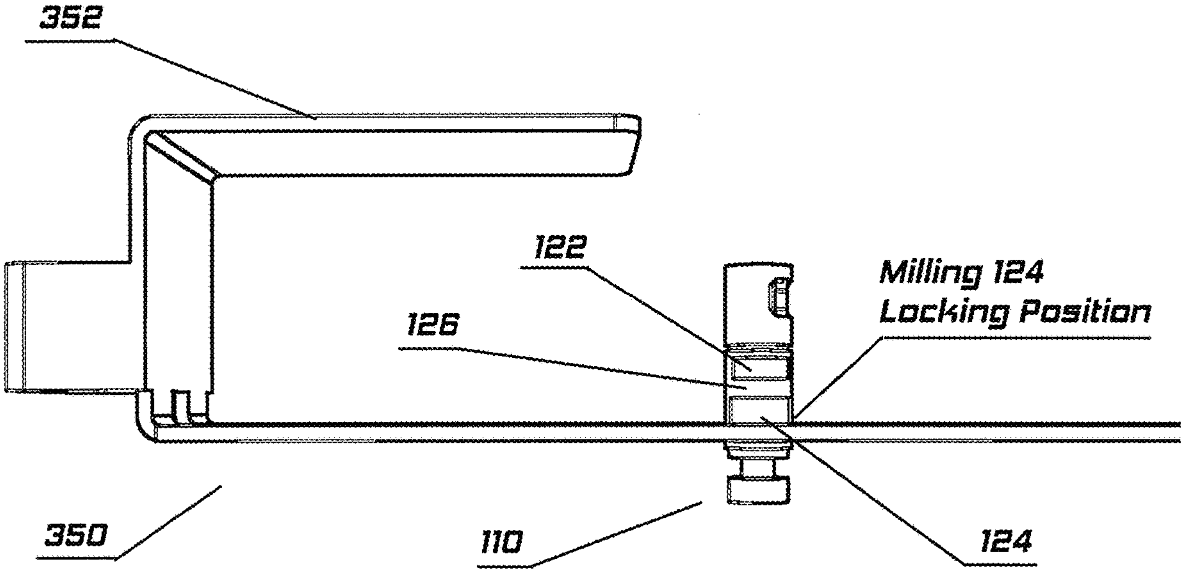
FIGURE 5B

FIGURE 6A
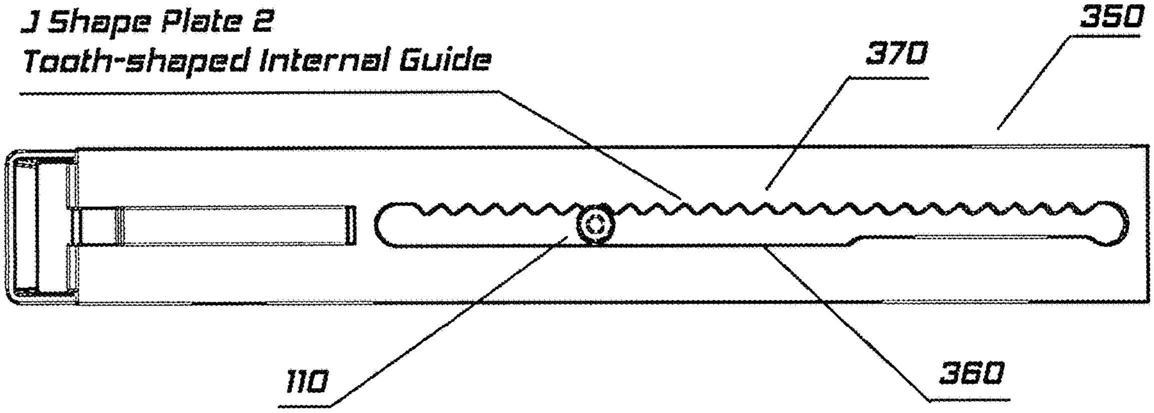
Main Shaft Cross-section
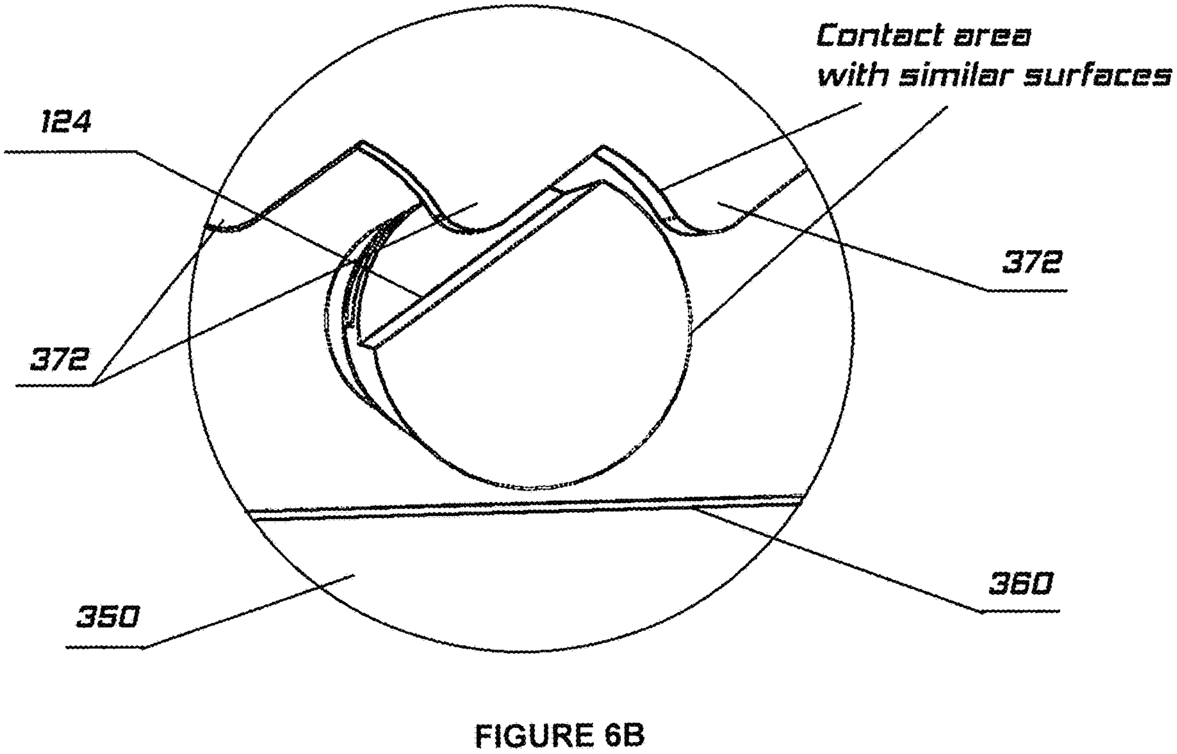
FIGURE 6B

FIGURE 9A
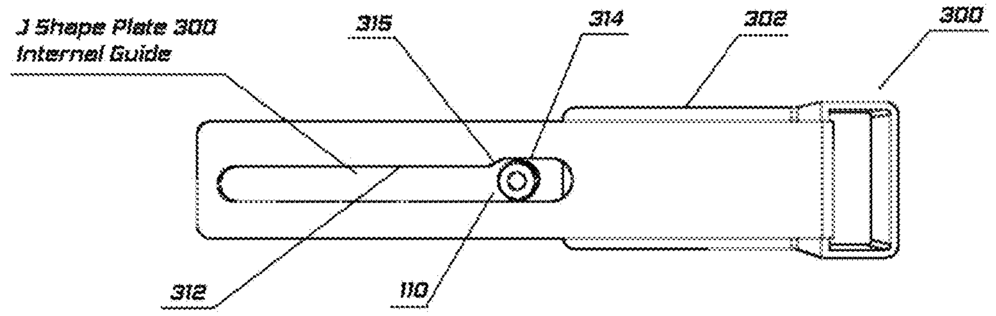
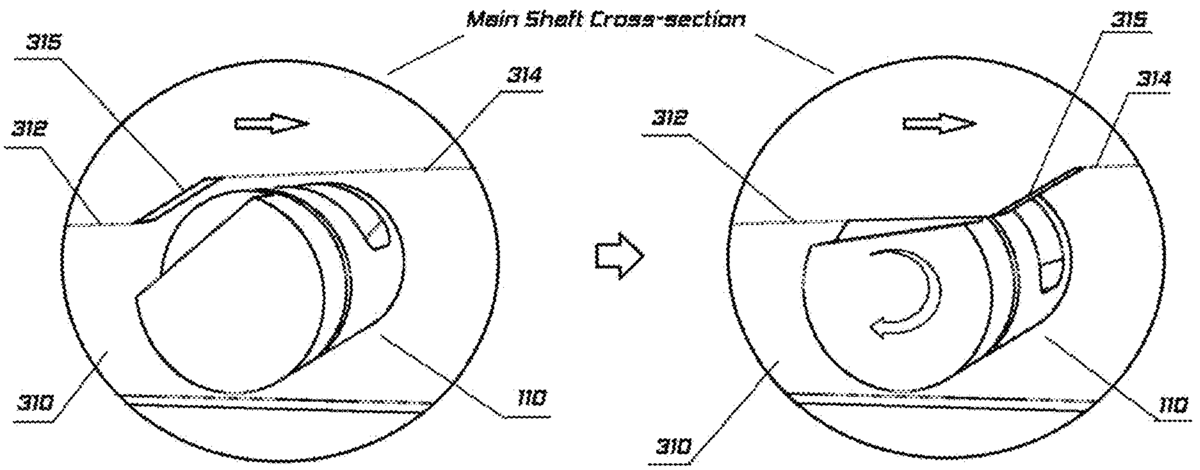
FIGURE 9B

FIGURE 11A
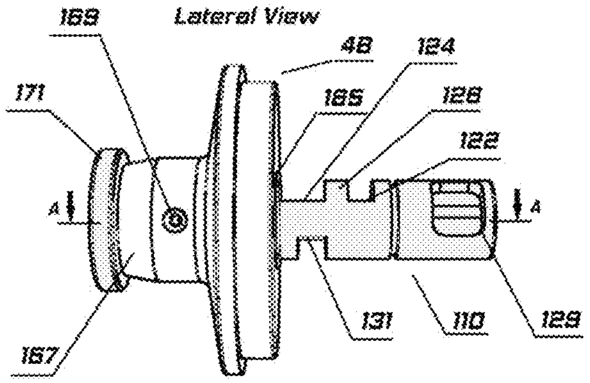
FIGURE 11B
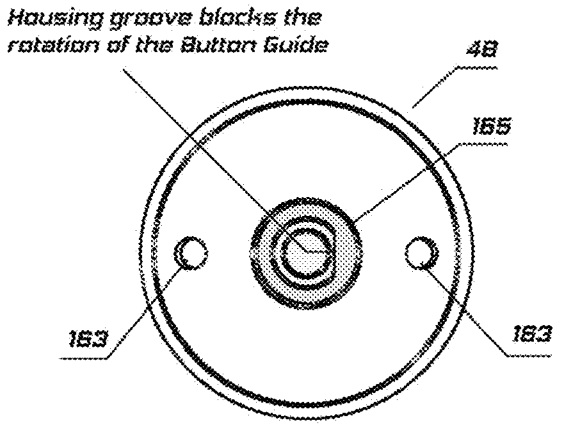
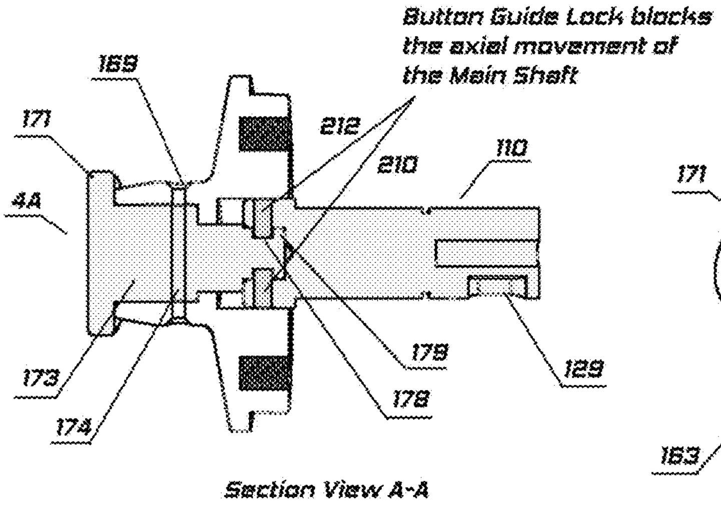
FIGURE 11C
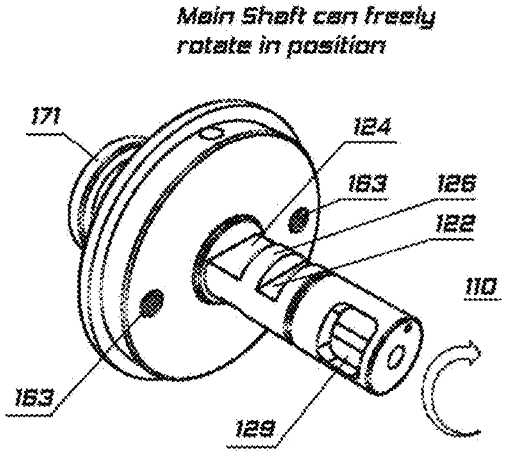
FIGURE 11D FIGURE 12A
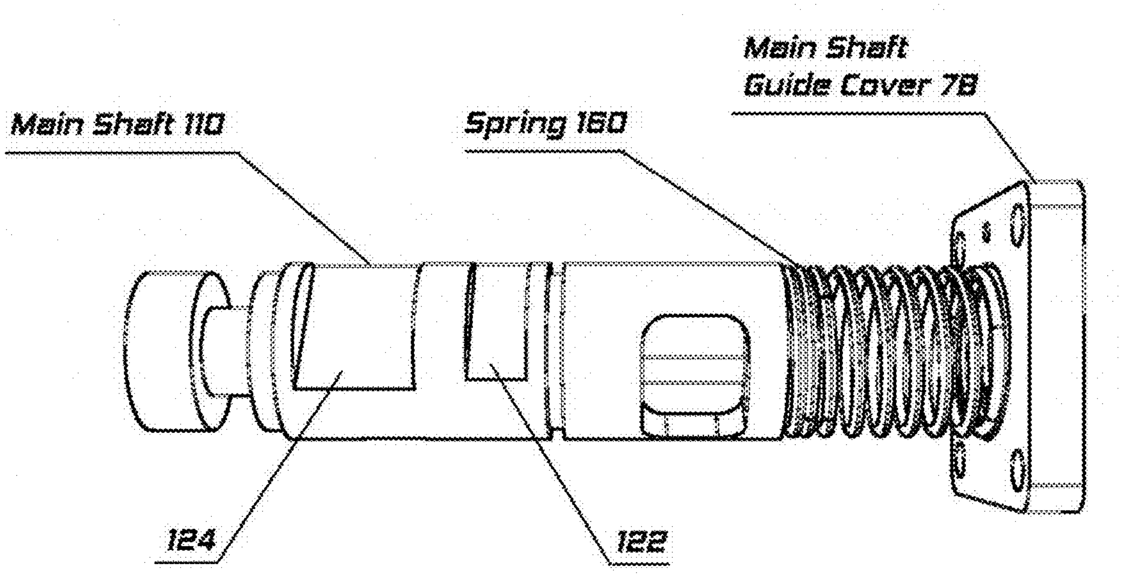
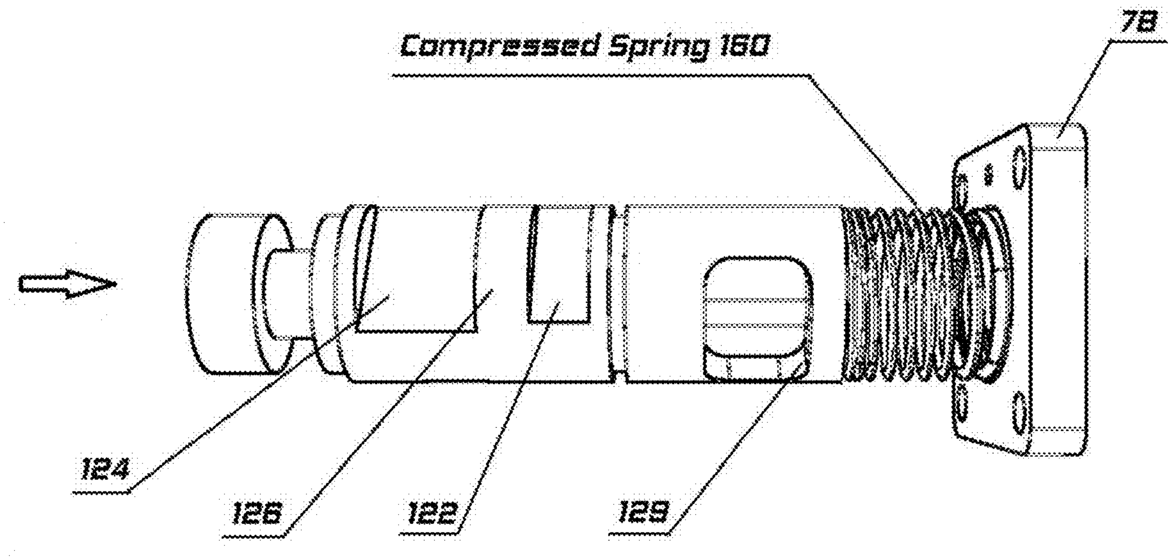
FIGURE 12B FIGURE 14A
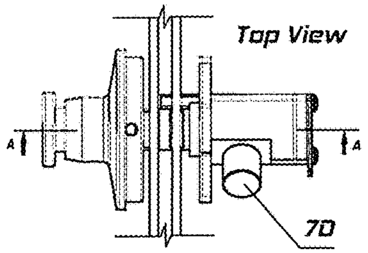
FIGURE 14B
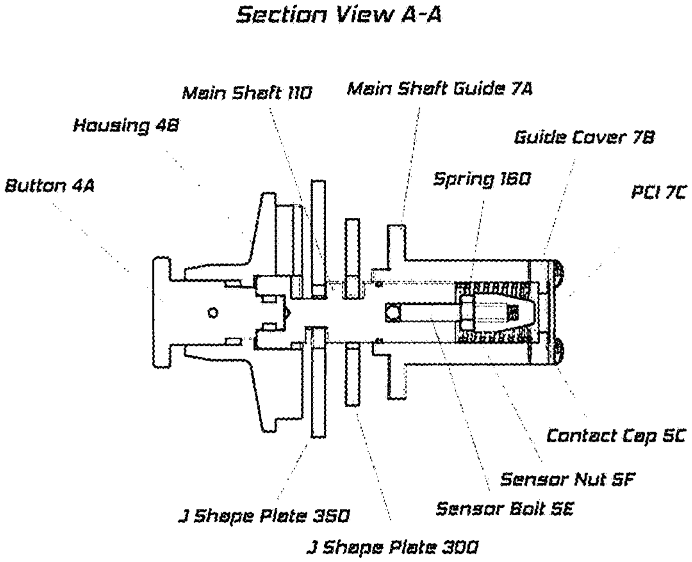
FIGURE 14C
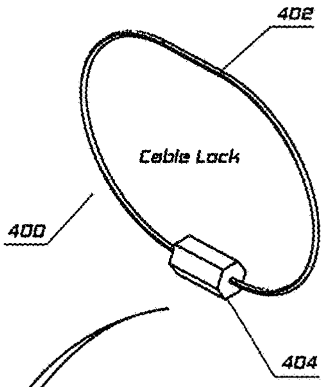
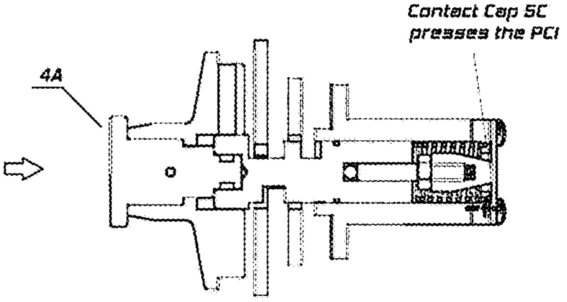
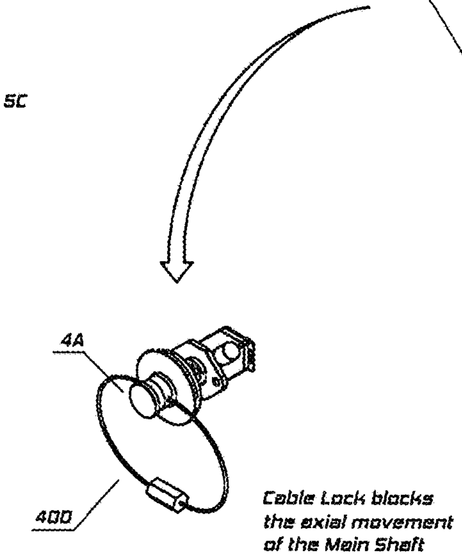
FIGURE 14D
FIGURE 14E FIGURE 15A
FIGURE 15B
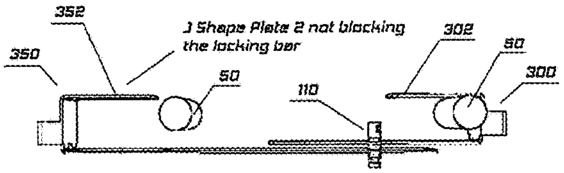
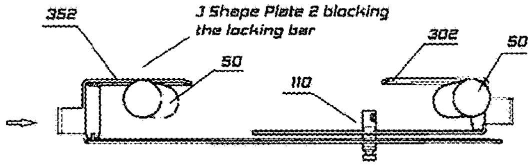
FIGURE 15D
FIGURE 15C
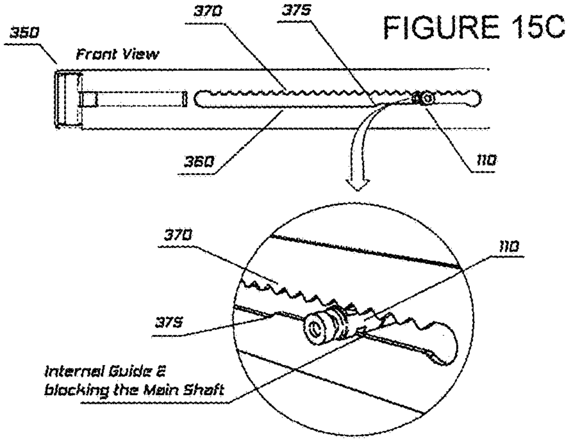
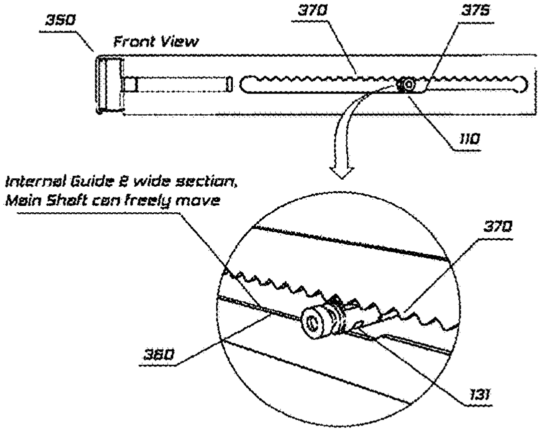
FIGURE 15E
FIGURE 15F FIGURE 16A
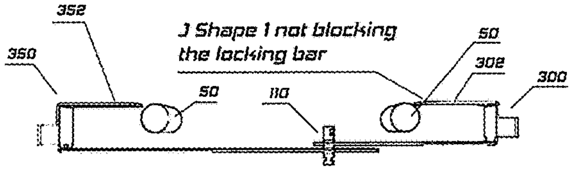
FIGURE 16B
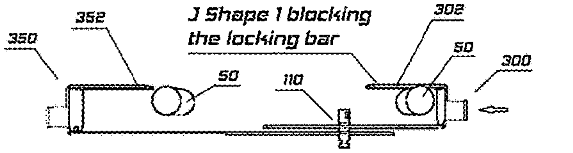
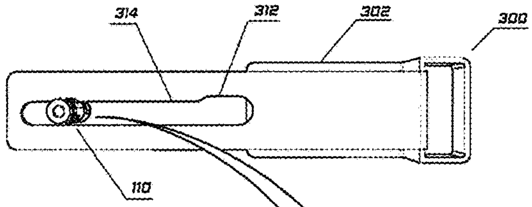
FIGURE 16C
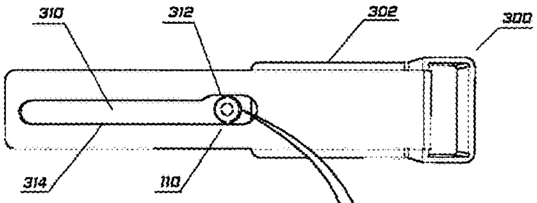
FIGURE 16D
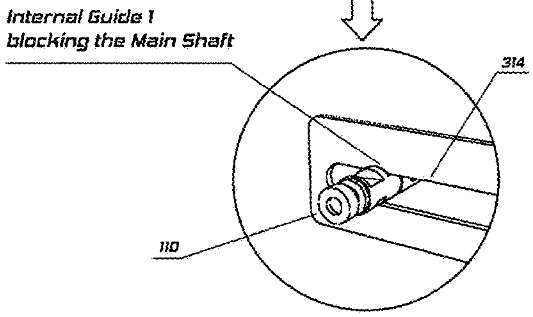
FIGURE 16E
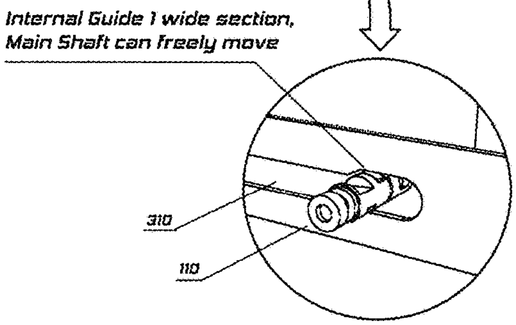
FIGURE 16F FIGURE 18A
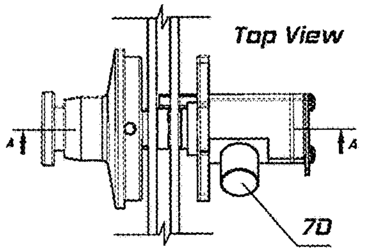
FIGURE 18B
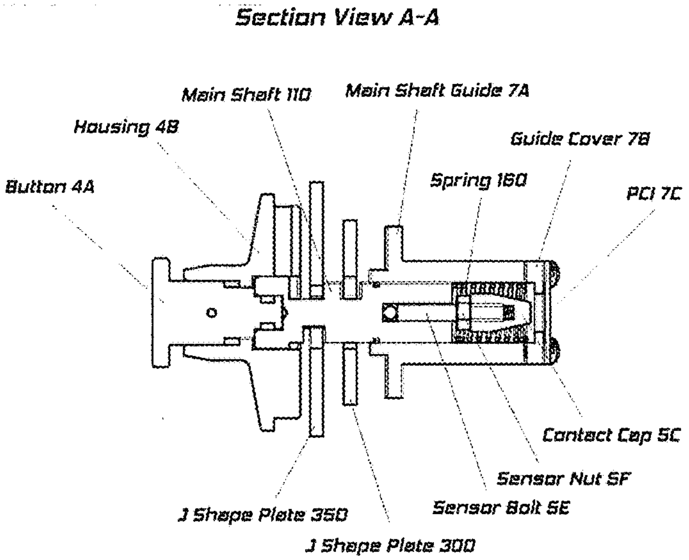
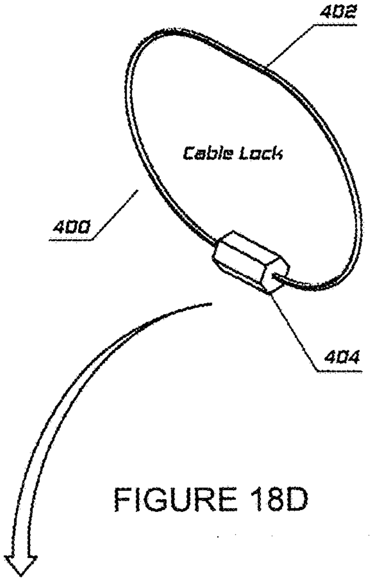
FIGURE 18D
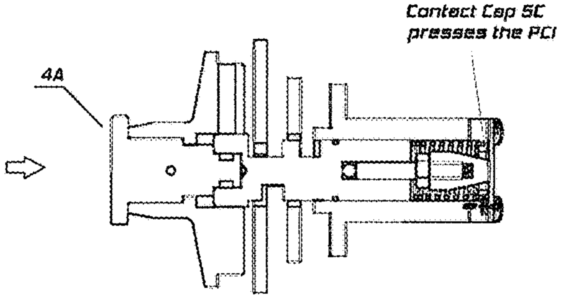
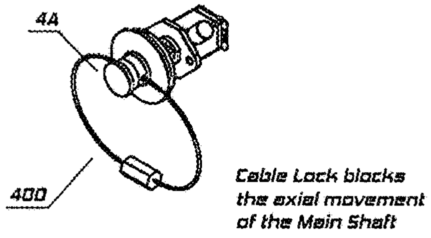
FIGURE 18C Figure 47A
Element 312
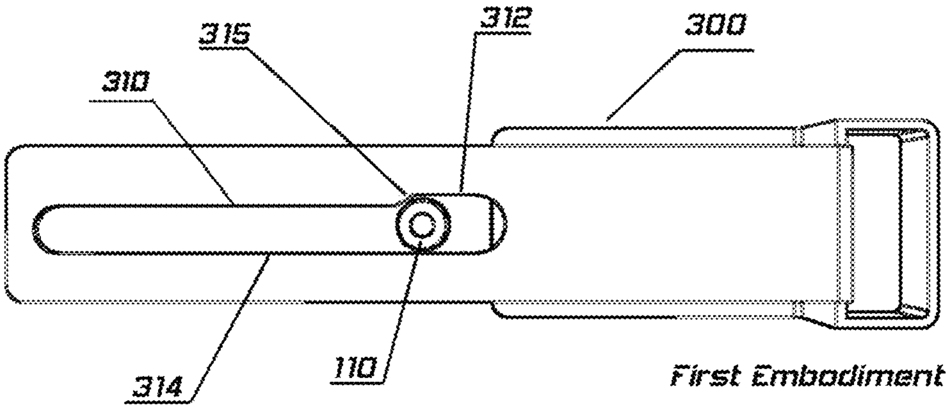
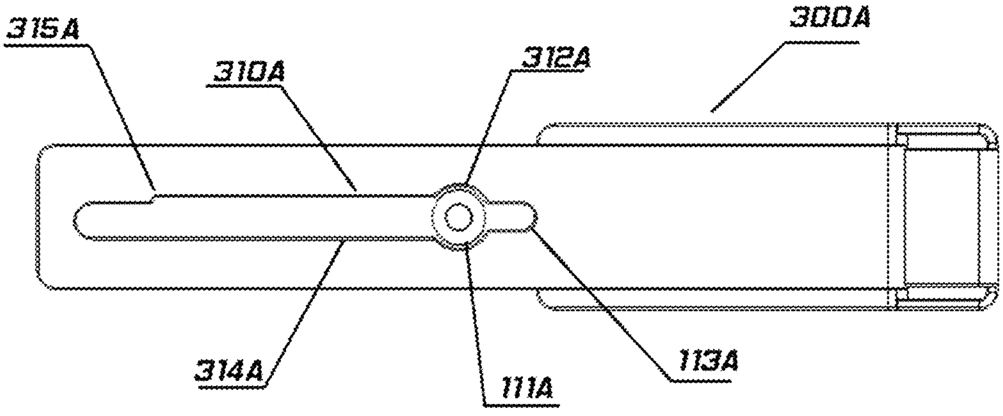
Figure 47B
Updated Embodiment Figure 50A
Element 315
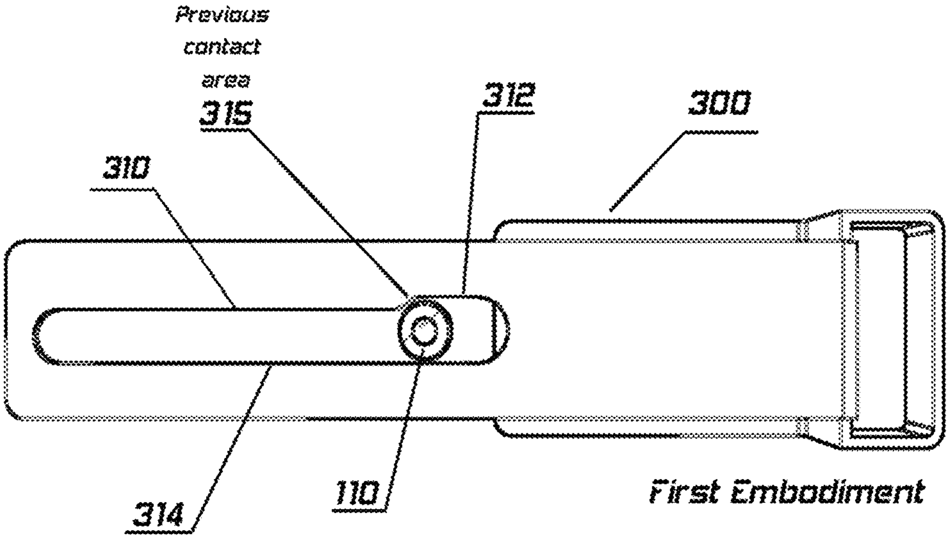
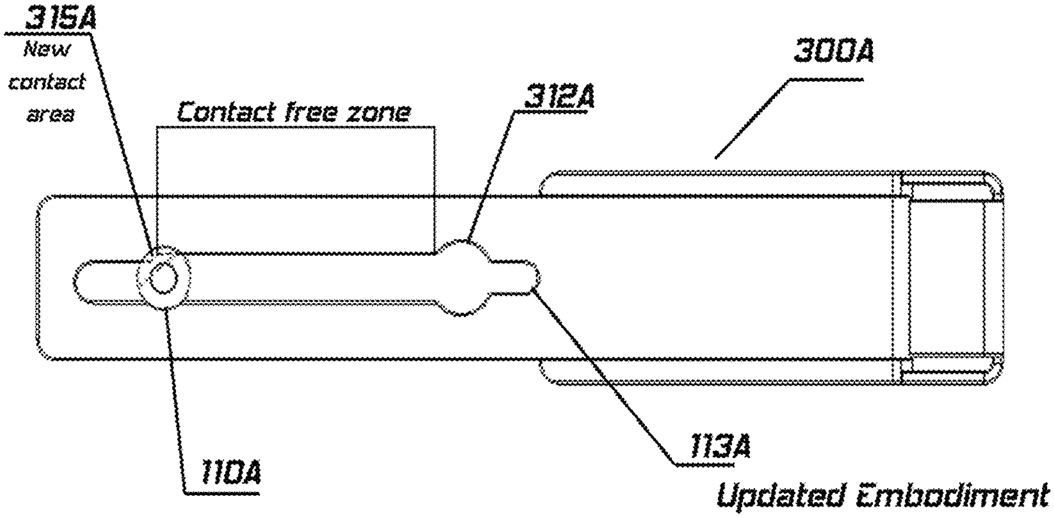
Figure 50B Figure 51A
Main Shaft 110
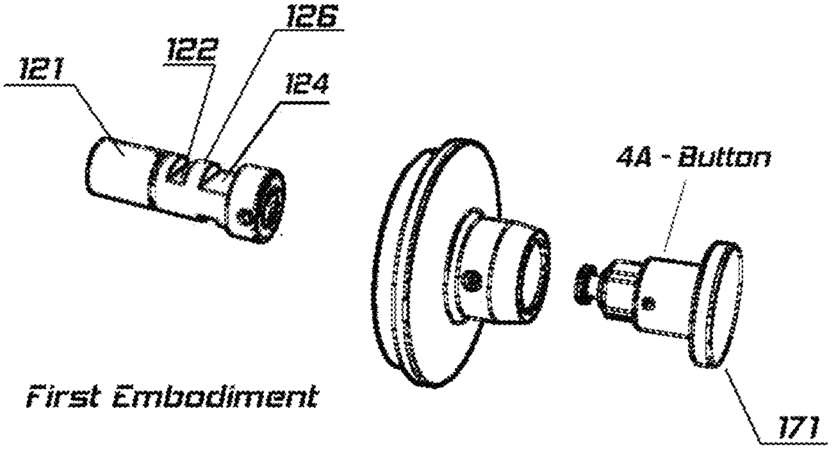
First Embodiment
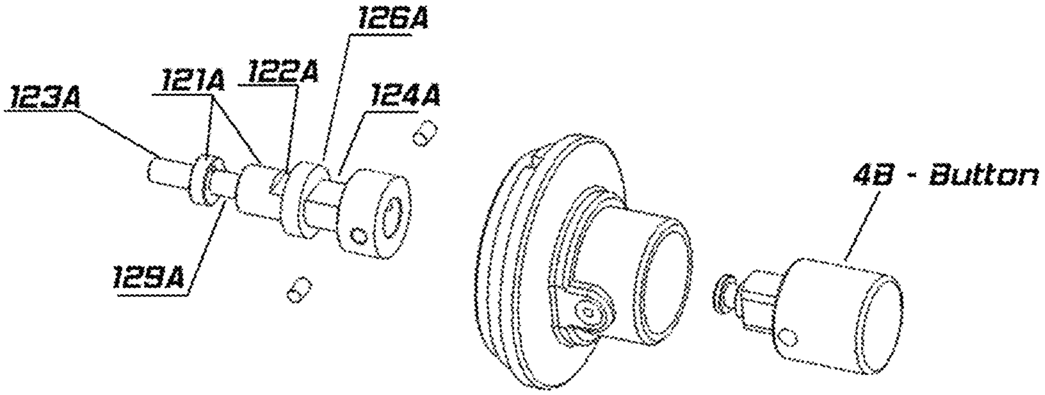
Updated Embodient
Figure 51B Figure 52A
Main Shaft 111
Back view
First Embodiment
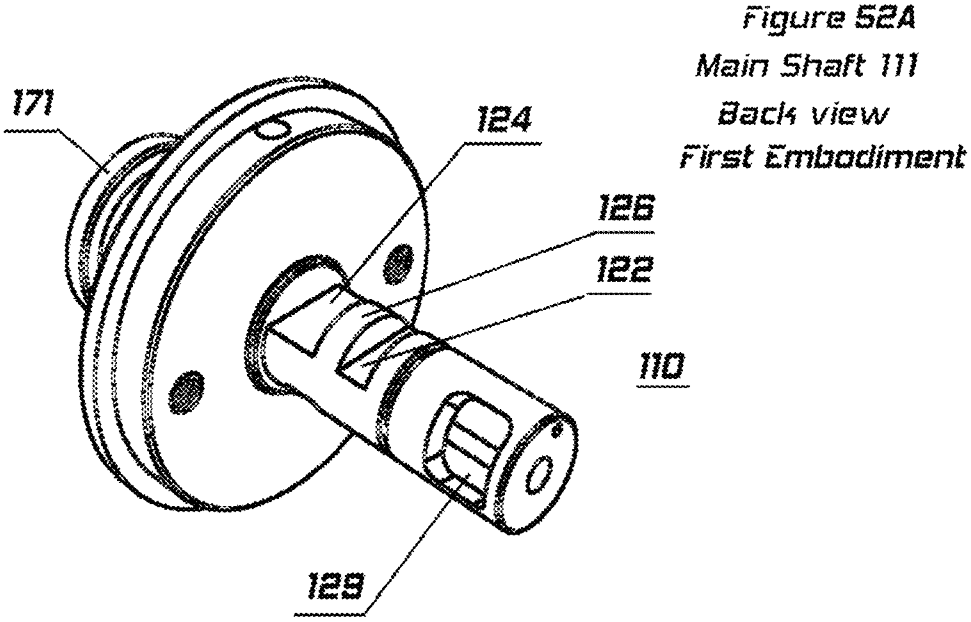
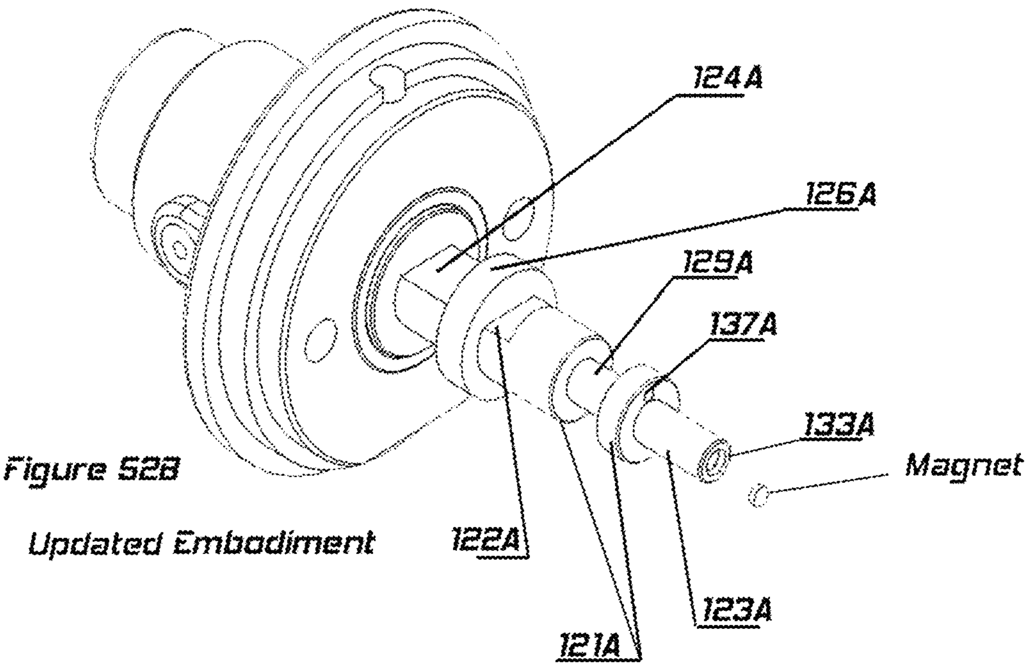
Figure 52B
Updated Embodiment First Embodiment Updated Embodiment

SECURITY LOCKING ASSEMBLY FOR SHIPPING CONTAINER DOORS

This application is a continuation-in-part of U.S. application Ser. No. 15/965,967, filed Apr. 29, 2018, which application is incorporated by reference in its entirety as if fully set forth herein and for all intended purposes.

1. Field of the Disclosure

The invention relates generally to security devices for shipping containers and particularly to improvements to security bars secured to shipping container doors.

2. Background

In view of the current state of technology, the container security sector needs new solutions that not only secure the locking bars of a container with a padlock or any other locking system, but which will also allow the use of new technologies to know exactly where the theft is occurring and preferably the time of the theft. Security bars for locking the doors of shipping container are known. However, these bars lack any intelligence or any monitoring and sensing capabilities. The present invention overcomes these problems with current security bars and current security technology for locking shipping container doors.

SUMMARY OF THE DISCLOSURE

A device for securing doors, such as, without limitation, shipping container doors, preferably through the connection to the bars provided on the container doors. The device includes a frame having novel internally movable substantially J shape plates and a novel lock configuration for maintaining the plates in a locked non-movable position in order to secure the doors and prevent them from being opened.

Certain non-limiting advantages of the novel device include:

1. The plates are incorporated into the operation of the lock and interact with the lock to reduce the number of moving parts, to enhance the simplicity and reliability of the novel design.
2. The device can be configured for remote electronic opening by using a solenoid or manual opening with a seal.
3. The device can be provided with a mechanism that prevents it from being closed, if the J form plates are not in proper position blocking the locking bars of the container doors and thus, helping to avoid false device placement.
4. The device can be lightweight and a size suitable to be implemented within a portable device.
5. The device can be assembled and disassembled in parts, independently of the main body of the device that is coupled. Therefore, if any part is damaged, it can be replaced, maintained and/or repaired without having to replace the entire device.
6. The various external parts are preferably aligned and united in the same shaft, thus, allowing the correct displacement of the moving parts that move inside.
7. The exterior parts of the lock, which may be exposed to extreme environmental conditions, provide protection against water, dust and corrosive environments to the moving parts inside the device.

8. The device allows the J-shaped plates and their interaction to be easily checked and confirmed to be in their proper position, regardless of the varying separations that may exist between different types or brands of locking bars.
9. The electronic components used for opening of the lock and the sensor for safety opening/lock can be protected to the external environment elements.

The operation of the novel device can be divided into six related main parts, which can be, without limitation:

1—Opening and closing of J shape plates:
2—Structural support of the parts.
3—Main Shaft Anchorage.
4—Insurance against false placements of the device on the container doors.
5—Activation of the opening/closing sensor.
6—Protection against environmental factors.

When closing the locking device, the device can be placed in the locking bar of the container doors: A movable/mobile part of the device disposed on a rail/arm of the main structure can be moved until it coincides with the locking bar of the door and with that established distance reference, the coupling is facilitated of the main structure of the locking device with the locking bar of the other door.

Two preferably J shaped plates are closed by moving the plates within the main frame towards the interior of the locking device such that, in conjunction with the main frame, they block and enclose the locking bars. When the first plate is in a closed position, a hole at the end of its internal guide can be aligned perpendicularly with a main shaft of the lock member of the locking device. A button portion of the lock member is pressed, causing the button to slide inward and interact with the main shaft, and moving the main shaft inside a main shaft guide and the through the hole of the first J shape plate. The main shaft can be locked to the main shaft guide by a Solenoid actuator. Also, in the closed position, the main shaft cylinder body blocks the internal guides of both plates, so that they cannot be opened outwards in order to maintain the padlock/locking device on the door. Also, in the closing position, a contact cap that covers the bolt sensor housed inside the rear central hole of the main shaft, keeps in contact by pressing the switch of the printed circuit board and thereby generating a signal which interprets the control electronics of the device that the lock is closed and can electronically transmit the lock closed status periodically or at any desired interval to a remote location or remote monitoring station or service.

To open the locking device secured to a container door (i.e. "closed" position), an opening command can be generated by the user and processed by the control electronics of the device, which can include, without limitation, an electric current being produced over the solenoid for several seconds, to retract its actuator. By pressing the button of the lock member, the solenoid actuator can be released from the pressure exerted by the wall of the main shaft hole where it is housed and finally collected inside the solenoid. The pressure exerted by the main shaft on the actuator of the solenoid is due to the pushing force, which produces the spring that is in its back.

When the main shaft is released from the actuator of the solenoid, it can automatically moves outwards due to the force exerted by the spring, placing itself in the open position, wherein a first channel in the main shaft can be aligned perpendicular to the internal guide of the J shape plate. The Main Shaft can rotate on its own axis independently of the Button to ensure that the way to open the device is through the first J shape plate. Once both pieces are aligned, by pulling out the first J shape plate, a linear movement is produced that can turn into a rotating movement for the Main shaft, when acting the angle of the wall in the hole that presents the interior guide of first J main shape on the first channel of the main shaft. Turning the main shaft changes the angle of the first channel of the main shaft so that the channel along the interior of the first J shape plate can travel all the way to its opening. By rotating the main shaft, by the action of the first J shape plate, the angular position of a second main shaft channel is also change that is parallel to its side, placing itself in horizontal position, which facilitates the opening of the second J shape plate when being pulled outwards.

With both J shape plates open, they stop blocking the door bars and the locking device/padlock can be removed. Preferred characteristics of the novel locking device to secure doors preferably with standardized ISO locking bar systems, can include: (1) the locking device can be placed and removed easily and intuitively, without the need for special tools; (2) the locking device can be secured to the locking bar of each door, preventing them from being opened separately or as a whole, with a structural frame of solid design that protects the lock that counts; (3) the locking device can be adjustable to different separation measures between the locking bars of each of the doors, according to the different types of container design; (4) the locking device can cover the guides that fix the locking bars to the doors in a way that hinders the removal of the device; (5) the external structural frame of the locking device can protect the mobile parts contained in its interior, called closing claws, from blocking, to block the locking bars (6) the design of the main frame can be robustness to hinder its removal once it is placed in the locking bar; (7) the locking device can be portable and relatively light in weight; (8) the locking device can be of a modular design to facilitate the removal of the specific parts it supports for repair or replacement; (9) the locking device can be provided with a novel lock that allows safe opening and closing; and (10) the locking device can integrate electronic controls to provide enhance functionality for the locking device.

The electronic controls can include: (a) communication to a server via GPRS, wireless or Satellite, (b) Opening and closing of a lock member using a keypad or remotely from a tracking software on a desktop or mobile device; (c) GPS tracking; (d) sensors that provide information on the status and location of the locking device and the container doors it secures; (e) Long-life batteries differentiated by function; and (f) a Movement energy charging system.

BRIEF DESCRIPTION OF THE DRAWINGS

FIGS. 1, 2A, 2B, 2C, 2D, 3, 4A, 4B, 5A, 5B, 6A, 6B, 7, 8A, 8B, 9A and 9B illustrate several views of the novel locking device and illustrating the opening and closing of the plates for the locking device in accordance with the present disclosure;

FIGS. 10, 11A, 11B, 11C and 11D illustrate certain features of the locking system of the locking device in accordance with the present disclosure;

FIGS. 12A, 12B, 13A, 13B, 13C, 13D, 14A, 14B, 14C, 14D and 14E illustrate several views of the anchorage of the main shaft for the novel locking device in accordance with the present disclosure;

FIGS. 15A, 15B, 15C, 15D, 15E, 15F, 16A, 16B, 16C, 16D, 16E and 16F illustrate how the novel design of the locking device helps to prevent false placements when securing the locking device to the bars of the container doors in accordance with the present disclosure;

FIGS. 17, 18A, 18B, 18C and 18D illustrate the activation of the closing sensor for the novel locking device in accordance with the present disclosure;

FIG. 47A illustrates the first non-limiting embodiment slot configuration for the first locking bar in accordance with the present disclosure;

FIG. 47B illustrates a second non-limiting embodiment slot configuration for the first locking bar in accordance with the present disclosure;

FIG. 50A is a front view of the first non-limiting embodiment slot configuration illustrating the lock point of contact in accordance with the present disclosure;

FIG. 50B is a front view of the second non-limiting embodiment slot configuration illustrating the lock point of contact in accordance with the present disclosure;

FIG. 51A is an exploded perspective view of the first embodiment for the main shaft assembly of the lock in accordance with the present disclosure;

FIG. 51B is an exploded perspective view of a second embodiment for the main shaft assembly of the lock in accordance with the present disclosure;

FIG. 52A is a perspective view of the first embodiment for the main shaft assembly of the lock in accordance with the present disclosure;

FIG. 52B is a perspective view of the second embodiment for the main shaft assembly of the lock in accordance with the present disclosure;

DETAILED DESCRIPTION

Figure 1:
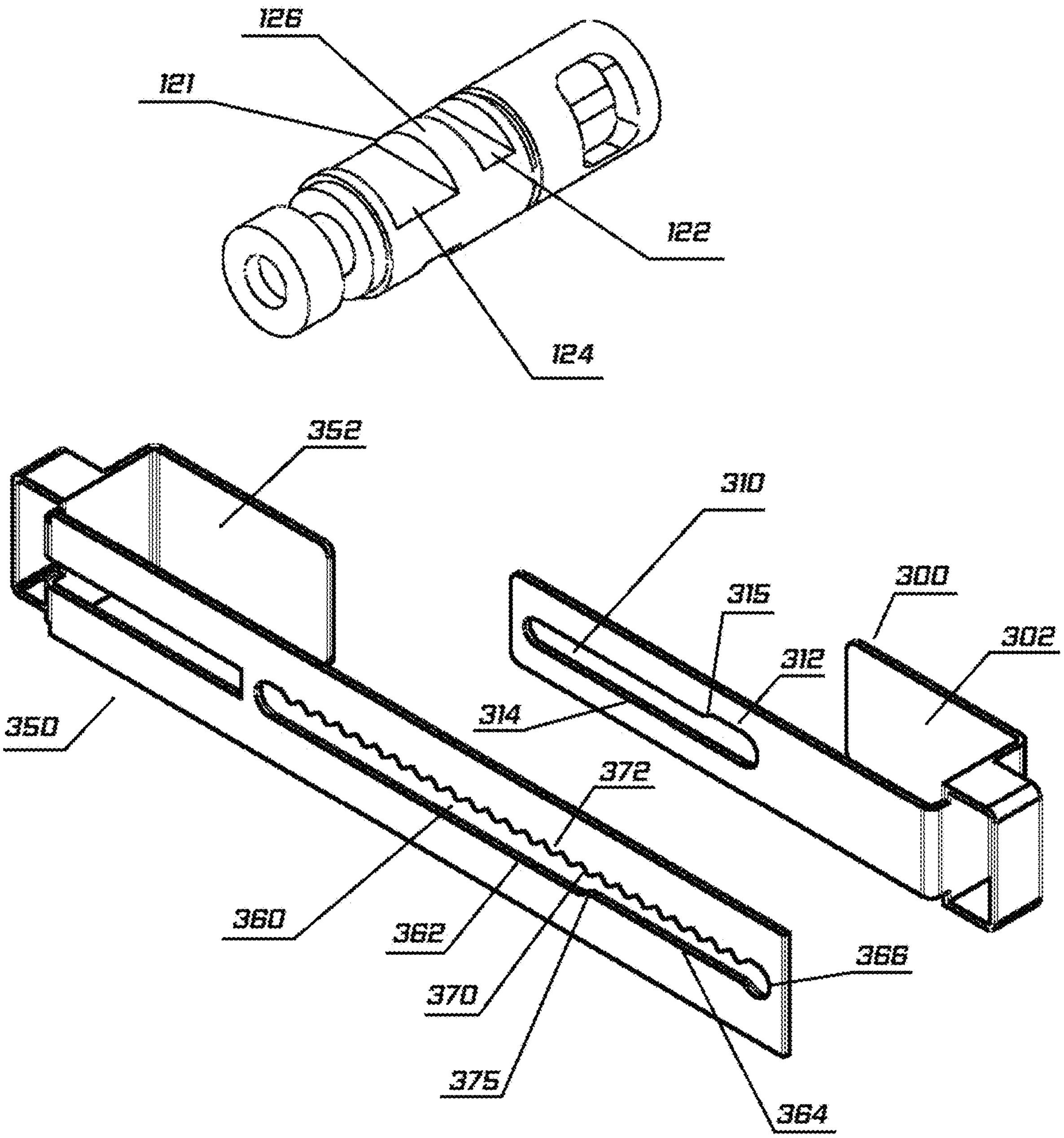
Figure 2A:
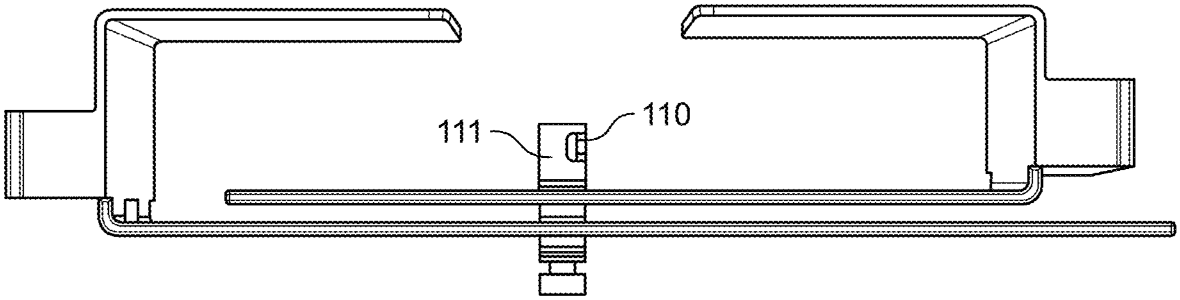
Figure 2B:
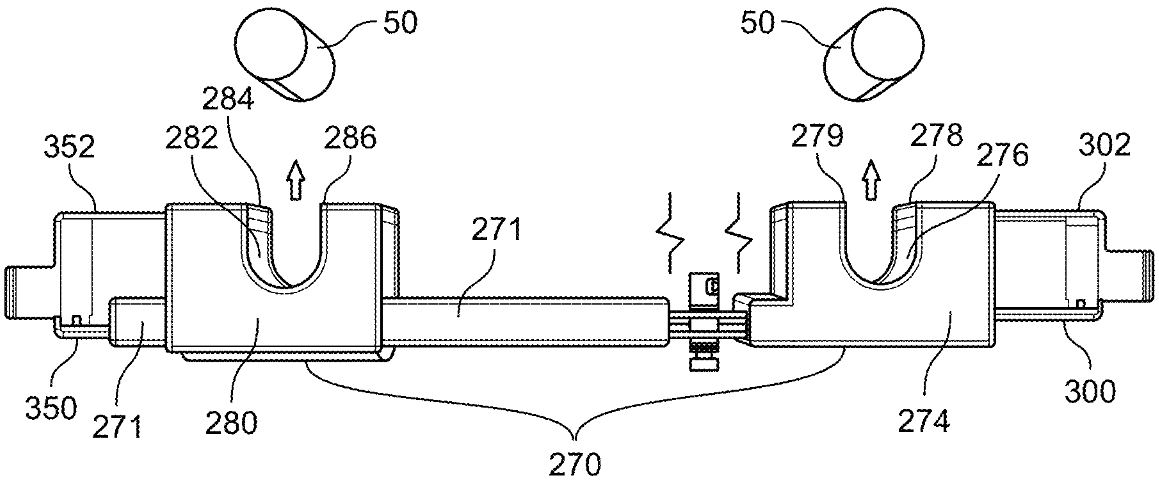
Figure 2C:
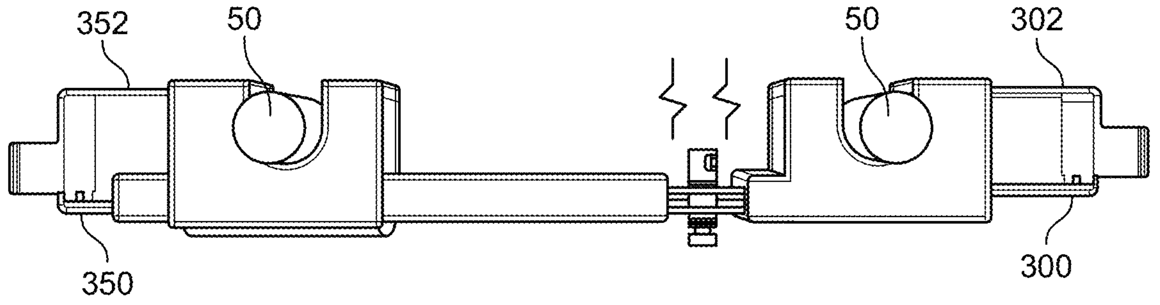
Figure 2D:
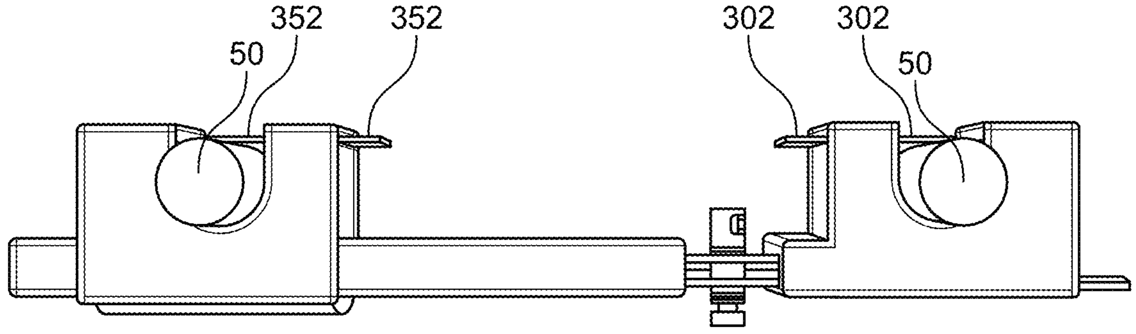
Figure 3:
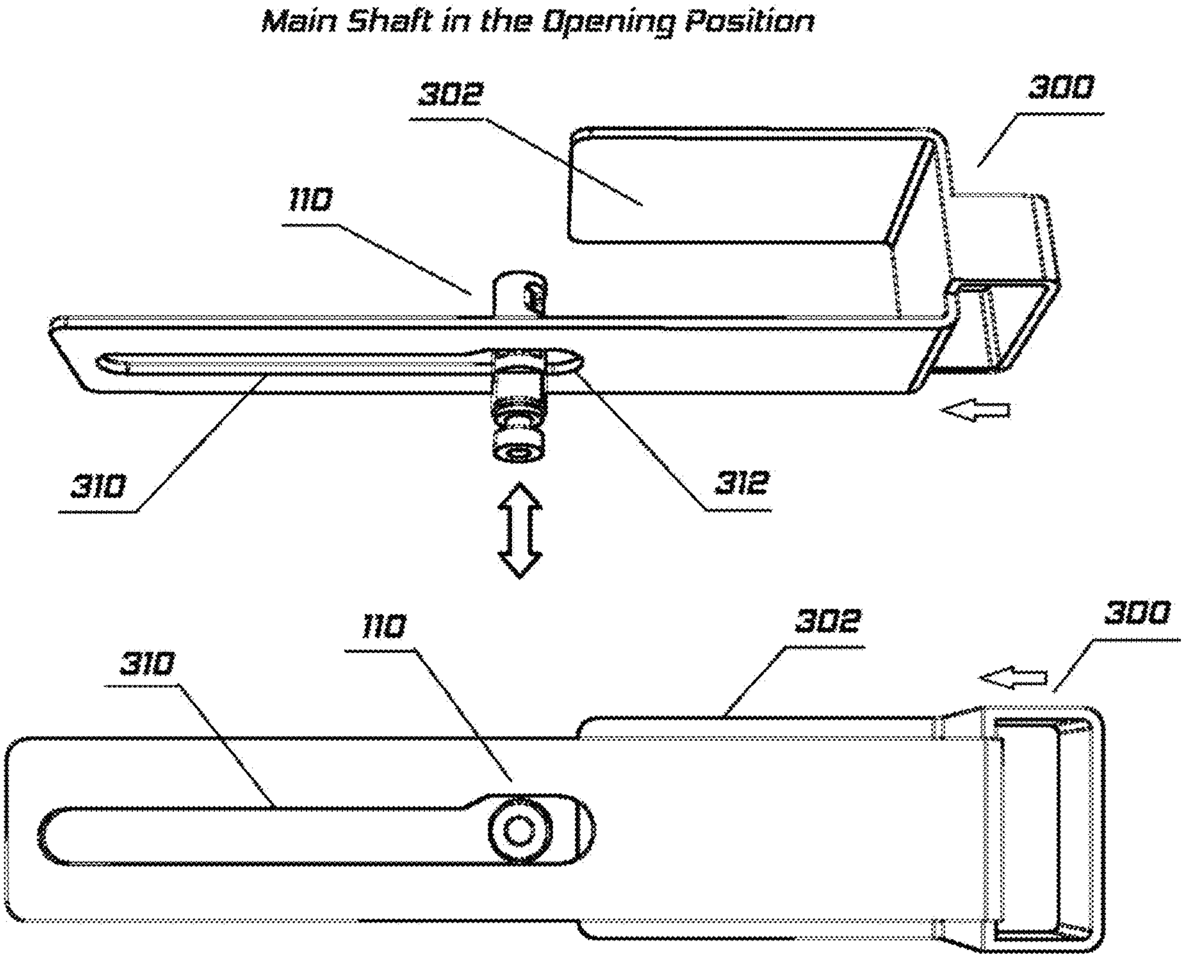
Figures 4A, 4B:
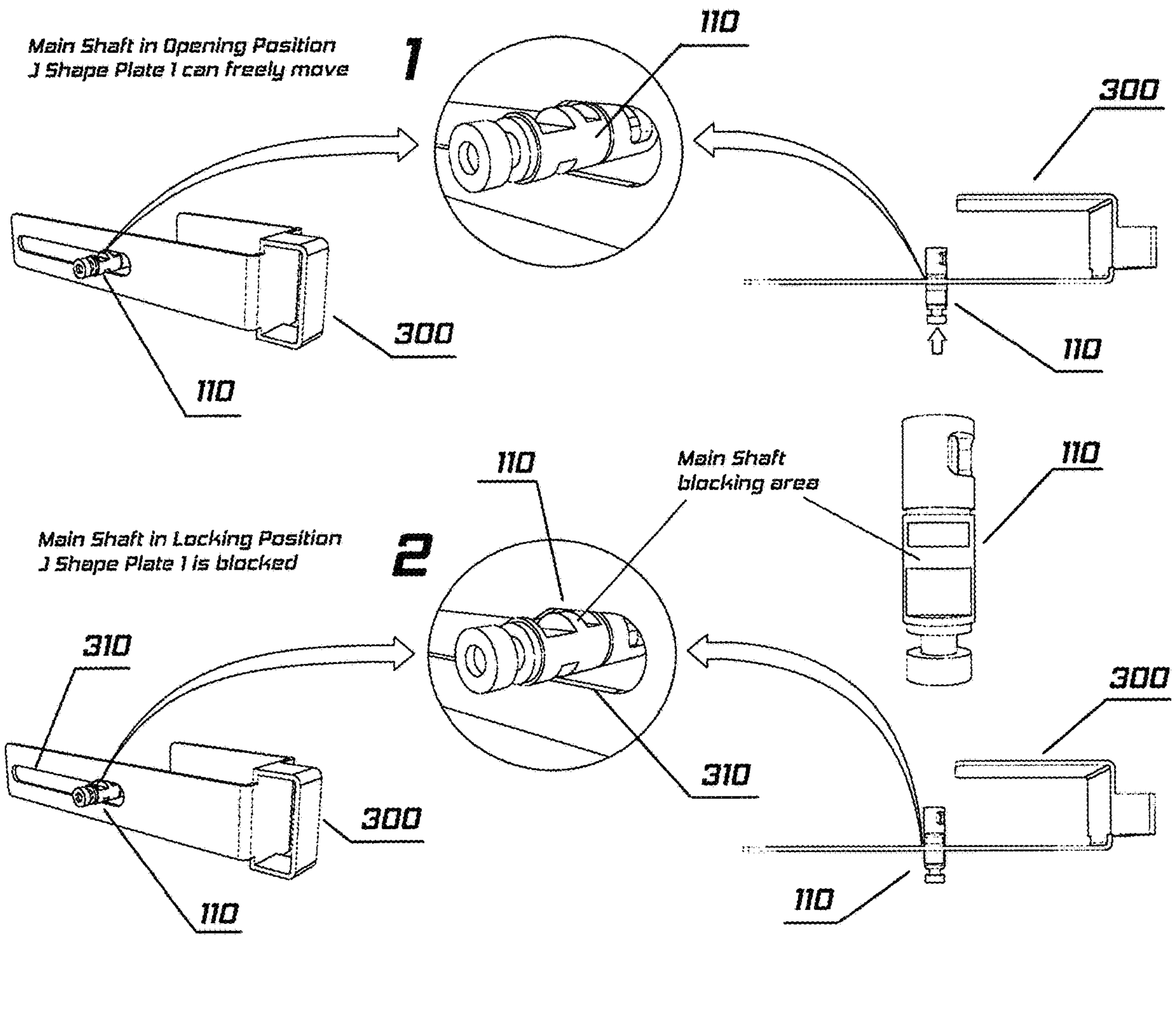
Figure 7:
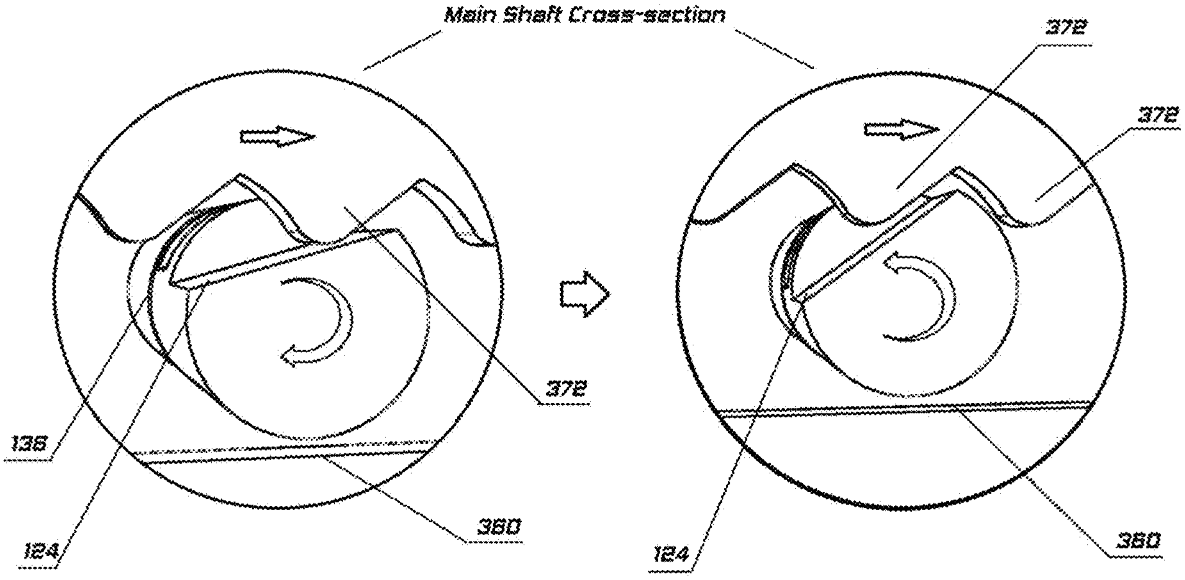
Figures 8A, 8B:
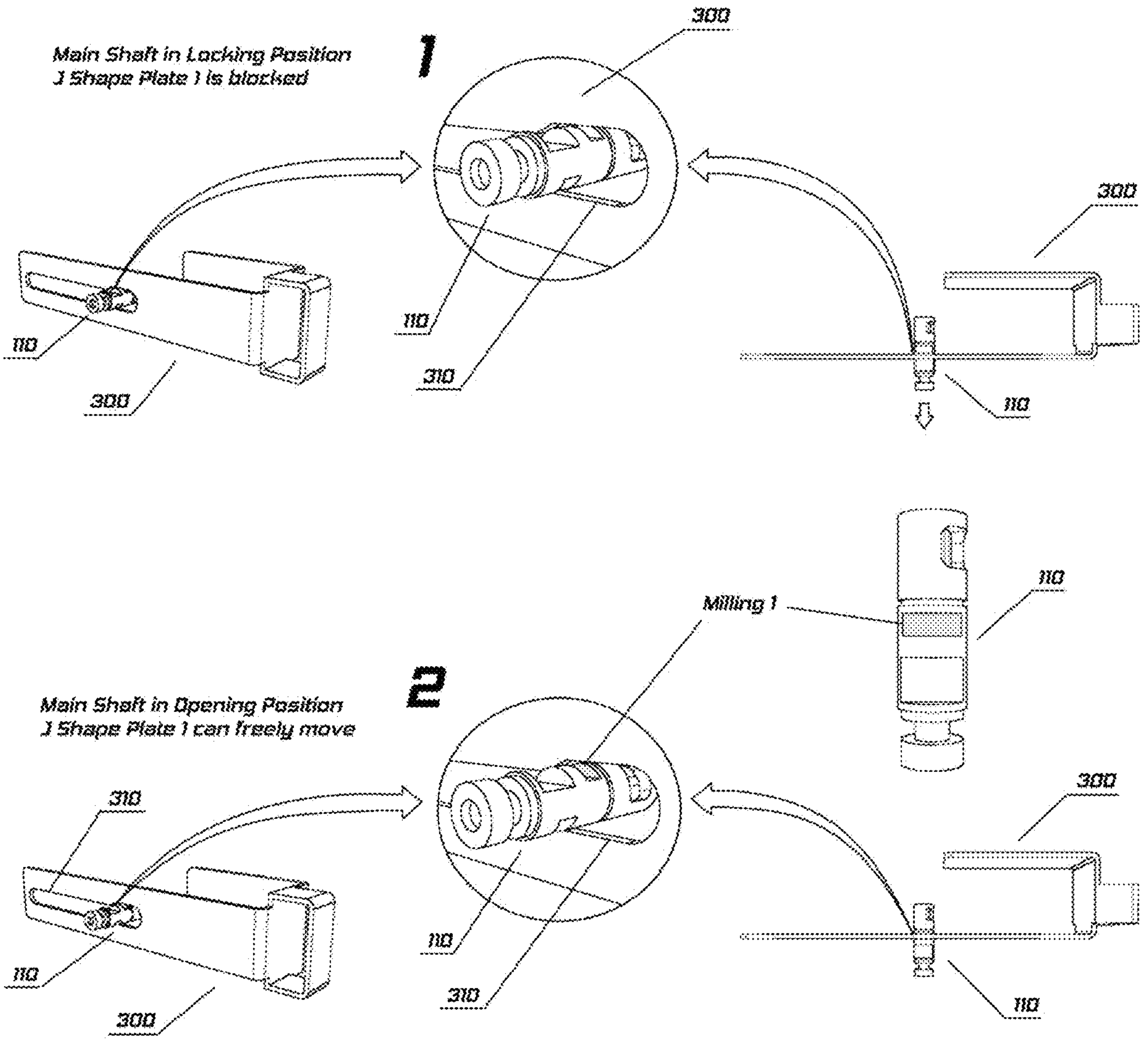

Generally disclosed is a novel locking device for securing the doors of shipping containers through connection to the bars provided on the doors of the shipping container. As will be shown in the drawings and described in detail below, the novel locking device generally includes a frame/housing, a pair of substantially J-like shaped plates that can be internally movable within the frame/housing and lock/sensor system that maintains the plates in a locked non-movable position in order to secure the doors and prevent them from being opened when the locking is in properly secured thereto and the lock is in a "locked" position.

The following described embodiments for a container locking device can preferably apply to the containers security sector; where using an innovative sensor which is integrated to communication and GPS elements, provides information to monitoring individuals and monitoring technology concerning the time and precise location where the cargo is being stolen. The locking device secures the locking bars of a container and provides a quick, if not instantaneous, notice of when and where a theft is occurring. With the use of the disclosed novel locking device, the user has a better chance of recovering the freight goods in coordination with the security organisms in charge and/or procedures in place. The disclosed novel locking device provides great benefit in identifying thefts occurring outside of the port facilities, such as, but not limited to, the interstate highways, truck parking lots or any other place that has little control.

FIGS. 1 through 9 provide several view of the novel locking device and illustrated the opening and closing of the substantially J-shaped plates. The novel locking device 100 can contain a lock 110 having cylindrical main shaft 111 which preferably interacts with the J-shaped plates 300 and 350 of locking device 100. Lock 110 can be provided with two slots or cutouts 122 and 124 in its upper part 121 which communicate with inner guides 310 and 360 of J shape plates 300 and 350, respectively, during securement of locking device 100 to the locking bars of a shipping container or other structure.

J shape plates 300 and 350 preferably move parallel to each other inside a structural frame/housing 270 of locking device 100, of which they are secured to, for opening or closing to fulfill their function. Plates 300 and 350 are secured to locking bars 50 of a shipping container or other object/structure when they are in the closed position (with lock 110 enabled) or can be released from their closed position (through unenabling the locked position of lock 110) when authorized access to inside the shipping container is desired ("plates open position"). When lock 110 is open, plates 300 and 350 can be moved perpendicularly to cutouts 122 and 124 with respect to main shaft 111. In such path depending on the position for plates 300 and 350, device 100 can be opened or closed. In the "closed position", J-shaped plates 300 and 350 fix frame/housing 270 (as well as the rest of locking device 100) to the container locking bars, thus, leaving the locking bars blocked.

To place lock 110 in a closed position, plate 300 can be preferably disposed within housing 270 (i.e. disposed within a first hub 274 of housing/support structure 270), to allow a wider portion 312 of the central guide opening 310 to be aligned with the main shaft 111 of lock 110, thus creating a space so that lock 110 can move freely inwards in a horizontal position (within housing 270) and can traverse perpendicular to J shape plate 300. In this position, when lock button of lock 110 is pressed, lock 110 can be moved inward and in the inward position, the location of cutout 122 is changed causing it to be misaligned transversally in reference to the horizontal plane that was maintained with interior guide 310 of J shape plate 300. In the inward position, an area 126 between the cutouts 122 and 124 prevents the narrowest part 314 of inner guide 310 of plate 300 can cross to the shaft/lock 110 and therefore can be displaced. Therefore, when lock 110 is in an open position, plate 300 can be freely moved and in a lock 110 locked position, plate 300 is blocked by area 126 from freely moving.

With the movement of main shaft 111 towards the interior of locking device 100, cutout 124 can also be displaced. Cutout 124 is preferably wider in dimension as compared to cutout 122. Thus, plate 350 can move freely in a horizontal direction within housing 270 and eventually can be moved to its device closed position. Therefore, by having freedom of movement in this direction, plate 350 can be preferably responsible for or in charge of regulating the closing of device 300, by sliding (i.e. horizontally moving) until it occupies its closed position, which is dictated or conditioned on the specific separation length of the looking bars 50 for the particular shipping container or other structure/object.

Interior guide 360 of plate 350 can be provided with a jagged pattern 370 having a plurality of guide teeth 372, which in conjunction with cutout 124, helps to prevent plate 350 from moving in an opposite direction. With this configuration, if plate 350 is moved in an opposite direction (i.e. towards its opening), the inner face of an adjacent guide teeth 372 can be arc-like shaped with a similar surface as the outer circumference of the cylinder main shaft 111, thus, preferably preventing movement in the opposite direction.

With plate 350 in a closed position, the other side of guide teeth 372, push and rotate main shaft 111, exerting a force on a part of the base of cutout 124, forcing it to change its angle to a position which preferably can be an almost horizontal position, which allows guide 360 of plate 350 to cross it. Subsequently, by the action of the torque of a spring placed in the back of lock 110 (discussed in further detail below), shaft 111 can return to rotate in the opposite direction to recover to its initial position.

To open locking device 100, lock 110 can be released from the closing position, removing the lock that held it in that position, causing the spring of lock 110 to be released (uncompressed) and to exert an axial force on main shaft 111 causing it to move forward. With such action, main shaft cylinder 111, which previously blocked the entrance of the inner hole of plate 300, can be moved forward and can again be positioned by aligning cutout 112 of main shaft cylinder 111 with inner hole 310 of plate 300, so that it can slide, already unobstructed. In this position, by exerting a force in the direction of opening 300, plate 300 can drive and rotate main shaft cylinder 111 a few degrees to the main axis, tilting cutout 122 in a preferred nearly horizontal position. To achieve this, the drawing of the widest part of hole 310 can have an angle/point 315 that impinges on a portion of cutout 122, forcing cutout 122 (along with main shaft cylinder 111) to rotate. Once this position is achieved, plate 300 can be moved and opened, passing the narrowest part of internal guide 310 inside cutout 122 and maintaining this position so that main shaft 111 cannot be rotated as it is preferably framed in such space. With the cylinder axis in that position, channel or cutout 124 (parallel to channel or cutout 122), through which the plate 350 passes, can take the same almost horizontal position that maintains channel 122, releasing teeth 372 from guide 360 so that plate 350 can slide without interfering with its opening and thereby opening the other part of locking device 100.

Figure 10:
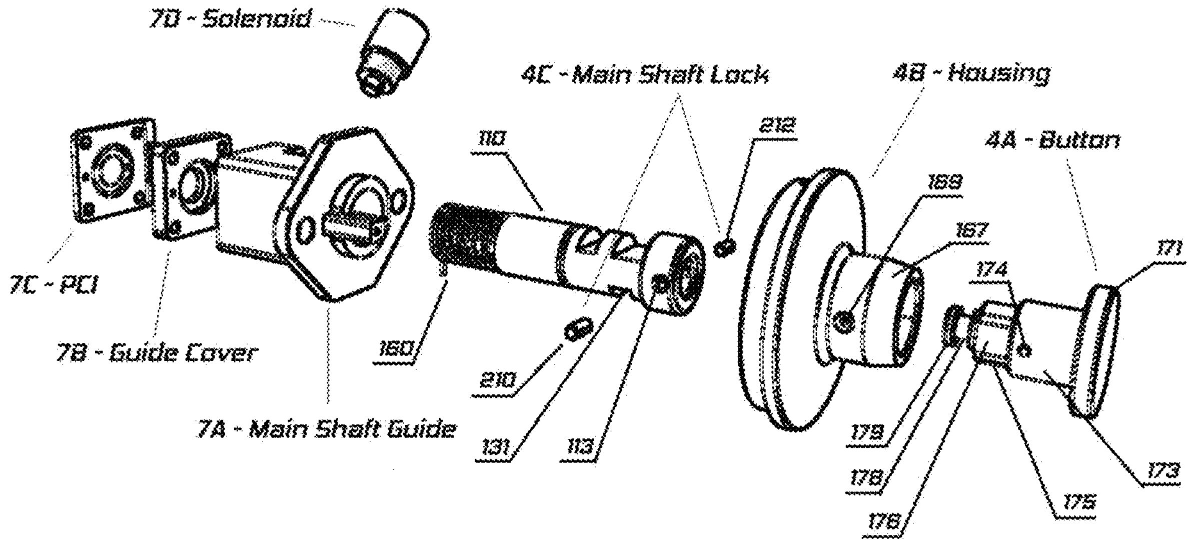
Figure 13A:
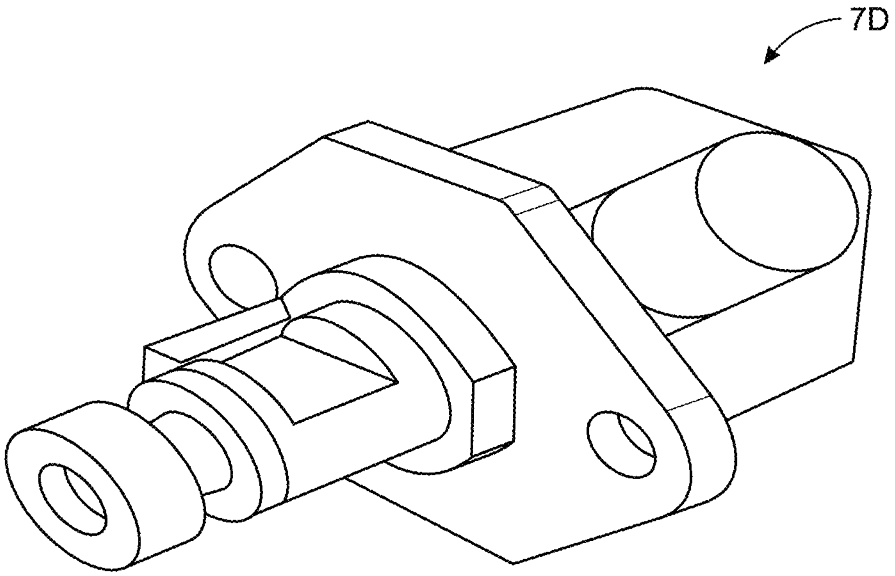
Figure 13B:
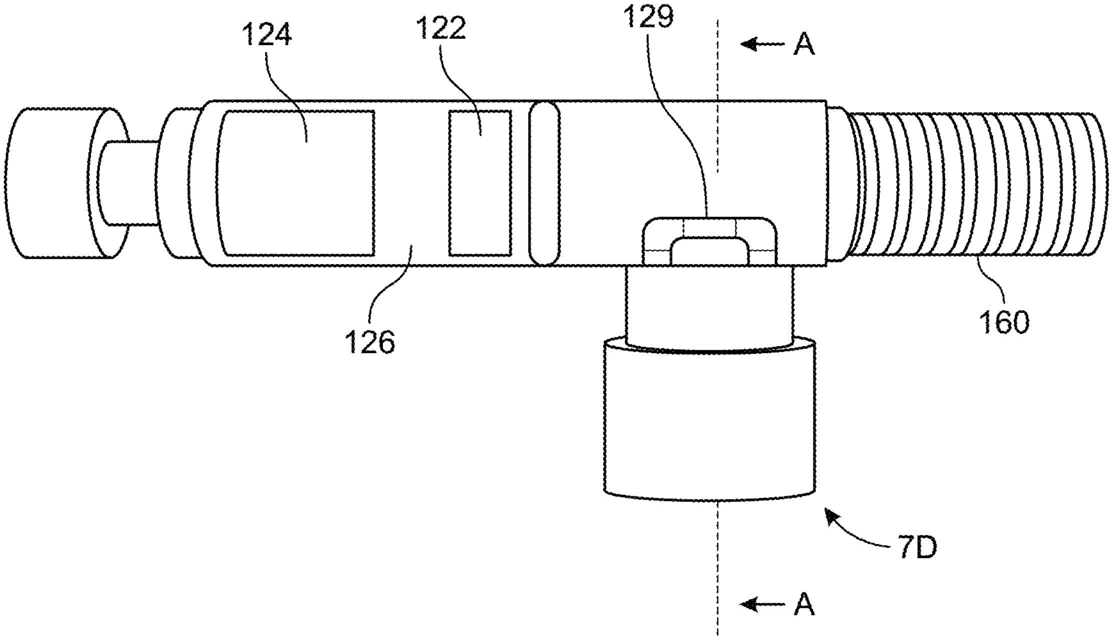
Figure 13C:
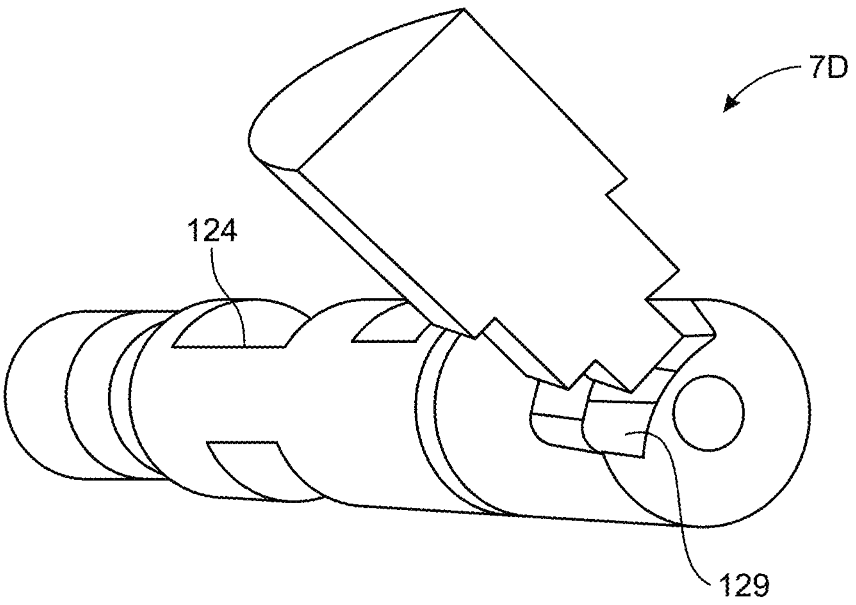
Figure 13D:
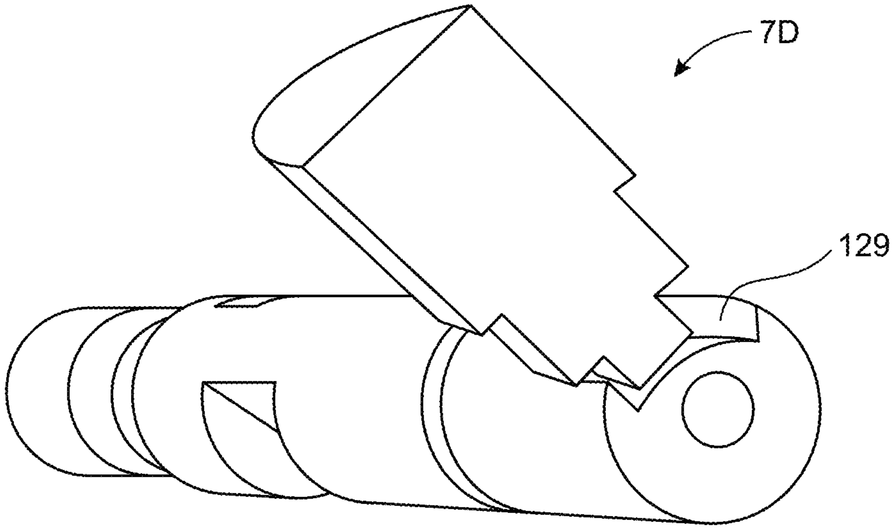

FIGS. 10 and 11 illustrates certain features of the locking system 110. As seen, locking system 110 can include main shaft lock/cylinder 111, lock housing 4B, push button 4*a*, solenoid 7D, main shaft guide 7A, guide cover 7B and printed circuit board 7C.

Main shaft guide 7A, guide cover 7B and printed circuit board 7C are preferably provided at the back of locking system 110 and can serve also as a support and sealing member for certain internal components of locking system 110. Main shaft guide 7A can be provided with a cylindrical hole along its center main axis moves where certain parts of locking system 110 can move and rotate within. In addition to serving as a support for these parts, guide 7A can have a back square block where a solenoid 7D can be screwed into (i.e. for models with an electronic opening) and can also serves as a basis for the Guide Cover 7B and the plate printed circuit board or PCI 7C. Guide 7A can be provide with side ears or flanges that each can be provided with a hole or aperture for receiving a bolt, screw or similar fastener, for securing guide 7A to another portion of device 100, such as, but not limited to frame/housing 270, to allow it to be armed.

Guide cover 7B serves as a base on its back face to the Printed Circuit Board 7C and on its other side can be attached, preferably by bolts, to the Main Shaft guide 7A. Guide cover 7B and/or Guide 7A can also serve as support for the back part of a spring 160. Guide Cover 7B can have a small channel where the protruding end of the spring wire enters and remains blocked. Therefore, spring 160, in addition to having a support base when it is compressed by Main Shaft 111, can also be blocked so that it cannot move by turning completely on its axis.

Printed Circuit Board ("PCI") 7C can be bolted or otherwise secured to main shaft guide 7A and guide cover 7B and seals the cavity or one end of Main Shaft Guide 7A. PCI 7C can be provided with a switch, preferably centrally located, that can be activated by making contact with a rubber hood that forms the contact cap/piece 5C of main shaft 111 and is positioned/moves through/through spring 160.

On a front side of lock 110, generally three main pieces can be provided which interact with Main Shaft 111, namely, button 4A, housing 4B and Main Shaft lock 4C.

Button 4A can be a single piece preferably formed by four cylinders that can be decreasing in size from the largest in its front, to the last having a cylindrical neck of smaller diameter in its center. Largest cylinder 171 can have an ergonomic design to facilitate a grip by the user's fingers, to pull it in case lock 110 is locked when opening. Button 4A can be part of lock 110 that interacts with the person/user. A next cylinder 173 can be housed and slide inside a tube 167 of housing 4B that protrudes outward from the center of the front part of Housing 4B, which provides a frame/support to button 4A for button's 4A correct alignment and/or coupling with Main shaft 111. Cylinder 173 can be crossed by a hole 174 through which a cable lock can pass, blocking the opening of lock 110.

A third cylinder 175 can be provided for limiting the movement of Button 4A so that Button 4A only move inwards or outwards, but not on its own axis. To achieve such feature, in one embodiment, a flat cut 176 can be provided on one of the sides of third cylinder 175, giving it a crescent shape that fits into a hole with a similar shape, on an inner passageway wall of Housing 4B in a central cylindrical channel of housing 4B.

Lastly, in the back part of a fourth cylinder 177, a roughing in its center can be provided that forms a cylinder 178 of smaller diameter with the shape of a neck and achieving a cylindrical head 179 of greater diameter at the bottom/back/inner end of button 4A. Fourth cylinder 177 can be preferably positioned inside of the central cylindrical hollow that presents main shaft 111 in its frontal part. Two pins 4C can be lodged in the body of main shaft 111 and enter the neck-shaped part 178 of fourth cylinder 177, anchoring both pieces so that they move together in a linear direction inwards or outwards, depending on whether the lock is opened or closed. However, this anchorage still allows main shaft 111 to rotate on its axis within the Main Shaft guide 7A, independently of button 4A which will be prevented from turning in view of third cylinder 175 being framed inside Housing 4B. Preferably, button 4A does not rotate since the holes through its second channel can be aligned with the holes of Housing 4B, with the similar purpose that they can be traversed by a cable lock when sealing.

Housing 4B can provide the external support that houses Button 4A on one side Housing 4B can have an inside central cylinder 167 that protrudes from a front and in the center of its back a piece that defines a cylindrical bore can be provided for housing a front portion of main shaft 111 can be housed. Housing 4B preferably can have a cylindrical shape and can become conical at its front part until or as it meets the central cylinder 167 that can serve as a housing for Button 4A, allowing button 4A to be easily manipulated by a user's fingers. Inside the inner channel of central cylinder 167, button 4A can be moved rectilinearly inwards or backwards. To prevent the button 4A from turning on its axis at the end of the interior hollow cylinder through which it moves, a wall can be provided that has a center, half-moon shaped hollow portion (or other non-circular shape), for receipt of second cylinder 173 of button 4A though mating or aligning of the crescent 175 or other shape provided on second cylinder 173. On a back side of housing 4B a step or inner ledge can be provided that enters the wall of the device where the lock is housed. The step preferably presents a cylindrical perforation that can go through the body of housing 4B perpendicular to the central hole through which main shaft 111 moves. At perpendicular cylindrical perforation, the two pins that serve as a lock to main shaft 111 can be introduced.

A Main Shaft lock 4C can be provided and can be preferably formed by one or more, and preferably two pins 210 and 212 that can be housed inside main shaft 111, in the portion of shaft 111 cylinder with the largest diameter and located at a front end of main shaft 111, at the front. The pins will protrude through the hole in the center of that cylinder, penetrating the roughing that forms the neck of the fourth cylinder of the Button and thus anchoring both parts. When they are joined, they can move jointly and linearly from the opening position to the closing position and vice versa inside housing 4B. When locking device 100 is closed by pressing button 4A, main shaft 111 moves inwards or later when solenoid 7D releases main shaft 111, main shaft 111 can be displaced outwards by spring 160, making it possible to open locking device 100.

Although main shaft 111 can be preferably anchored by pins 210 and 212, shaft 111 can rotate on its axis independently of button 4A and interact the slabs that its cylinder presents, inside internal guides 310 and 360 of plates 300 and 350, respectively. Preferably, the main shaft axis rotates independently of the Button Guide to ensure that the way to open locking device 100 is through the J shape plates, as opposed to Button 4A, whose primary purposed is to move the Main Shaft 111 inwards, so that the two Upper channels 122 and 124 of main shaft 111 can be properly positioned with respect to internal guides 310 and 360 of J-shape plates 300 and 350, respectively.

FIGS. 12 through 14 show the anchorage of main shaft 111. When lock 110 is assembled spring 160 can be preferably positioned behind main shaft 111 to allow spring 160 to exert force on main shaft 111, such as when lock 110 is closing and when lock 110 is already in a closed position. When closed, spring 160 can be compressed from main shaft being moved inward by a user pressing button 4A, During closing of lock 110/locking device 100, spring 160 is compressed through exerting a force on spring 160 from main shaft 111 (i.e. user presses outer cylinder 171 of button 4A inward). In a closed position, plate 350 exercises a torque force that rotates main shaft 111 around/along its axis. When closing lock 110, a force is exerted on button 4A by the user, that moves main shaft 111 inwards, compressing spring 160. To maintain the compressed state of spring 160 and main shaft 111 in a closed position, a locking mechanism can be provided, which can vary according to the opening mode designed for lock 110.

Where lock 110 has an electronic opening mode, a solenoid 7D can be provided, where its actuator is received within a posterior channel/cutout 129 of main shaft 111. Channel 129 can have a preferably angled slab/surface with respect to the actuator, to allow the actuator solenoid to move through it, when main shaft 111 is rotated from one position to another, so that solenoid 7D does not interfere with the rotational movement. Channel 129 serving as a third cutout.

Solenoid 7D, in addition to serving as a movable blocking member and a as a lock for holding spring 160 in a compressed state, can also function as an additional lock so that main shaft 111 cannot rotate beyond the angle defined by the channel 129 where solenoid 7D penetrates. Were this additional safety lock for solenoid 7D was not in place, with lock 110 in a closed position, if plate 350 is struck in the direction of its opening, tooth 372 of its inner guide 360, would be blocking the area of main shaft 111. Thus, in this incorrect position, main shaft 111 could be rotated, causing channel 124 to be aligned with inner guide 360 of plate 350 and allowing locking device 100 to be in an unauthorized "open" position.

Where lock 110 is a mechanical mechanism opening (as opposed to electronic), a seal, which preferably can be a cable lock 400, similar to those used for container doors, that can be placed in the front part, that acts as a lock on the main shaft 111 and blocks axial movement of main shaft 111.

FIGS. 15 and 16 illustrate the novel design for locking device 100 to help prevent false placements of locking device with respect to the container door bars 50. In addition to the channels 122 and 124, main shaft 111 can also have a channel/milling/cutout 131 in an area of main shaft 111 below cutout 124 and parallel to this on the vertical axis. When interacting with a part of the internal guide of the J shape plate 360, it provides the device with insurance against false placements. Internal guide 360 of J shape plate 350 can be provided with a protruding step 375 that is parallel to toothed pattern 370 towards an initial edge of guide 360. This protrusion moves inside channel 131 of main shaft 111, during the path of the J shape plate 350 from the opening position, until shortly before being placed in the closed position. In this path, if main shaft 111 is moved to the closed position, the wall of channel 131 hits projection 375 of inner guide 360 to obstruct the movement of plate 350.

When J shape plate 350 is in a closed position, step 375 of inner guide 360 does not obstruct the travel towards the interior of the main axis, since in that position the channel of internal guide 360 is preferably widened, allowing the whole diameter of main shaft 111 to be displaced through it. This allows device 100 to be secured to one of the container door bars 50 and to allow device 100 to be secured to the other container door bar 50, a similar design can be applied, namely, the interaction between J shape plate 300 and channel 122.

Figure 17:
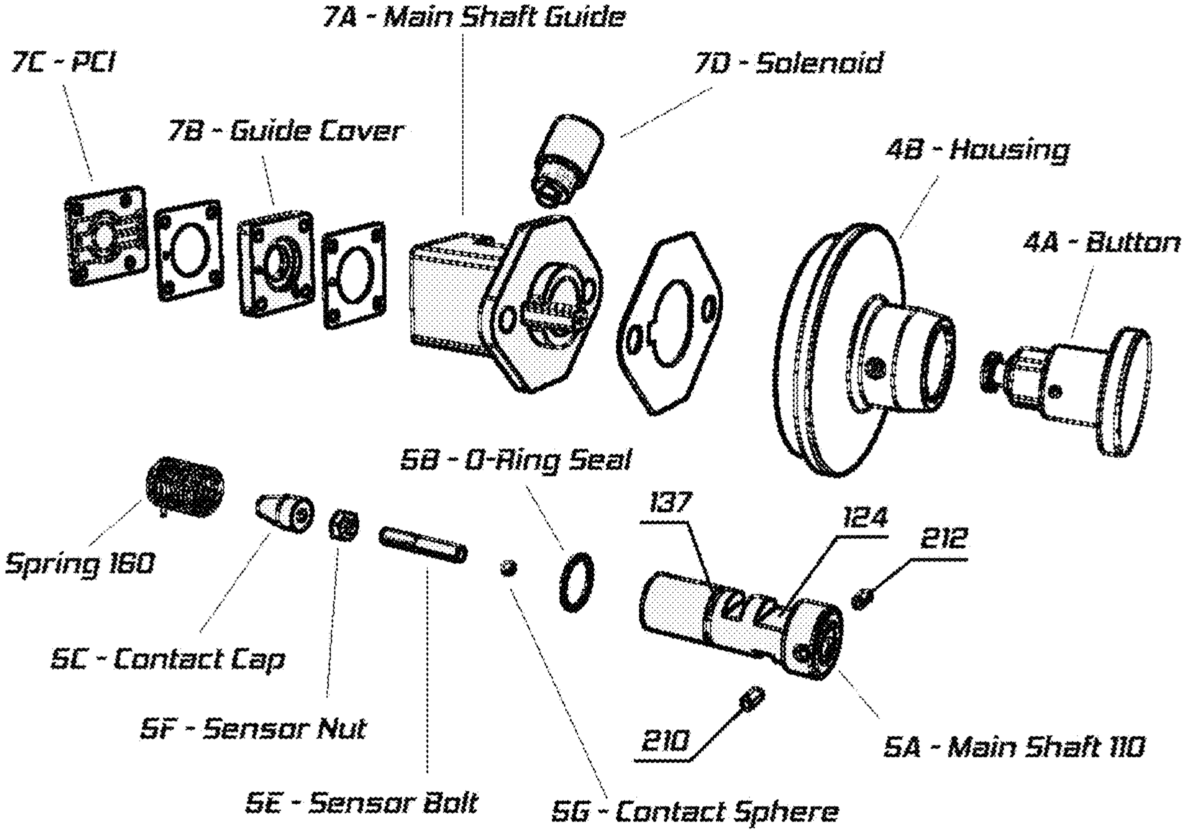

FIGS. 17 and 18 illustrate the activation of the closing sensor. Printed circuit board 7C can preferably be provided at the back end of lock 110 and seals or encloses guide cap 7B. PCI 7C can be provided with a switch, which can be preferably centrally disposed. PCI 7C and Guide cap 7B both can be bolted or otherwise secured to an inner support of guide 7A. By moving linearly in both directions (inwards and outwards) inside the Axle Guide 7A, a back end of main shaft 111 can be introduced through a hole in Guide 7A and Guide cap 7B which aligns main shaft 111 causing the back end of main shat 11 to be aligned with the center of the switch provided with PCI 7C, A contact sphere 5G can be in a bottom hole of main shaft 111, which acts as a bearing base for one end of a sensor screw/bolt 5E. The other end of bolt 5E can have a contact hood 5C preferably resting on a nut or other object/protrusion 5F that can serve as a base for hood/cap 5C. Spring 160, in addition to contracting when main shaft 111 is moved inward, also preferably exerts a torque force on main shaft 111 causing the main shaft to rotate. Spring 160 preferably surrounds contact hood 5C and at least a portion of sensor screw 5E.

When button 4A is depressed by moving Main Shaft 111 inwards, Contact Hood 5C (which can be preferably made of a flexible material), presses and activates the switch preferably located in the center of PCI 7C. As contact hood 5C is pressed and made of a flexible material, a friction contact surface is created between the switch and hood 5C. As the pieces can be preferably joined together in a single assembly, contact hood 5C when pressed to/against the switch on PCI 7C, causes both rotors to be rotated independently of main shaft 111, since otherwise spring 160 would be able to carry the torque on the latter and in turn the latter could work with the plates.

Figure 19:
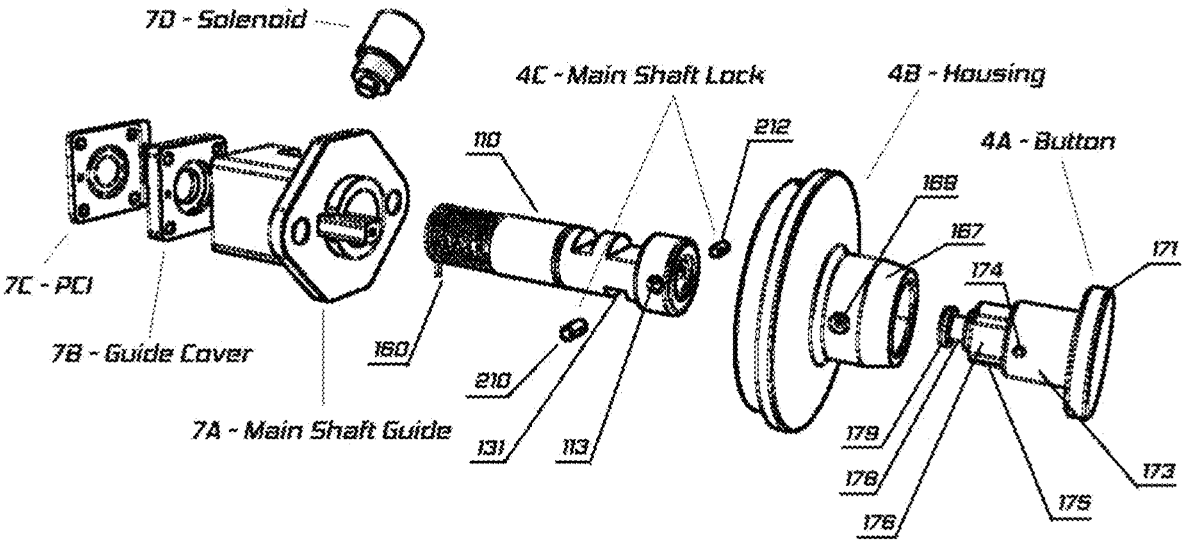
FIG. 19 illustrates how certain components of the locking device provide protect from the elements/environment for certain internal parts of the locking device in accordance with the present disclosure.
Figure 20:
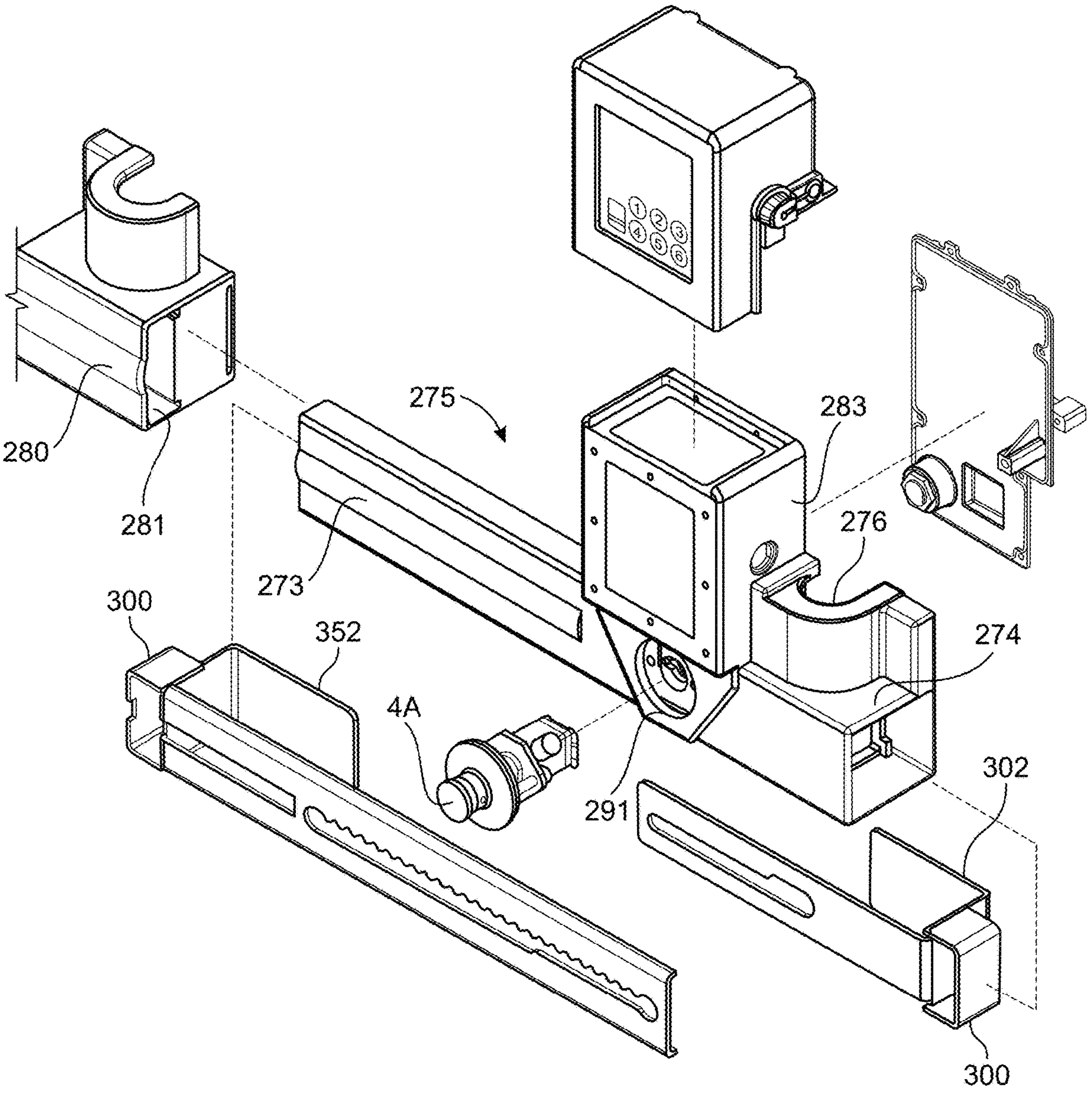
FIG. 20 illustrates an exploded view of the various preferred components for the novel locking device in accordance with the present disclosure.
Figure 21:
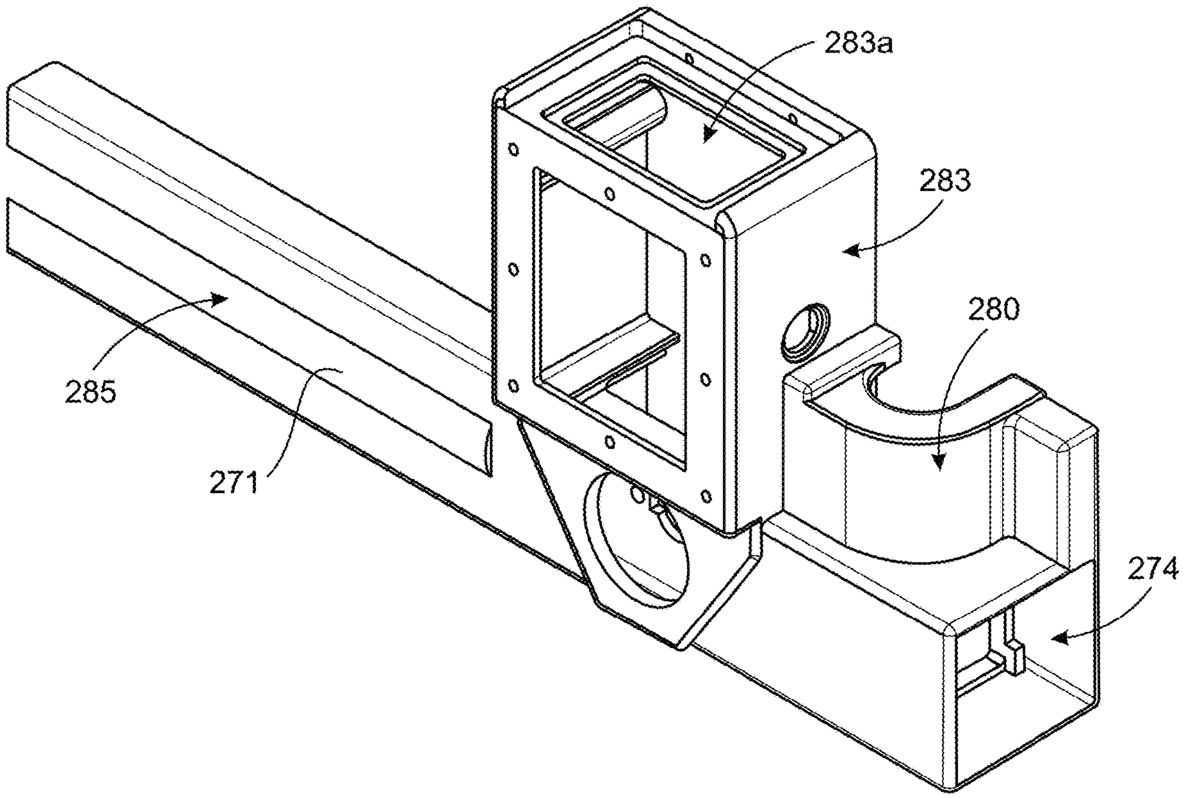
FIG. 21 illustrates a front perspective view of the main frame component for the novel locking device shown in FIG. 20.
Figure 22:
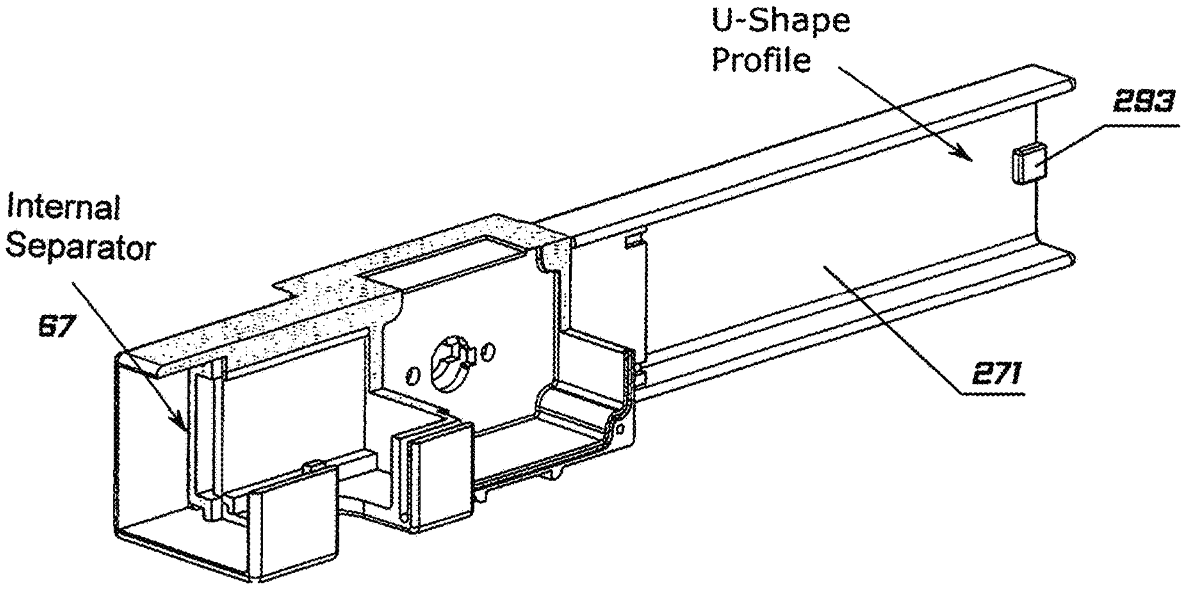
FIG. 22 illustrates a back perspective view of the guide rail portion of the main frame shown in FIG. 21.

FIG. 19 illustrates how the internal parts of locking device 100 are protected from the elements and other environmental factors. To protect against the elements and other environmental factors such as water and dust, at least certain internal parts of lock 110 can move through the Axle Guide 7A and also protecting internal the electronic components inside lock 110, several sealing gaskets can be provided. As non-limiting examples, sealing members or gaskets can be provided in the form of a Shaft Guide Film, a Guide Cover Film and a PCI Film to seal several flat surfaces. The Shaft Guide Seal can seal the base of Main Shaft Guide 7A and the Guide Cover Film and PCI Film seals can seal the back of guide 7A and printed circuit board 7C, making a sandwich with Guide Cover 7B. Main shaft 111 in a rear central part after the two channels 122 and 124 can be provided with a full/entire circumference channel/groove for housing an O-ring 5B. O-ring 5B seals the central cavity of the Main Shaft Guide 7A, and O-ring 5B moves along with main shaft 111 as main shaft 111 travels during use of locking device 100.

FIGS. 20 through 44 illustrate the various components of locking device 100 as a whole and with certain figures illustrate specific components of locking device 100. Locking device 100 can serve as a safety bar for preferably securing the shipping container doors having locking bar systems, such as, but not limited to, standardized ISO locking bar systems.

Locking device 100 can be provided with one or more of the following features: (1) it can be placed and removed easily and intuitively, without the need for special tools; (2) in can be placed in the locking bar of each door, preventing them from being opened separately or as a whole, and also includes a structural frame of solid design that protects lock 110; (3) it can be adjustable to different separation measures between the locking bars of each of the doors, which can occur based on different types of container design; (4) it can cover the guides that fix the locking bars to the doors similar to those used in the containers, in a way that hinders the removal of locking device 100 and if unauthorized removal or detachment occurs, evidence of such removal should be apparent and discoverable; (5) an external structural frame 270 of locking device 100 can protect the mobile parts contained within frame 270 also, J-plates 300 and 350 (also referred to as "closing claws" in conjunction with frame 270 sandwiched and contain the locking bars and help to block the locking bars; (6) the structure and design of frame 270 can contribute to the robustness of locking device 100, which further acts as hinderance and/or deterrent for a thief to try to remove locking device 100 once it is placed in or secured to locking bars 50; (7) locking device 100 can be portable and relatively light; (8) locking device 100 can have a modular design facilitating the removal of specific parts needed repair, maintenance or replacement without requiring the user to replace the entire locking device 100; (9) locking device allows for independent adding of a lock providing safe opening and closing; (10) locking device 100 can be provided with an electronic control allowing for (a) Communication to a server via GPRS or Satellite, (b) opening and closing of lock 110/locking device 100 using a keypad or remotely from a tracking software on a desktop or mobile device, (c) GPS tracking, (d) sensors that allow a user, operator, container owner, etc. to know the status of locking device 100 and the doors it secures, (e) Long-life batteries differentiated by function, and (f) movement energy charging system.

Locking device 100 can be generally composed of seven main parts that can be interrelated to each other, which can include a main frame 275, first plate 300, second plate 350. Lock system 110, an electronic housing seal, a protection cover, and a frame member 280 which is movable along a portion of main frame 275 (See FIG. 20).

FIGS. 21 through 37 illustrate main frame 275 and its interaction/attachment with other components/parts of locking device 100. Preferably main frame 275 can be of a single body construction and having multiple functional parts, including, without limitation as a guide rail or arm 271, locking bar coupling frame 274, a locking bar guide protector located above coupling frame 274 and an electronic and locking housing 293 having a central passageway **283*a* (see FIG. 21**).

Guide rail/arm 271 can have a U-like profile shape and can be designed or constructed of material making it difficult to bend. Its profile shapes creates and interior space that frames/encloses and defines a travel path for portions of plates 300 and 350 and the plates are permitted to move within the interior of arm 271 prior to locking device 100 being secured and locked to locking bars 50 of the doors of the shipping container. Within the interior of guide arm/rail 271 a separator 267 (FIG. 22) which channels the displacement of each blocking plate 300 and 350 and keeps the plates from running into or hitting/contacting each other during use, which could affect proper use of locking device 100.

Figure 23:
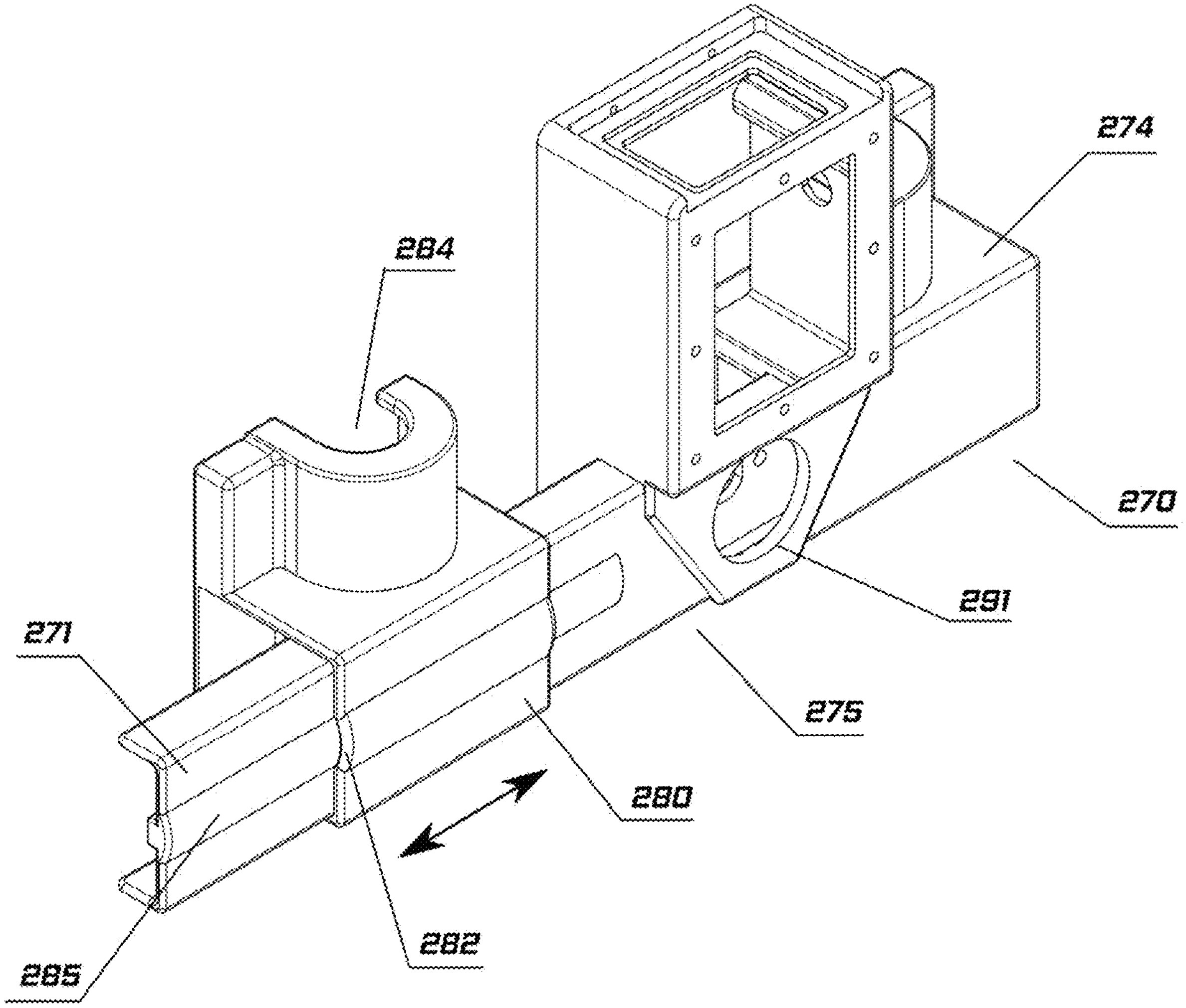
FIG. 23 illustrates a front perspective view of the main frame and movable frame components for the novel locking device shown in FIG. 20.

The outside of an arm portion of guide rail 271 can act as a support for movable frame of regulation, which can be adjusted for the position where it can be attached to the locking bar of the other container door (FIG. 23). A track 285 in the form of an arc or semicircular cross-sectional shape can be provided along an outer surface of the arm of guide rail 271. A portion of track 285 can be received within a similar shaped channel 287 of movable frame 280 and can help to guide frame 280 while it travels back and forth along the arm portion of guide rail 271 when sizing locking device 100 to container door bars 50.

Figure 24:
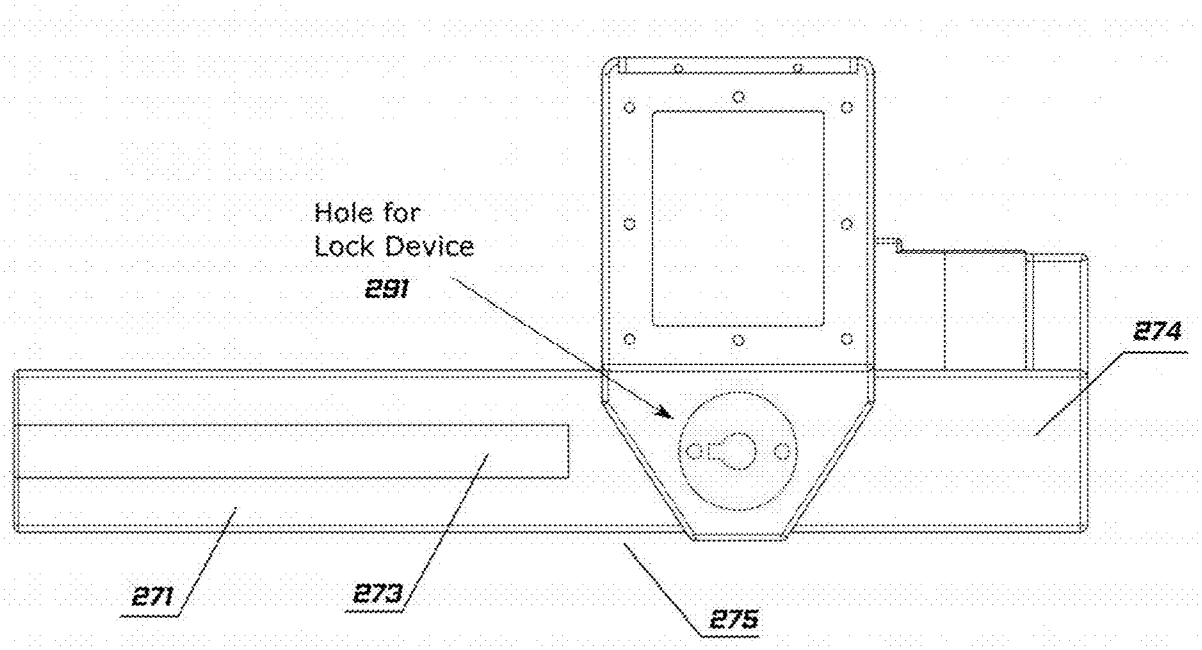
FIG. 24 is a front view of the main frame component for the novel locking device shown in FIG. 20.
Figure 25:
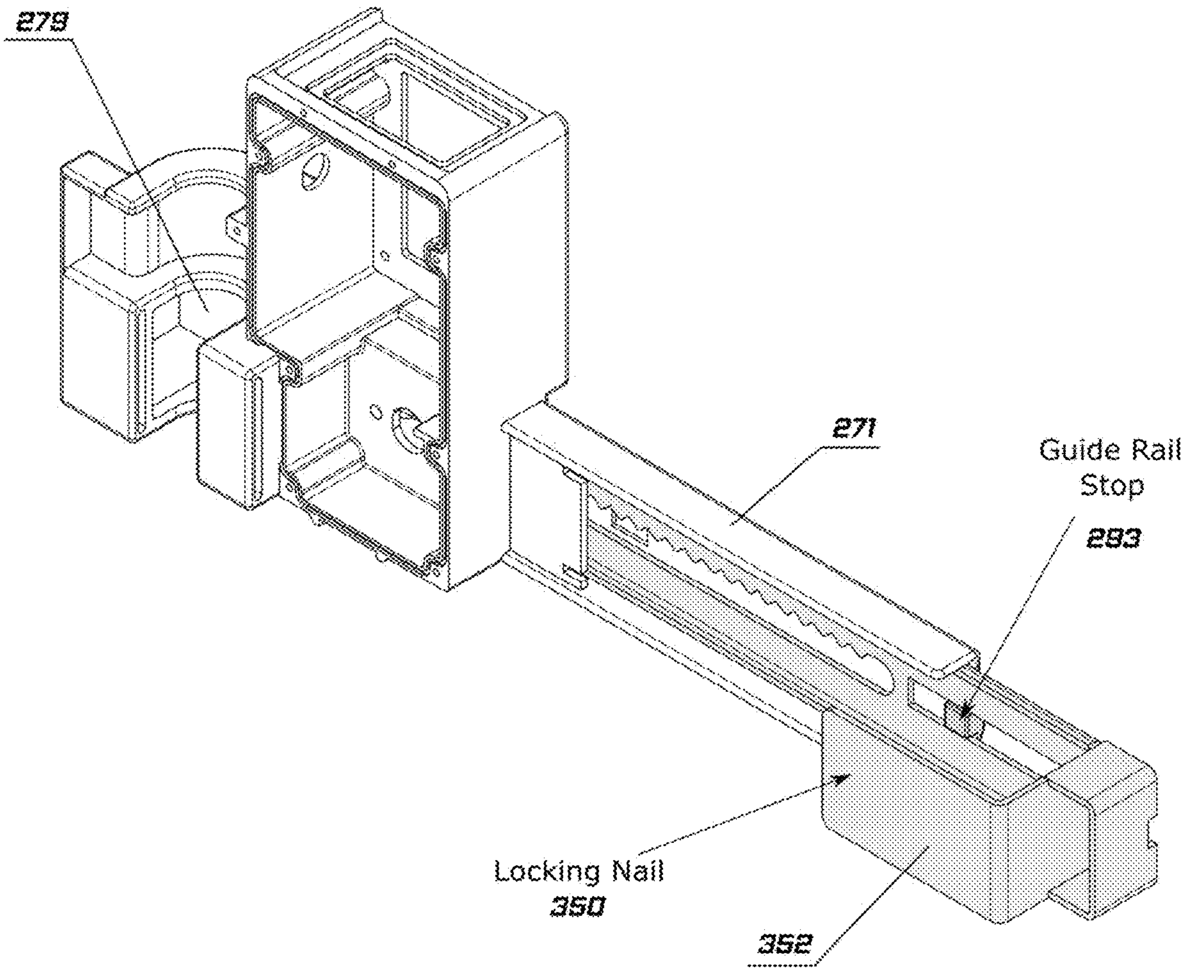
FIG. 25 illustrates a back perspective view of the main frame and one of the plates for the novel locking device shown in FIG. 20.
Figure 26:
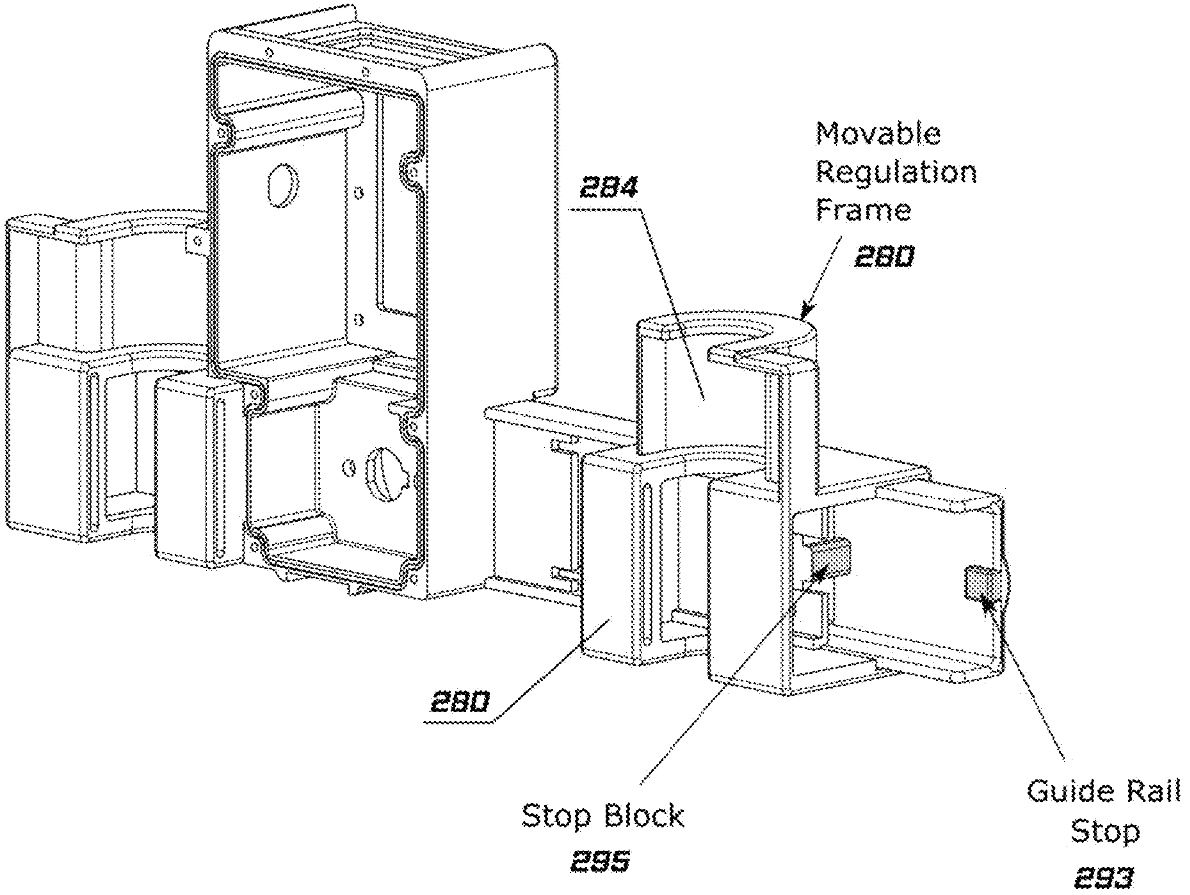
FIG. 26 illustrates a back perspective view of the main frame and movable frame components for the novel locking device shown in FIG. 20.
Figure 27:
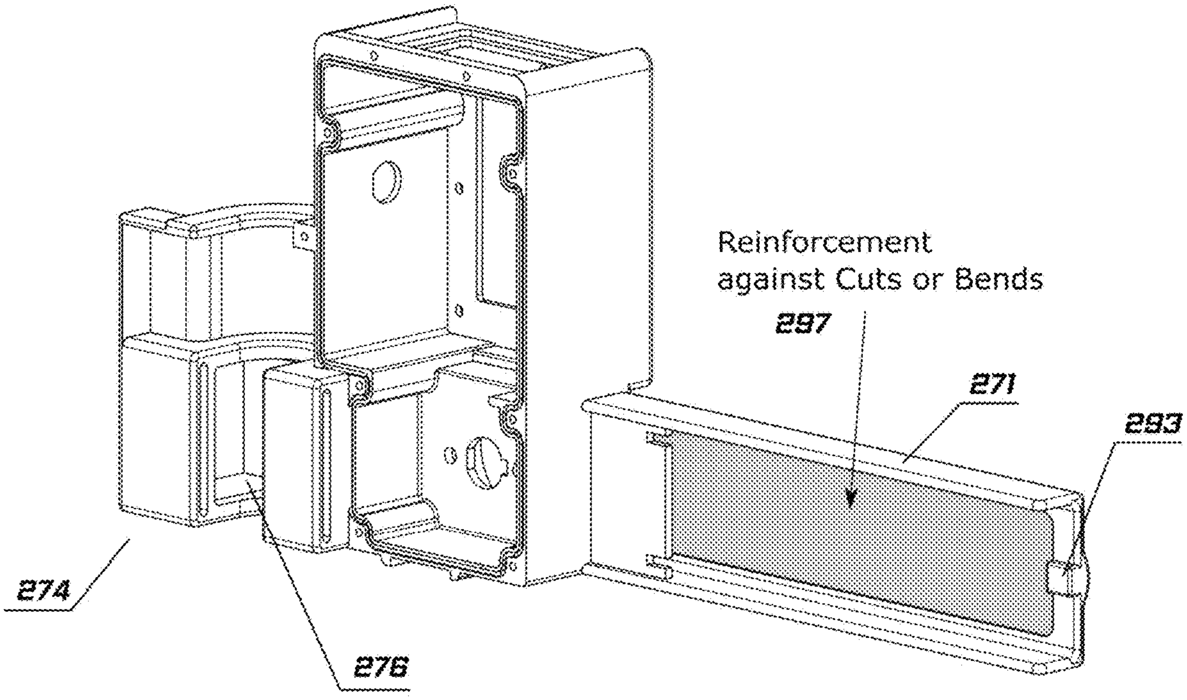
FIG. 27 illustrates a back perspective view of the main frame component for the novel locking device shown in FIG. 20.

As seen in FIG. 24 a preferably central hole 291 in which a portion of lock 110 is housed or inserted through can be provided and positions lock 110 to allow lock 110 to interact with plates 300 and 350 during normal operation of locking device 100 (i.e. plate 300 runs through lock channel 122 and plate 350 runs through lock channel 124. At an opposite outer end of the arm portion, preferably towards the center of the "U" can be provided a stop member/protrusion or guide rail stop 293 and stop block 295 which interacts or otherwise comes into contact with plate 350 and the movable regulation frame 280, respectively, and prevents both members from sliding out or off rail 271. As seen in FIG. 25, protrusion 293 is received within a channel of locking plate 350 and plate 350 is preferably only able to be pulled outward to the point where protrusion 293 contacts one end of the channel which prevents plate 350 from being pulled and further outward and thus retaining it to guide rail 271. FIG. 26 shows stop block or protrusion 295 acting as a stop member for movable frame 280. Stop block 295 can be provided on movable member 280 and contacts an inner portion of plate 350 and/or guide rail stop 293 and prevents movable frame 280 form being slid any further outward along arm 271. As seen in FIG. 27 a rigid material insert 297 can be secured within the arm portion of guide rail 271 to reinforce and/or strengthen guide rail 271 making it harder to cut or bend. In one non-limiting embodiment, insert 297 can be constructed from a tungsten carbide material, though such is not considered limiting and other strong and/or rigid materials can be used for insert 297 and are also considered within the scope of the disclosure. Preferably, the material used for insert 297 can be at least as hard/rigid or harder or more rigid than the material used for guide rail 271.

Figure 28:
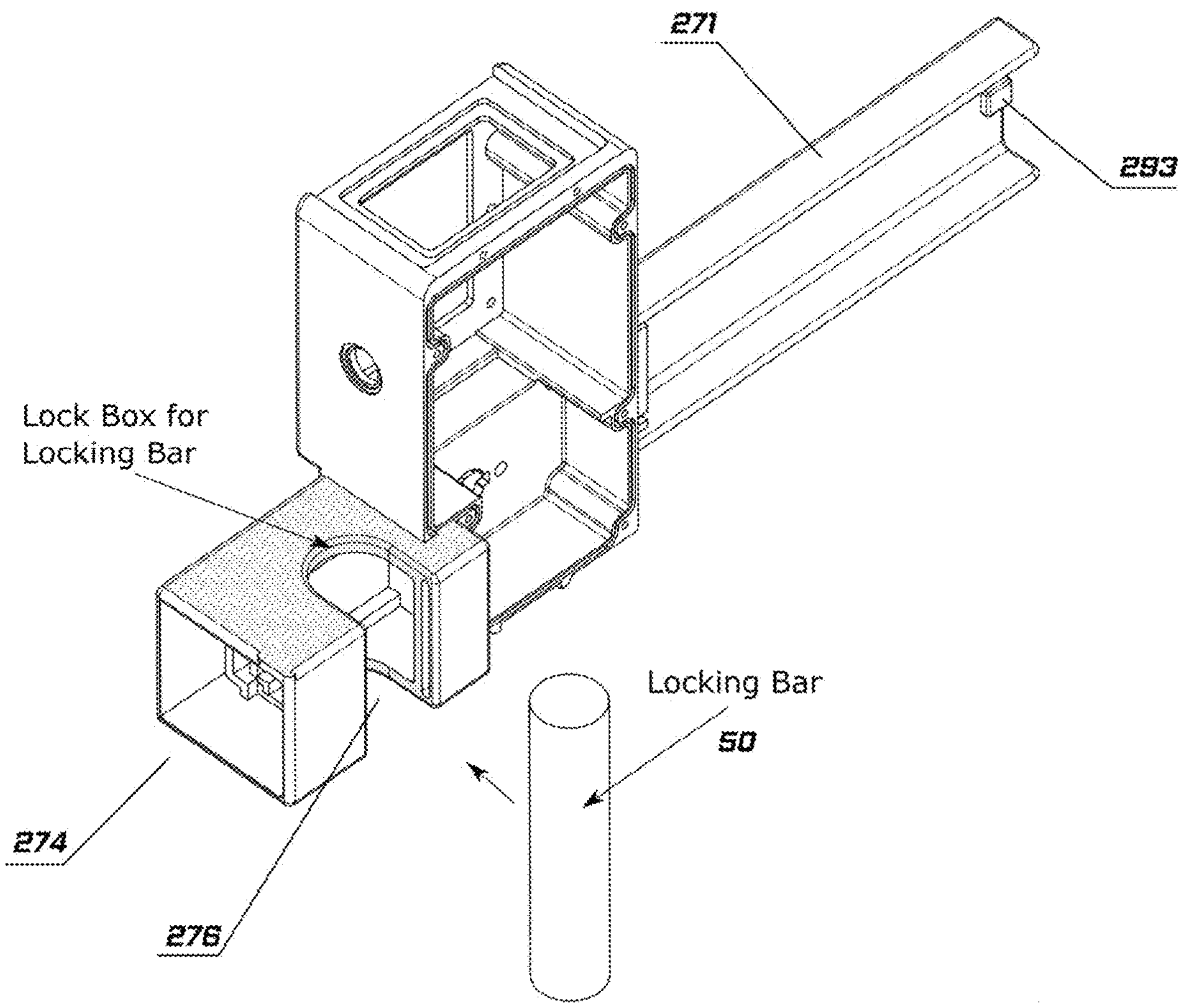
FIG. 28 illustrates a back perspective view of the main frame component and a portion of a locking bar in accordance with the present disclosure.
Figure 29:
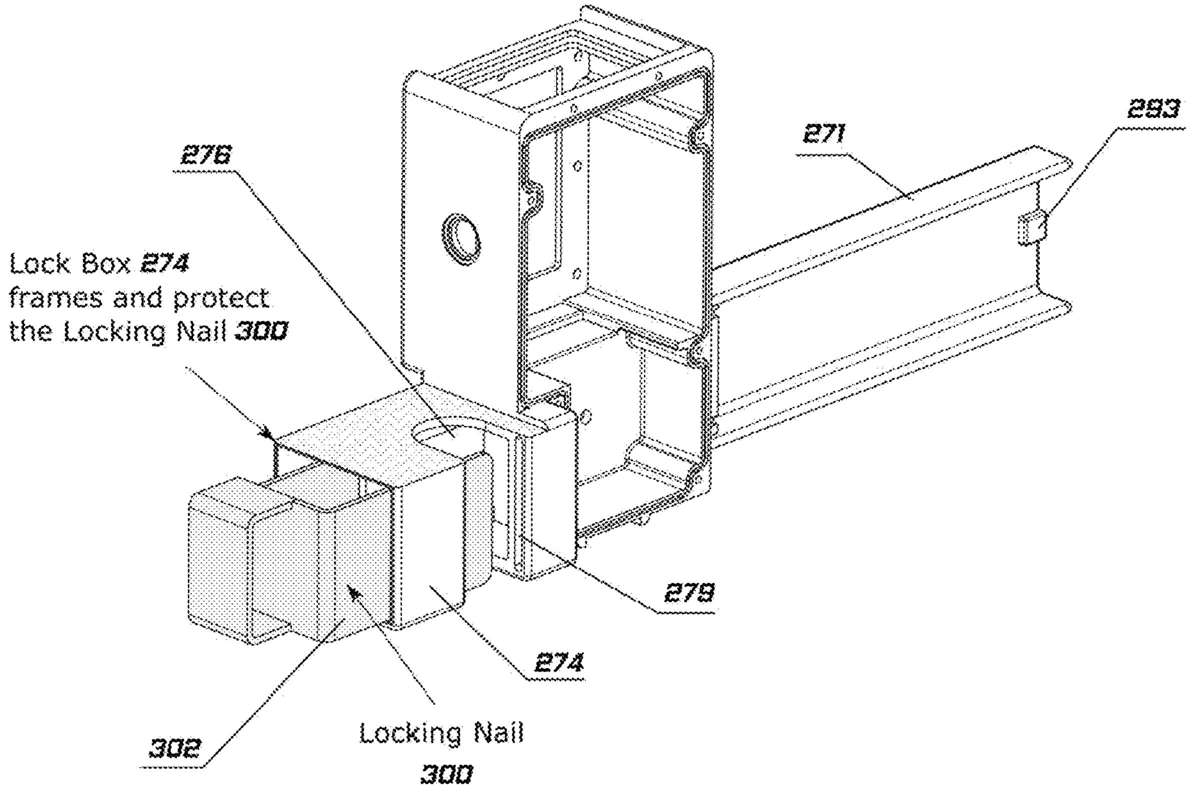
FIG. 29 illustrates a back perspective view of the main frame component and one of the plates for the novel locking device shown in FIG. 20.
Figure 30:
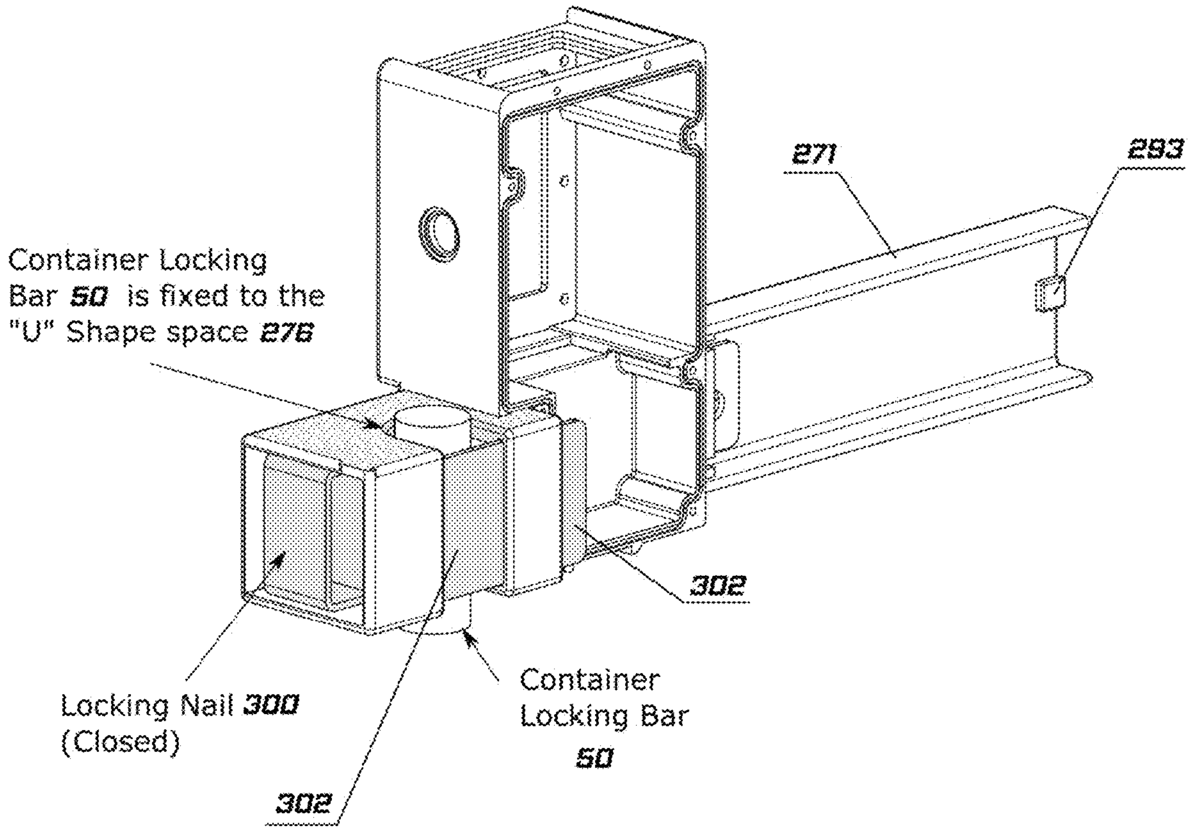
FIG. 30 illustrates a back perspective view of the main frame component and one of the plates shown in FIG. 29 enclosing a portion of the locking bar in accordance with the present disclosure.

The opposite end of main frame 275 from stops 293 and 295 can be preferably provided with a hub or lock box 274 (See FIG. 28). In use, hub 274 in conjunction with plate 300, fixes and hold main structural frame 275 securely in or to one of the locking bars 50 on the container door. Hub 274 can be rectangular in shaped, though not limiting, and can be provided with a preferably "U" shape opening or cutout 276 that can affect three of the four walls that forms it, (upper, lower and rear walls). Locking bar 50 can be inserted into cutout 276 until it meets an inner end of cutout 276 (i.e. bottom of the "U" shape) and with plate 300 (in a closed position) closing up the open entrance of cutout 276 (See FIG. 30), the inserted locking bar is contained within cutout 276. Hub 274 also helps to protect plate 300 against cutting tools, as the plate 300 is hidden within main frame 275 in use (See FIGS. 29 and 30). Thus, locking plate 300 in its closed position is protected by frame 275 and also obstructs or prevents container locking bar 50 from exiting out of cutout 276.

Figure 31:
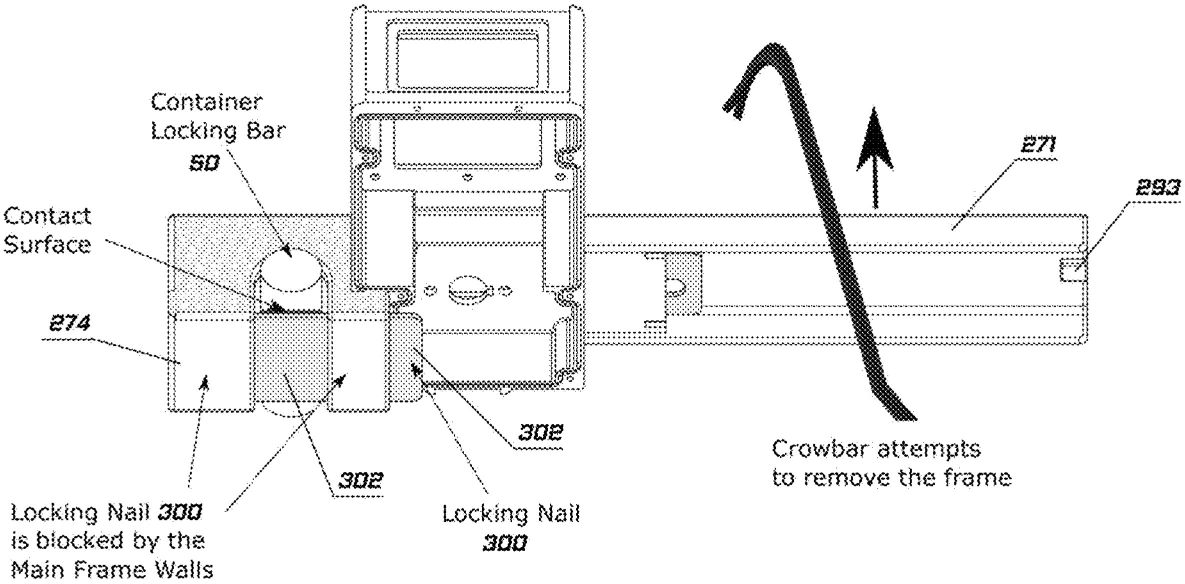
FIG. 31 illustrates a back perspective view of the main frame component and plate of FIG. 30 enclosing a portion of the locking bar along with an attempt to remove the main frame through use of a crowbar.
Figure 32:
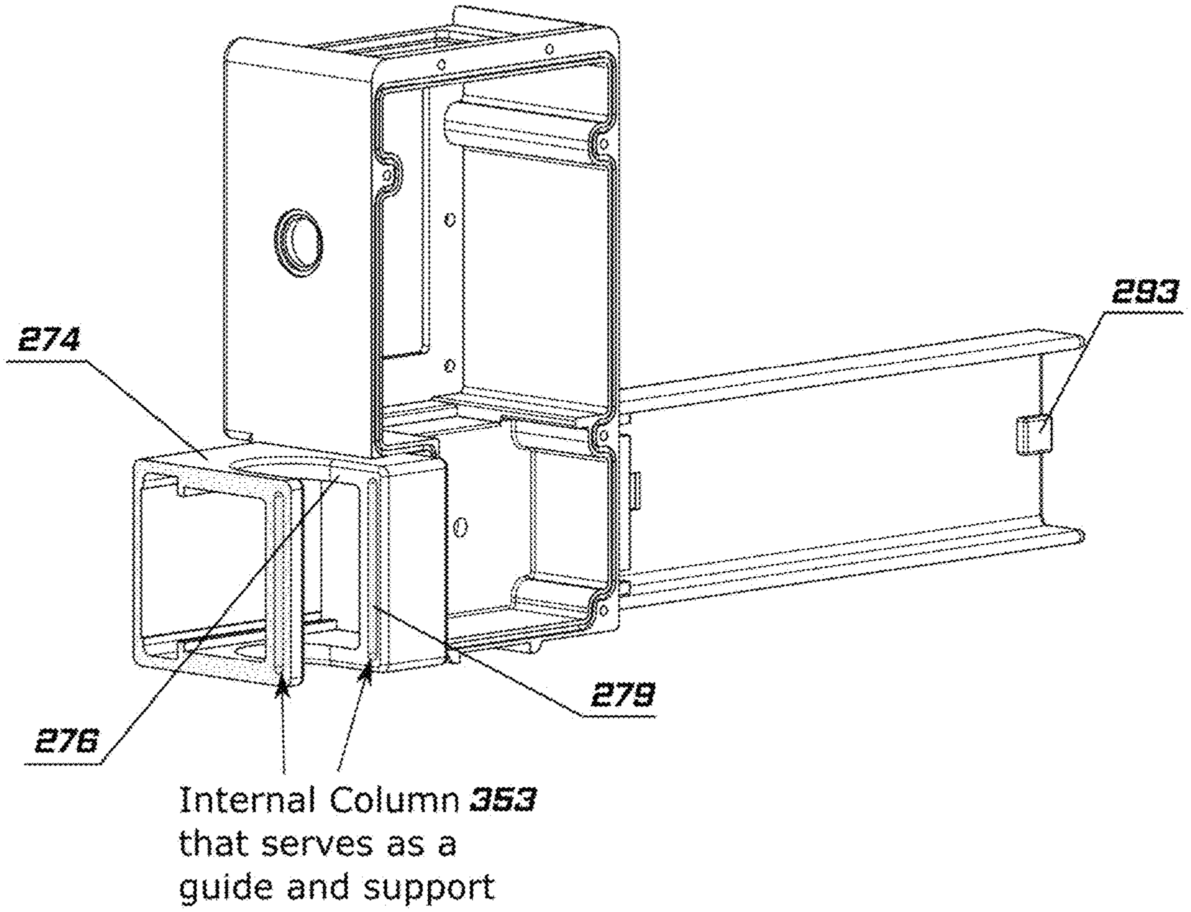
FIG. 32 illustrates a back perspective view of the main frame component for the novel locking device of FIG. 20.

As locking plate 300 is within frame 275 during use, a strong and secure locking of device 100 to locking bar 50 can be provided. As seen in FIG. 31, if a person tries to force locking device 100 with a lever type tool/crowbar while trying to open or remove locking device 100, the face of plate 300 rests or contacts an inside face of the rectangle wall of guide rail 271 to support and reinforce plate 300. To support/reinforce the portion of hub 274 that defines U-shaped opening 276, one or more internal columns 353 can be provided and can extend from an upper wall of hub 274 to a lower wall of hub 274. The columns can cross perpendicular to a certain separation of the posterior wall for hub 274. This wall can form a channel/slot opening between both frames, serving as a guide and protection to the blocking plate that moves and is inserted through such channels (See FIG. 32).

Figure 33:
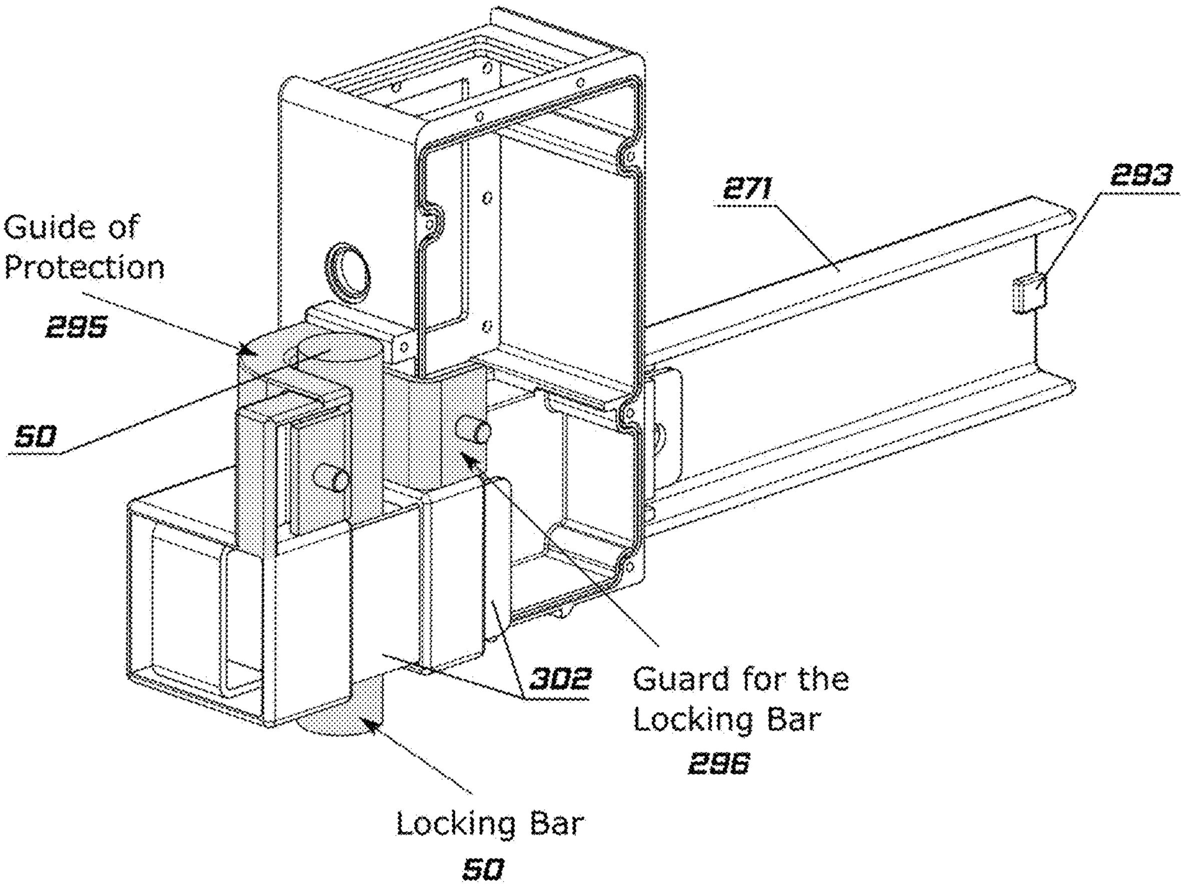
FIG. 33 illustrates a back perspective view of the main frame with locking bar protector for the novel locking device of FIG. 20 and enclosing the locking bar in accordance with the present disclosure.
Figure 34:
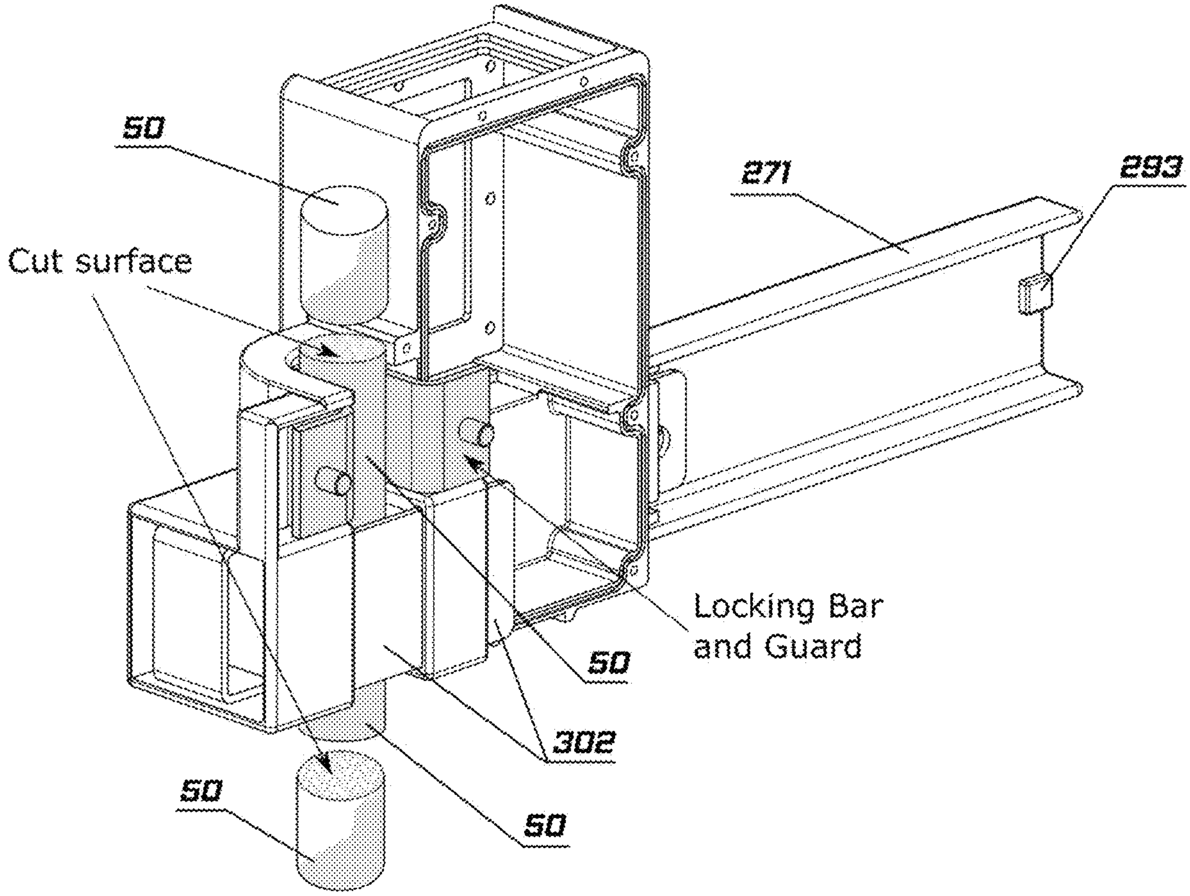
FIG. 34 is another back perspective view of the components of FIG. 33 illustrating an attempted removal of the locking device through cutting of the locking bars.

As seen in FIG. 33, a protective guide 295 can be positioned on the top of hub 274. Guide 295 provides additional protection against tampering or attempting cutting of container locking bar 50. A similar shaped U-shaped channel can be provided with guide 295 that aligns with and can be on the same axis as U-shaped channel 276 in hub 274 to allow locking bar 50 to be disposed within both U-shaped channels at the same time. Often the locking bars 50 are secured to the container doors by screws. Guide 295 is positioned such that when the locking bar 50 is within it U-shaped channel, the screws for attaching locking bar 50 to the container door are covered/hidden/blocked by the body of guide 295 so that the screws cannot be unscrewed or tampered with by an intruder or other unauthorized person, to remove the locking bar from the container door. Additionally, by preventing guide 295 from being removed from locking bar 50, a good anchoring point for securing device 100 to the container doors can be achieved. As seen in FIG. 34, if locking device was attempted to be removed unauthorized by force, the locking bar 50 for each door would have to be cut in two places (at the top and bottom of the guide) and then bar 50 removed. Thus, four cuts in the usual two locking bars 50 would be necessary, then the cut pieces removed, before locking device 100 could be removed. Thus, a relatively large amount of time and effort would be required to break into the associated container, which could act as a deterrent against attempts being made.

Figure 35:
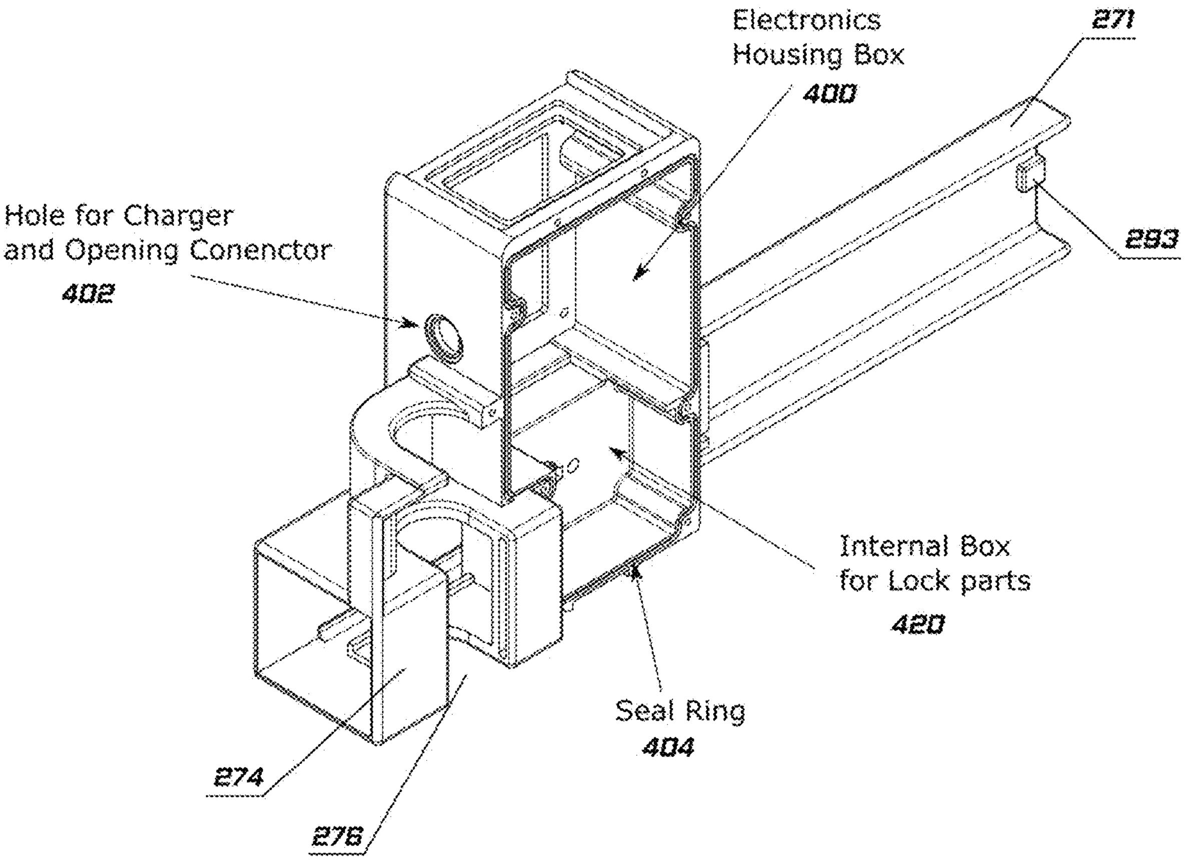
FIG. 35 is another back perspective view of the main frame component for the novel locking device of FIG. 20.

FIG. 35 illustrates an electronics housing box 400 provided as part of main frame 275. Housing/box 400 encloses a portion of lock 110 and the electronics/control electronics for locking device 100. The control electronics can be added to locking device 100 to provide added value and features/benefits for locking device 100. To house the control electronics, main frame 275 can have a preferably has a rectangular box which can include an upper area/portion and a lower area/portion. In the lower part of box 400 an internal lower area is provided receipt and housing of the portions/pieces of lock 110 that are not exposed during use of locking device (i.e. basically the various components of lock 110 other than button 4A). The lower part of box 400 can be in communication with the upper part of box 400 where the electronics can be preferably housed. As the electronics and lock parts are housed within box 400 they can achieve certain IP norm protection against water, dust and other environmental factors. The rear or back part of the side walls of box 400 can be provided with a groove or channel that can run along a back edge of box 400 for receipt of a ring seal member 430 that can be pressed into the groove/channel or otherwise secured to the back of box 400 to seal box 400 and protect the internal contents therein (lock 110 pieces, electronics, etc.) A hole 402 (with or without a chandelier) can be provided in one side wall of box 400 where a connector can be placed or secured for recharging or opening the equipment.

Figure 36:
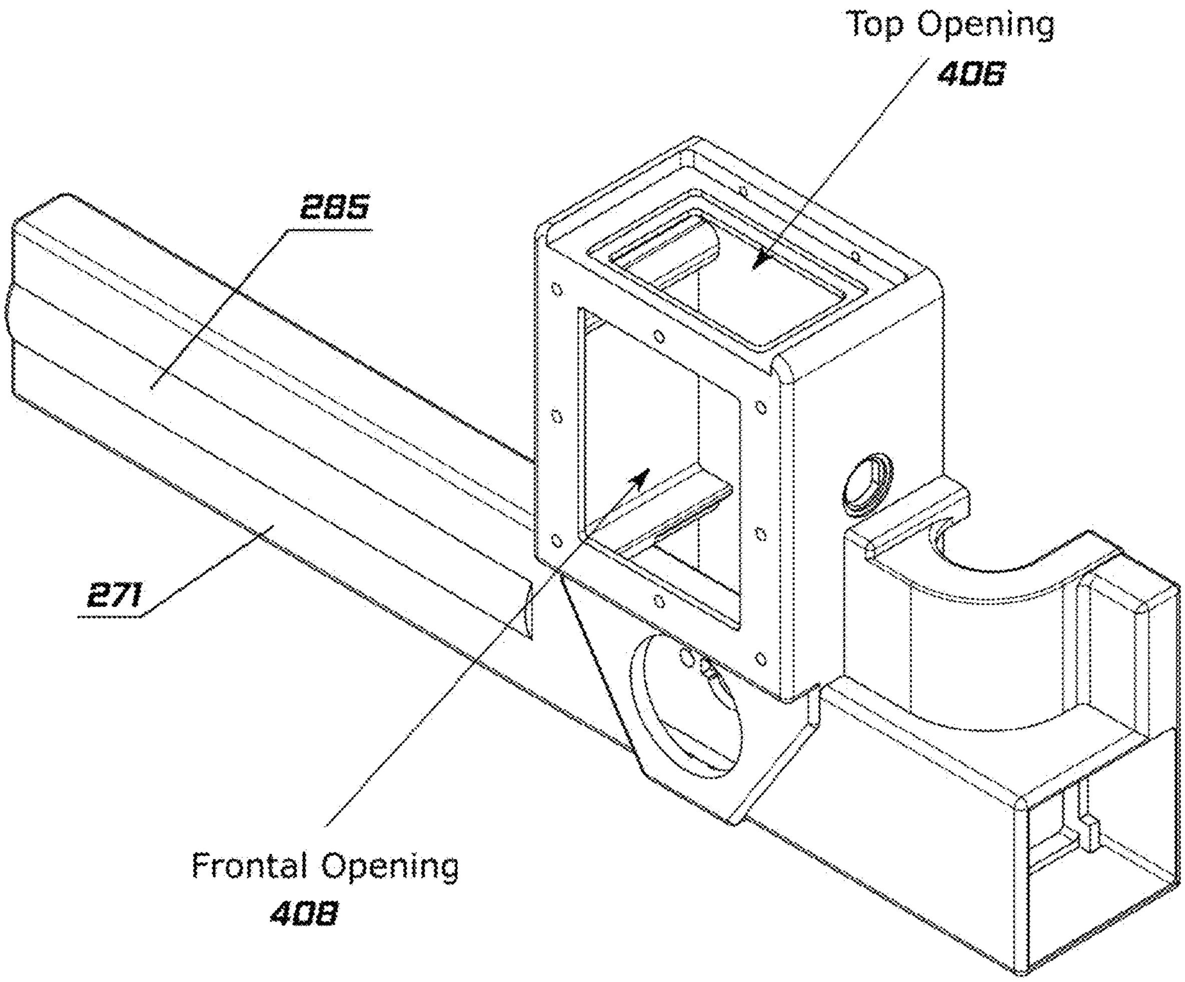
FIG. 36 is a front perspective view of the main frame component for the novel locking device of FIG. 20.
Figure 37:
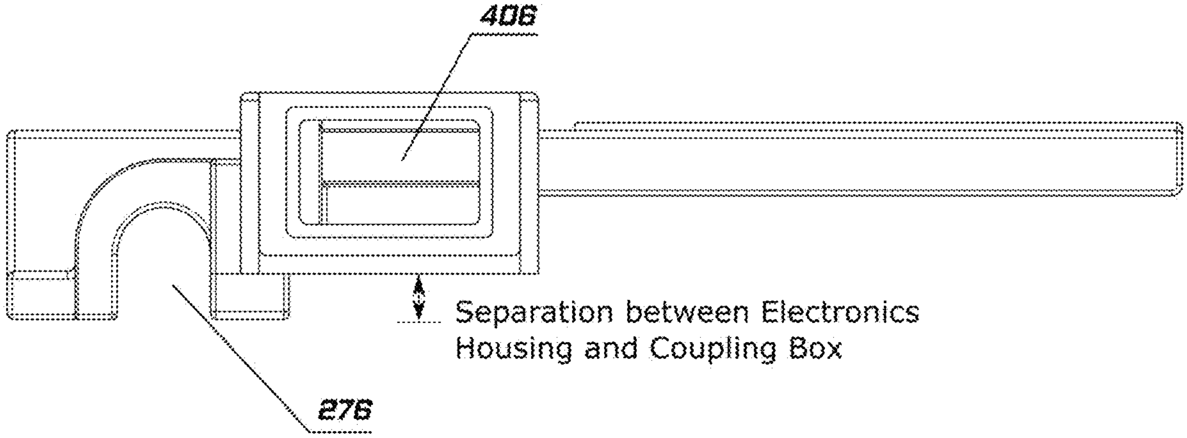
FIG. 37 is a top view of the main frame component for the novel locking device of FIG. 20.

As seen in FIG. 36, openings 406 and 408 can be provided in the front and top wall, respectively, of box 400 to allow the passage of the different electromagnetic signals received by the different antennas available to the electronics, such as those coming from the satellites (GPS) and GPRS of the cellular radio bases. These openings can be covered by resistant non-ferrous plates, that's can be bolted, glued or otherwise secured to box 400 for protecting the electronics inside the box against environmental factors or vandalism. Preferably, the depth of electronic box 400 does not reach the level/length of coupling box/hub 274, thus, providing a space in order to secure locking device 100 without hitting the central joint of the container door in the bottom (See FIG. 37).

Figure 38:
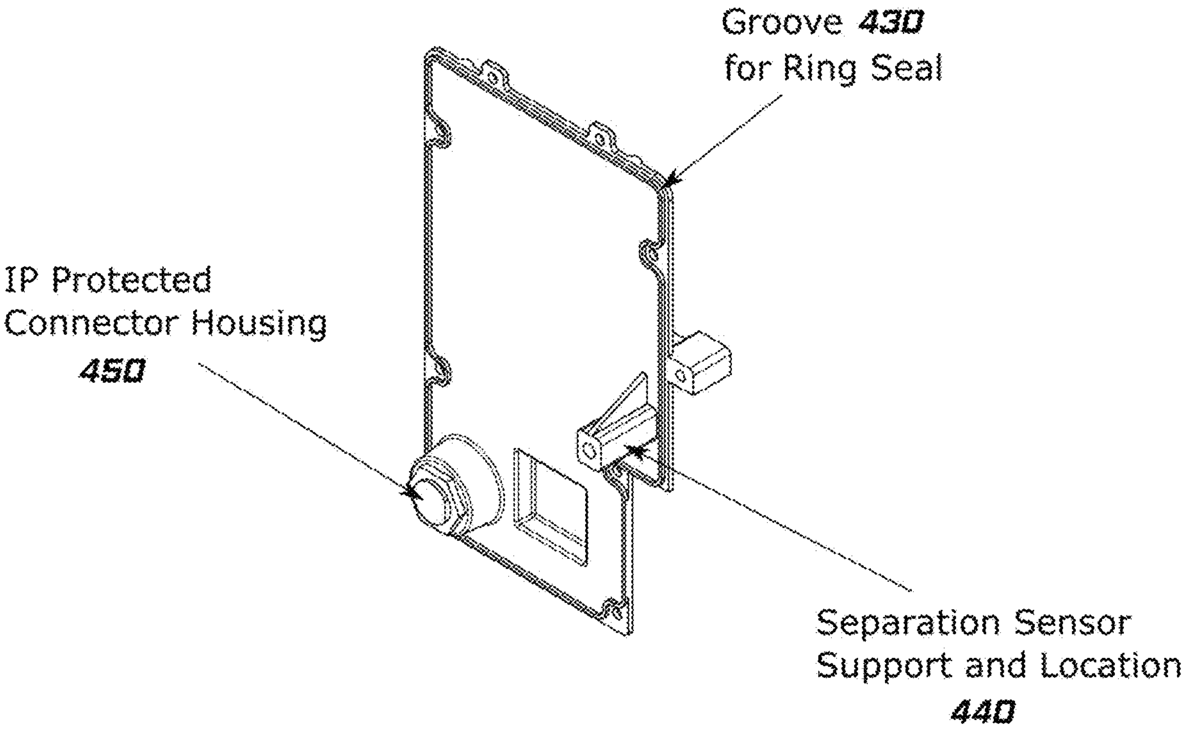
FIG. 38 is a perspective view of the electronics housing seal for the novel locking device of FIG. 20.
Figure 39:
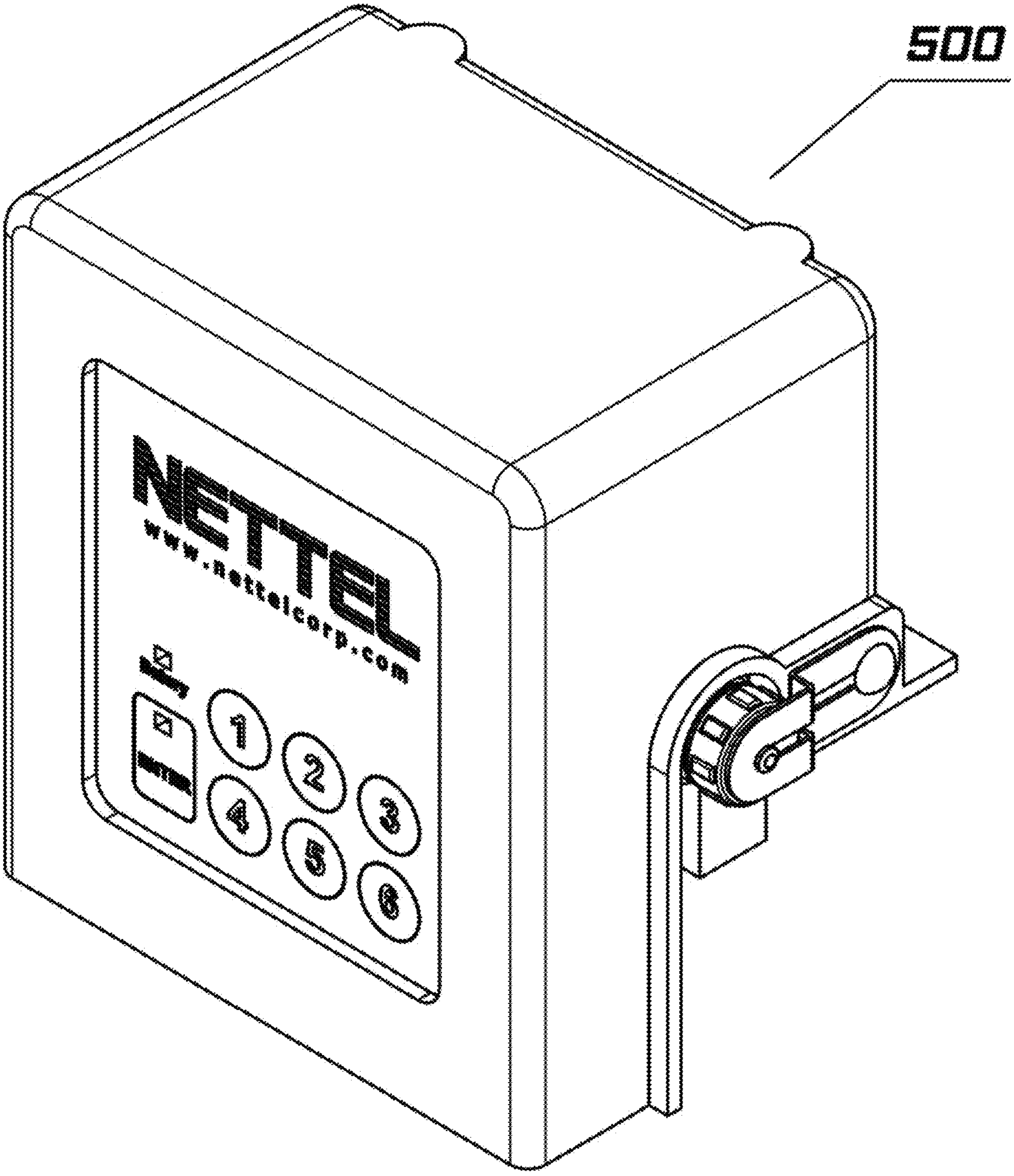
FIG. 39 is a perspective view of the protective cover for the novel locking device of FIG. 20.

As seen in FIG. 38, a seal cover 430 for sealing box 400 and protecting the housed within electronics and lock 110 parts is shown. Seal cover 430 closes and seals the back area of box 400, which contains the electronics so that the interior of box 400 is protected from external environmental factors. In one non-limiting attachment embodiment, along the periphery of seal cover 430 a tooth can be provided that engages in the groove where the o ring of electronics box 400 enters, sealing it with bolts (or other securement method) that also secure it. Seal cover 430 can have a housing with a hole, where a connector 450 with IP protection can be placed, which is protected against manipulation due to location at the back of locking device 100 making it difficult to access when locking device 100 is placed on the doors of the container. A projection is also provided that enters electronics box 400 when seal cover 430 is secured thereto. The projection supports and locates the rod that forms a separation sensor 440. FIG. 39 shows a protection cover 500 that can provide protection to box 400 and also frames a front keyboard for locking devices 100 having a keyboard. Cover 500 can be placed in or over the upper part of box 400 and in addition to protecting box 400, cover 500 also provides for an aesthetic finish to locking device 100.

Figure 40:
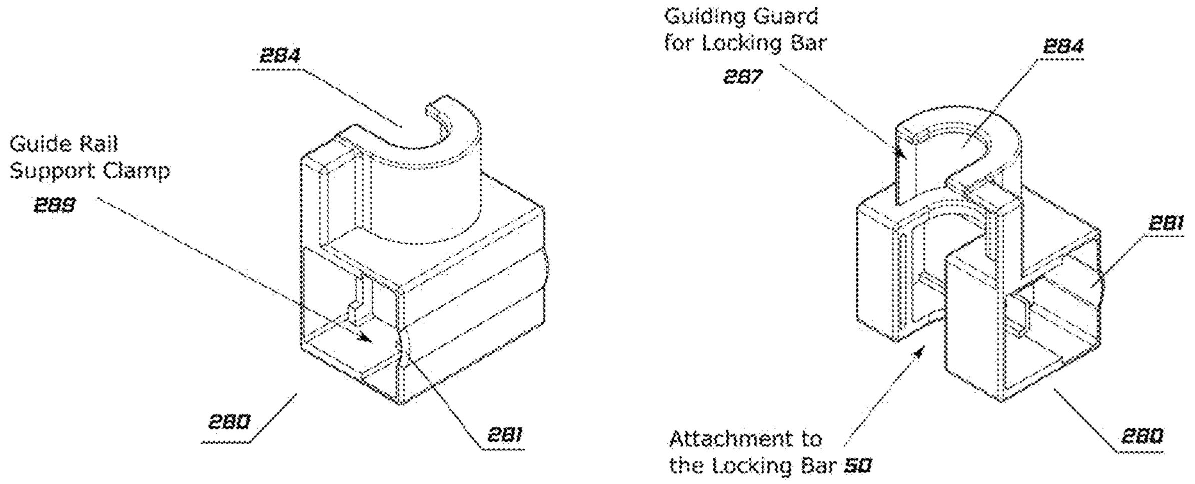
FIG. 40 are perspective views of the movable frame for the novel locking device of FIG. 20.

FIG. 40 shows movable frame 280 of regulation, which can receive the other locking bar 50 of the container doors in its U-shaped opening 284. Movable frame 280 can move freely along guide/arm 271 of main frame 275 which allows it to be adjustable, such that locking device 100 can be used with different shipping containers having locking bars of varying separation distances/lengths. How a locking bar 50 is received and maintained within opening 284 is similar to how the other locking bar 50 is received and maintained within opening 276 of hub 274, though with the other plate 350 forming the final wall of the bar 50 enclosure, as opposed to plate 300 being used for similar purposes with hub 274.

Figure 41:
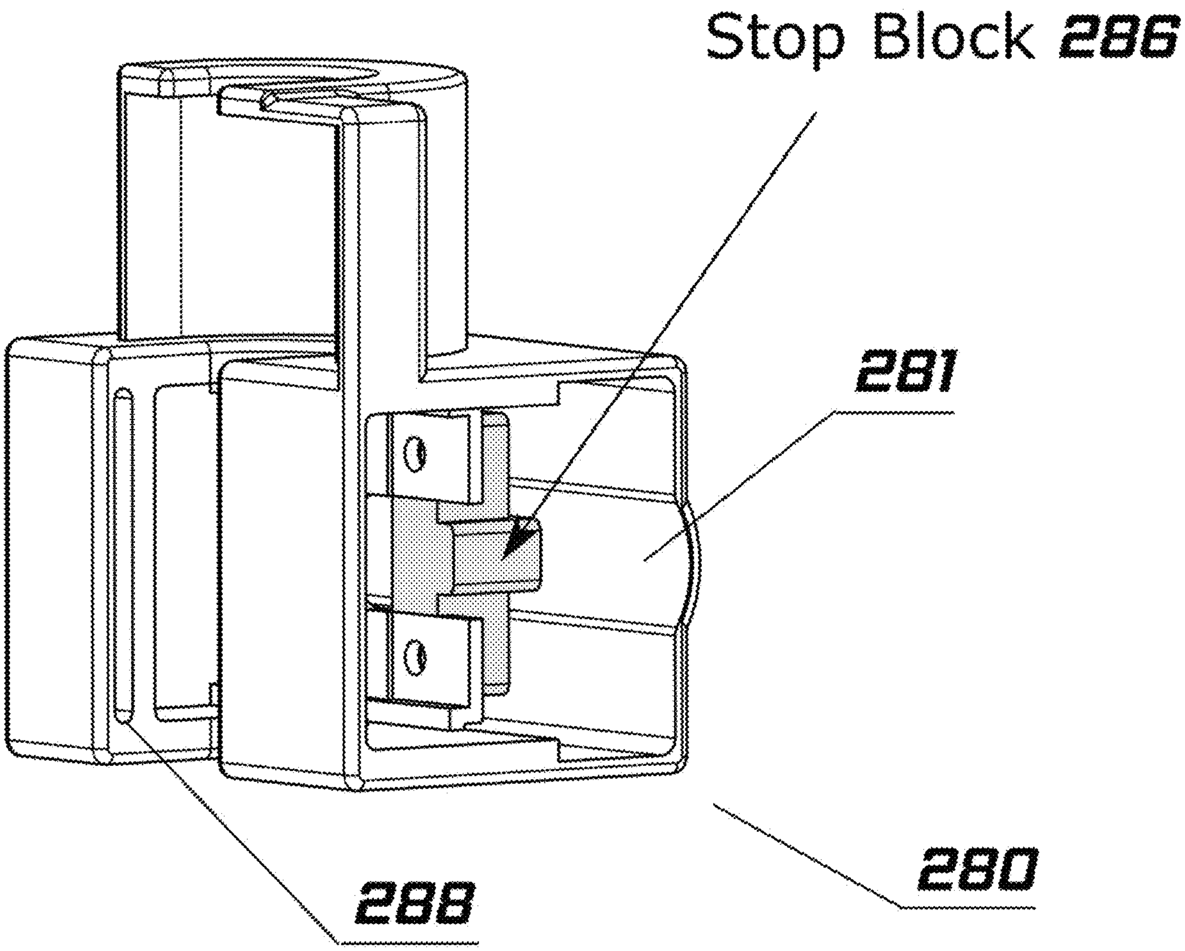
FIG. 41 is a side perspective view of the movable frame of FIG. 40 illustrating a stop block member in accordance with the present disclosure.

A guide rail support clamp 288 can be provided and can envelope main frame rail 271 and can serve as a guide and support for moving movable frame 280 along arm/rail 271. As seen in FIG. 41, a stop block 286 can be provided and preferably secured to within movable frame 280. Stop block 286 can be provided to halt any further adjustment/movement of locking plate 350, such that plate when slid within or with respect to rail/arm 271 can only extend to a certain outward position (i.e. at which stop block 286 prevents any further outward movement of plate 350) such that plate 350 is prevented from being pulled off of its securement with main frame 275. Stop block 286 can be provided with a projection or protrusion which received within a guide channel of plate 350 (i.e. the non-toothed channel) and when the projection reaches the end of the channel no further movement of plate 350 in the same direction is possible given that the projection is abutting against the end of the channel.

Figure 42:
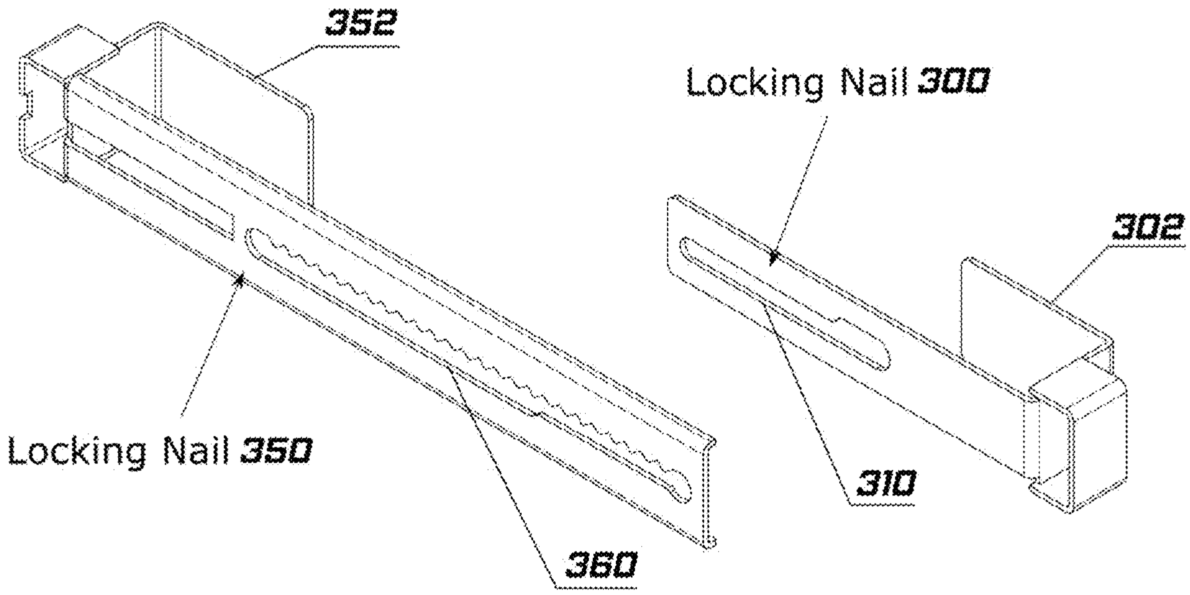
FIG. 42 is a front perspective view of the two plates for the novel locking device of FIG. 20.
Figure 43:
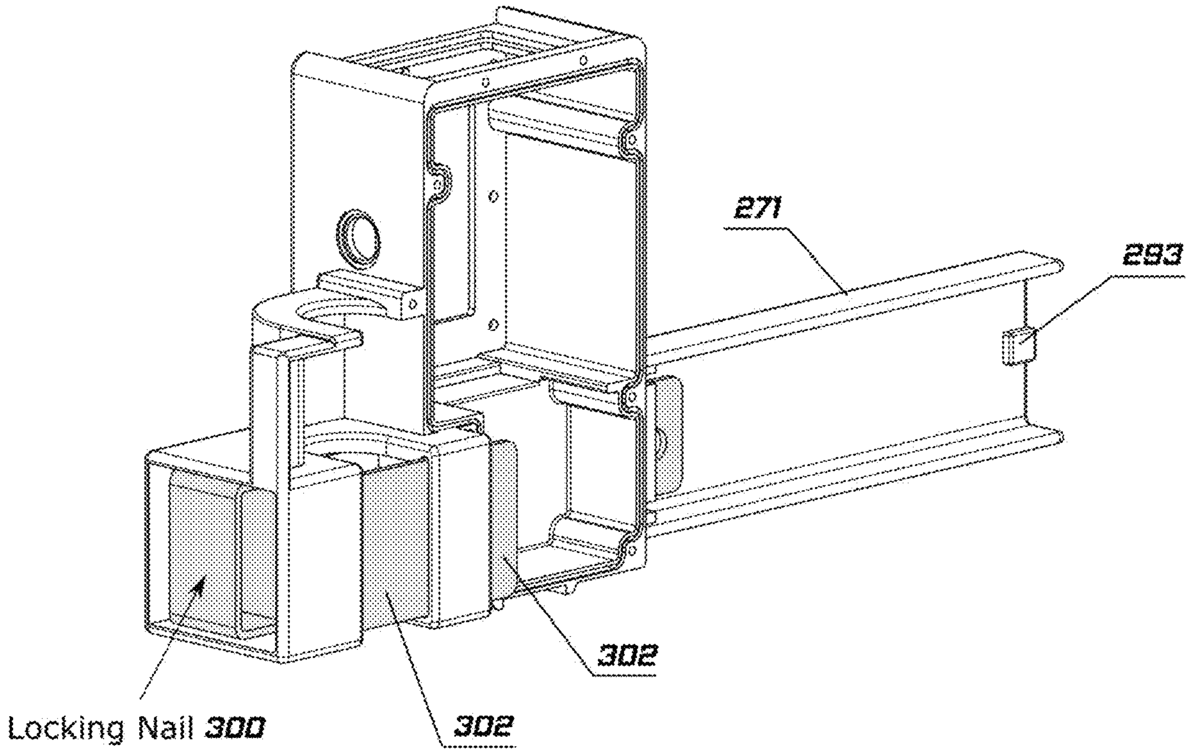
FIG. 43 is a back perspective view of the main frame housing one of the plates in accordance with the present disclosure.
Figure 44:
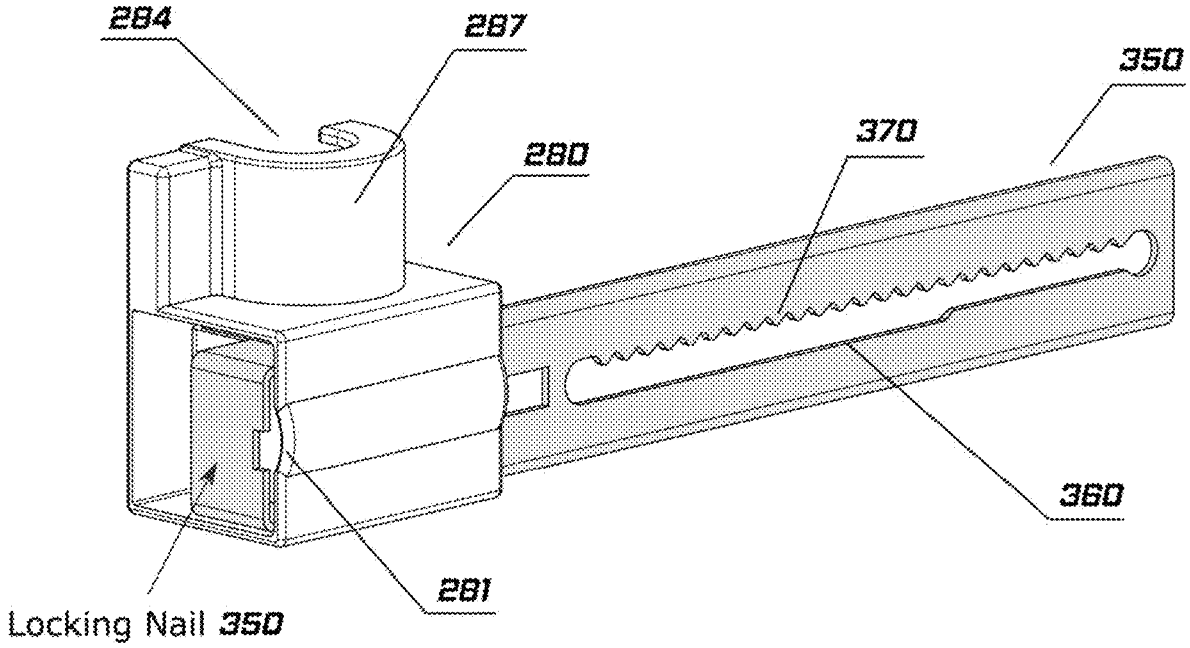
FIG. 44 is a back perspective view illustrating the mechanical relationship between the movable frame and one of the plates in accordance with the present disclosure.

FIG. 42 provides another illustration of locking plates 300 and 350, which in use preferably move inside the rectangular tubes that contain them, releasing when they are opened or blocking when they close to the locking bars 50 in both doors. As seen in FIG. 43, locking plate 300 interacts with lock 110 to preferably achieve its opening and closing, working only in those two positions (when it is closed or open) within Main Frame 275. Whereas plate 350 can be adjustable, sliding together with Mobile Frame of Regulation 280 inside the rail/arm 271 of Main Frame 275. Plate 350 preferably has a serrated channel 360 in its central part for aiding in regulating its position adapting to the separation distance of the locking bars 50 of the doors. Preferably, both plates 300 and 350 can be bent at preferred right angles (i.e. 90 degrees) to form "U" shapes at one of their ends. Given the preferred rectangular shape of plates 300 and 350 that, due to their rectangular shape, such ends of plates 300 and 350 can cover the interior space of the rectangular tubes that contain and protect them (i.e. hub 274 and frame 280) (See FIGS. 43 and 44).

As seen in the FIGS. 17 and 19, a preferred lock system 110 having interacting parts is provided and used as part of locking device 100. Preferably, the disclosed and described closing system 110 can allow for remote opening of the container lock/locking device 100.

Closing system 110 can include a button 4*a*. Preferably, button 4*a* can be cylindrical with rounded borders to permit easier grasping by a user's hand. A square (or other shaped hole) can be provided in the back of button 4*a*, which can lodge or house the coupling protrusions of a button guide 4*c*. Though the square shape of the guide protrusion and hole are preferred other corresponding shapes can be used and are considered within the scope of the disclosure. A bolt can protrude out from the center of the hole. Ultimately, the bolt will be secured to (i.e. screwed up along) a button nut 4E in order to fasten and hold button 4A and button guide 4C together. Button nut 4E can be considered to function as a fastening nut.

An external support 4B can also be provided. In one non-limiting embodiment, external support can comprise a solid metallic cylinder with a conical frontal part which facilitates the fingers grasp of the button 4A. When properly secured, button 4*a* can protrude outward from a front center area of support 4B. Support 4*b* can be provided with a centrally located aperture to allow the back protruding bolt portion of button 4*a* to be inserted therethrough for mating with button nut 4*e*. A back part of support 4B can be provided with a reduced diameter circular step in order to get a better fit with the pieces/parts that it lodges. An inside body area of the reduced diameter back part of support 4B can be provided with a plurality of drillings, cavities or apertures (collectively "drillings"). In one preferred non-limiting embodiment, three cylindrical drillings can be provided and can be preferably aligned on the same axis. Preferably, the two most external drillings/cavities can be threaded in order to received and secured (lodge) the bolts for securing an internal support 7A to support 4B. A shaft guide 7B can be fastened to internal support 7A through a plurality of bolts 7J. The shaft guide 7B can also be fastened to the external parts of the lock.

The central drilling of the plurality of drillings can be wide than the other drillings and can extend along the entire length of support 4B. The central drilling can be provided with a side slit for receipt of (i.e. sits and slides in) a head portion of bolt 4D that preferably protrudes upward from button guide 4C. In one non-limiting embodiment, bolt 4D can be screwed into a top portion of button guide 4C and can be provided to provide the linear sliding of button guide 4*c* within the central hole (i.e. central drilling) of support 4B.

As mentioned above, button guide 4C preferably moves linear and thus moves within support 4B and inside the external hold in a straight line. Button guide 4C can have a hollow, preferably cylindrical cavity, which houses or lodges the front tip of a main shaft 5A/111. The opposite side or end of button guide 4C from where main shaft 5A is inserted can be used for coupling or otherwise securing button guide 4C to button 4A.

Main shaft 5A or 111 is positioned with button guide such that it is allowed to rotate freely on its axis within the interior of the button guide 4C, while also being allowed to move linearly together with the movement of guide 4C, as a portion of anchoring bolt 4D can extend through button guide 4C and be positioned inside a cylindrical slit inside main shaft 5A. In a preferred embodiment, the base of a cylindrical tube/groove at the top of button guide 4C can be provided with a hole/opening, which can be, but is not required to be, threaded. One end of bolt 4D is secured to button guide 4C and inserted through the hole, and can extend into the interior of button guide 4C for contact and connection to main shaft 5A.

The opposite end of bolt 4D extends upward and out from button guide 4C where it is positioned or otherwise resides inside the channels in the central hole of the external hold/support (4B) where it remains during the linear movement of button guide 4C with respect support 4B based on movement caused by pushing on button 4A (which also moves linear). Thus, bolt 4D helps to keep the linear displacement of the button 4A and button guide 4C when button 4A is pushed during operation or use. Preferably, bolt 4D protrudes out from guide 4C at or near a far (away) end of guide 4C with respect to the location of button 4A. On the opposite end of button guide (i.e. end closer to button 4*a*) an external tip, preferably square shaped, protrudes toward button 4A, where it is received within or mates with a similarly shaped hole/cavity contained within button 4A. Once the external tip is properly positioned within the similarly shaped cavity within button 4A, preferably button guide 4C is prevented from rotating with respect to button 4A, especially when both pieces/parts are coupled together by the mating of nut 4E with the pin or protrusion extending out of button 4A and into central opening of support 4B.

Button guide safety pin 4D can be a bolt, such as, but not limited to, a cylindrical bolt that can fit in the corresponding hole of the button guide 4C described above located at the far side of button guide 4C with respect to button 4A. The inserted end of tip of bolt 4D preferably crosses through the body of button guide 4C to reach the interior of button guide 4C for disposal within a channel of master shaft 5A that is positioned within the interior of button guide 4C and thus fastening master shaft 5A to button guide 4C, in such a manner that the master shaft 5A is still permitted to rotate within the interior of button guide 4C, even where all pieces or parts are moving back and forth during operation or pressing on button 4A.

Master Shaft 5A/111 can be a solid cylindrical piece crossed or dissected in its central part by two preferably parallel slits opened to the depth of the diameter. These slits/channels can serve as guides for the displacement of closure plates (i.e. one slit for each closure plate). The closure plates can be two sliding J-shaped counter-positioned pieces 300 and 350 (preferably constructed from metal though such is not limiting) that move through the lock and brace the container bars 50 that are also lodged in the U shaped closures in the lock frame body. The J-shaped pieces 300 and 350 and U-shaped closure/channels 276 and 284, respectively.

On the opposite side of preferably parallel slits/channels can be provided a further channel that can be provided with a protrusion that can serve as a guide for the lower side of the slot (the serrated side) of the left closure plate. This configuration can avoid the back and forth displacement of the master shaft 5A and correspondingly can avoid the closing of the lock if all parts/pieces are not in proper position.

A forward end of master shaft 5A can be provided with a reduced diameter section that fits inside the interior of button guide 4C. The forward end can be provided with a circular channel that receives pin 4D when pin 4D is pushed or inserted in through the externally accessible hole for button guide 4C to anchor or secure master shaft 5A to button guide 4C, while still allowing master shaft 5A to rotate with respect to button guide 4C.

Behind (opposite end) the central part of master shaft 5A can be provided another reduced diameter section, creating other cylindrical channel with a longer neck, as compared to the neck created with the circular channel at the forward end of master shaft 5A. The cylindrical channel preferably receives a solenoid acting piece 7D described in more detail below. The cylinder at this end also can become a base for sitting the spring (5D) and in its center can also retain a screwed pin that hold a rubber stopper. A hole can be provided in one side of the base for inserting and holding a tip of the spring 5D. Thus, when torque is received it moves rotating the master shaft (5A)

Cap 5C, which can be preferably constructed from rubber, can be provided to cover the screwed bolt of a support shaft, where its tip enters the hole at the master shaft 5A in the center of the spring stopper. By preferably providing cap/hood 5*c* in rubber, cap 5*c* can make soft harmless pressure on the contact area of the on/off switch and can add a few millimeters of clutching flexibility in the contact adjustment.

Spring 5D is provided for multiple purposes, including (1) working in a linear sense by compressing and expanding following the back and forth movement of master shaft 5A when button 4A is pushed or freed/released during operation and (2) offering/supplying the torque that causes master shaft 5A to rotate over its axis without ever losing the positioning of the central closure plates guide channels. To accomplish these functions, both ends can be preferably anchored, one end of the spring 5D to a hole already described above in the spring hold, and the other end of spring 5D to a slot carved in the inside of the external support 4B. By being anchored at both ends, spring 5D rotates with the rotating of master shaft 5A.

Sealing O-Ring 5B, preferably a rubber wafer, can be provided and sits in a circular slit in the external surface of master shaft 5A. O-ring 5B moves with the movement of master shaft 5A inside guide 7A. O-ring 5B can press on the containing cylinder inner wall sealing the back part that contains the solenoid against possible environmental hazards, such as, without limitation, dust and water.

Contact gasket support shaft 5E can be provided and can have a screwed end that holds the contact gasket 5C) and an opposite end that enters within master shaft 5A through a hole, preferably central hole, provided at one end main shaft 5A at the platform that tops the spring. Within the hole, shaft 5E can top over a free ball bearing ball 5G. Support shaft 5E allows freedom of movement to main shaft 5A independently of the pressure exerted by the gasket over the switch.

The top of contact gasket 5F can hold the base of the contact gasket. As mentioned above, a ball bearing ball 5G can be provided and is preferably provided inside the hole that lodges/houses the end of the contact gasket support shaft in order to allow free frictionless rotation movement.

A shaft guide joint 7A provides the back support for the internal pieces of the lock. Shaft guide joint 7A can be bounded or secured to external support 4B preferably by two bolts 7H, though other conventional attachment methods can be used and are considered within the scope of the disclosure. Once shaft guide joint 7A is secured to external support 4B, the combination of these parts can create an external frame portion of the closing system 110 of the container lock/locking device 100. Inside the external frame 275 the moving parts of the closing system reside and preferably operate. Through central hole in shaft guide joint 7A the main shaft 5A is permitted to move. On one side of shaft guide joint 7A, solenoid 7D can be secured, preferably by screwing in, though other conventional securement mechanisms can be used. At the top of shaft guide joint 7A, a shaft guide lid 7B can be affixed thereto, preferably through bolts, though again other conventional securement mechanisms can be used. The shaft guide joint 7A helps to separate, support and protect the electronic components of closing system 50 from the environment.

Shaft guide lid 7B can be a section plate preferably corresponding in shape to the shape of an associated portion of the shaft guide and can be sandwiched between the two isolating joints 7F and 7G and can also be similarly shaped to joints 7F and 7G. Shaft guide lid 7B can provide support and constrain shape changes of the spring and can also be used to hold or secure one end of the spring so that the spring can receive torque when stretched on its axis. A notch can be provided in the exterior of lid 7B for holding/anchoring the end of spring 5D which will help prevent spring 5D from rotating, while the other end of spring 5D can be inserted can be fixed to main shaft 5A allowing it to create torque when main shaft 5A is rotated.

An open/close sensor 7C, which can be a printed circuit plate or board, preferably, though not limiting, shaped and sized similar to the shape and size of guide lid 7B, can be provided. Sensor 7C can overlay one side of guide lid 7B, preferably with an isolating joint 7G therebetween. Sensor 7C can be provided with a switch that aligns with the central hole running through joints 7F and 7G and guide lid 7B and the other above described components/parts. The switch/sensor can be set to an "on" state when button 4A is pressed, which causes the movable pieces for the control system 500 to moved linear inside the corresponding portions of the central holes. Part of the movable pieces that move upon pressing button 4A include the rubber stopper 5C that moves the switch (through soft contact of rubber stopper 5C with the switch/sensor 7C from movement of main shaft 5A) to the ON position to activate the electronic control of the lock and activating the locking mechanisms and also indicating that the locking mechanism is closed. When rubber stopper 5C moves out (no longer contact sensor 7C) it creates the reverse process of opening the locking mechanisms and indicating that the locking mechanism is open. Sensor 7C can be fastened to the guide lid 7B of the internal support preferably with a plurality of bolts, such as, but not limited to four screw bolts, though other securement methods can also be used and are considered within the scope of the disclosure. Preferably, sensor 7C can be sealed.

Solenoid 7D can be secured to shaft guide 7A, preferably by screwing solenoid 7D into a hole in the shaft guide 7A, though such securement method is not considered limiting. In a "closed" status position, a rod portion of solenoid 7D preferably locks any back and forth displacement of the shaft guide spring 5C anchored to the main shaft 5A. The pin of solenoid 7D is activated and deactivated electrically/electronically in order to lock and unlock/liberate the back and forth movement of the movable pieces described above.

Joint 7E for the guide base can be provided and placed between the base of shaft guide 7A and its frame, preferably for isolating purposes. Joint 7F for the guide lid 7B can be provided and placed between shaft guide 7A and guide lid 7B. Joint 7G for PCI Sensor 7C can be provided and placed between guide lid 7B and Sensor 7C. All of the joints can be provided for isolating purposes for the parts/components they are associated with.

Bolts 7J, which can be four bolts though not considered limiting, can be provided for fastening or securing the base of shaft guide 7A to lid 7B and can also be used for securing PCI sensor 7C, joint 7G, lid 7B and joint 7F all together. Support bolts can be two bolts, though not considered limiting, that are provided for securing shaft guide 7A, joint 7E and external support 4B together.

Figure 45:
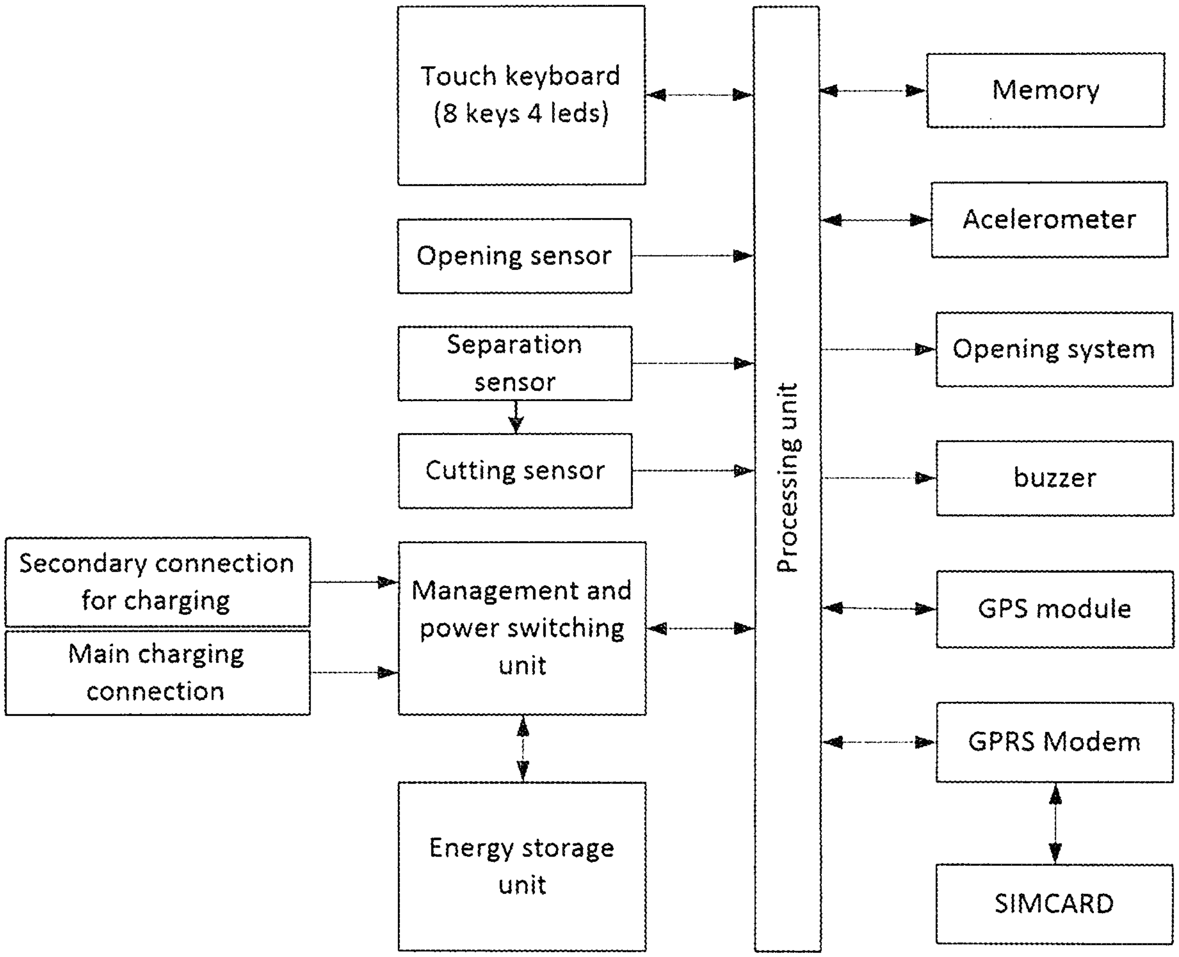
FIG. 45 is a block diagram of the preferred main components for the electronic system for the novel locking device.
Figure 46:
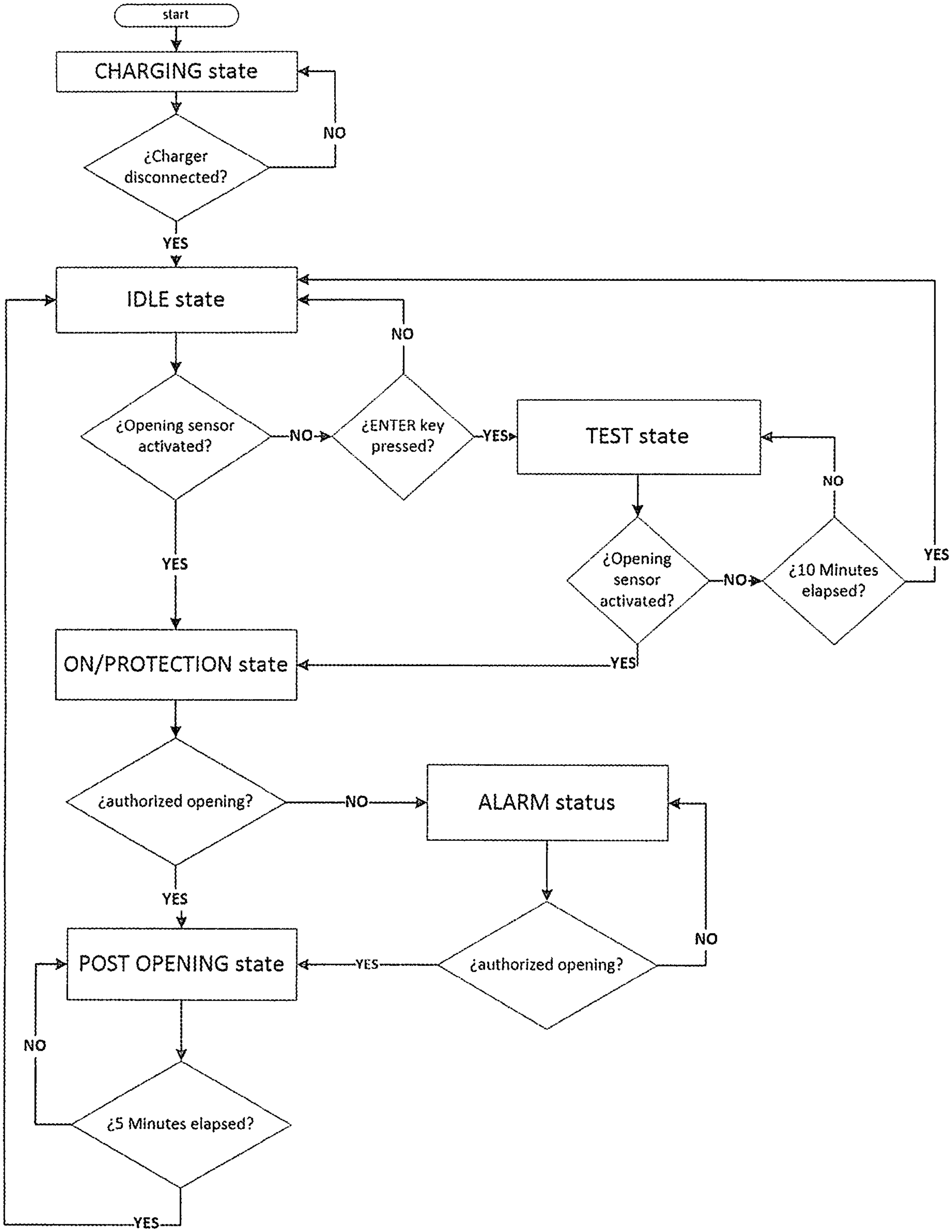
FIG. 46 is a flow diagram for certain alarm/monitoring features preferably performed by the novel locking device in accordance with the present disclosure.
Figure 48A:
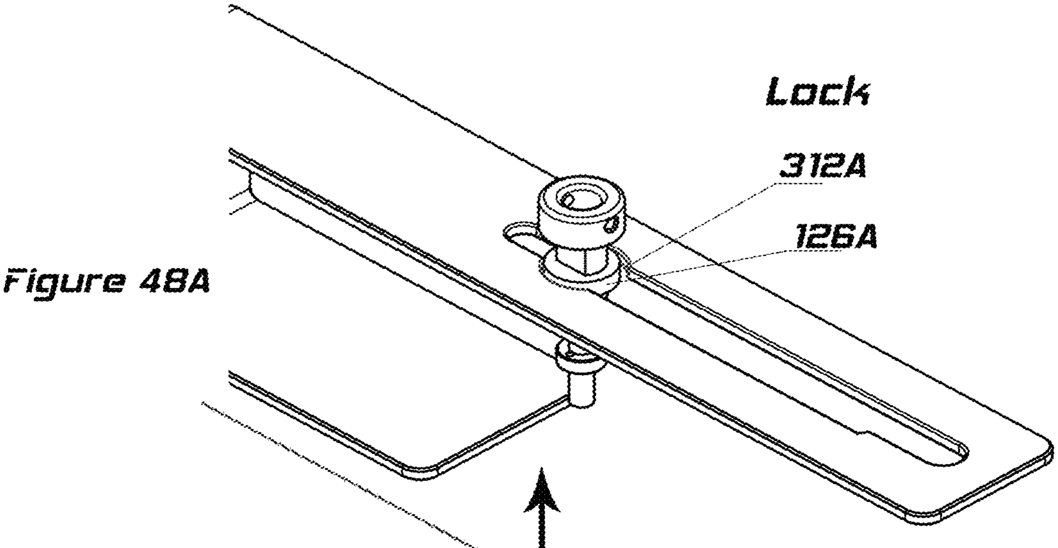
FIG. 48A illustrates the lock and second non-limiting embodiment slot configuration relationship in a "locked" position in accordance with the present disclosure.
Figure 48B:
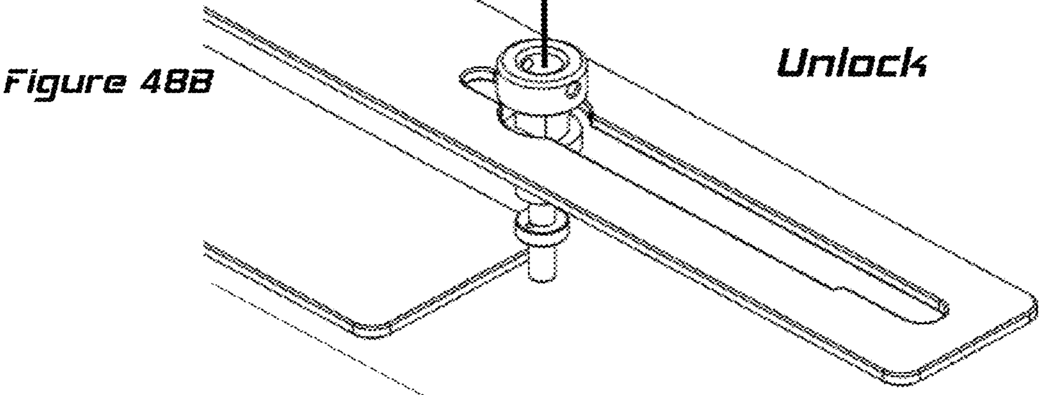
FIG. 48B illustrates the lock and second non-limiting embodiment slot configuration relationship in an "unlocked" position in accordance with the present disclosure.
Figure 48C:
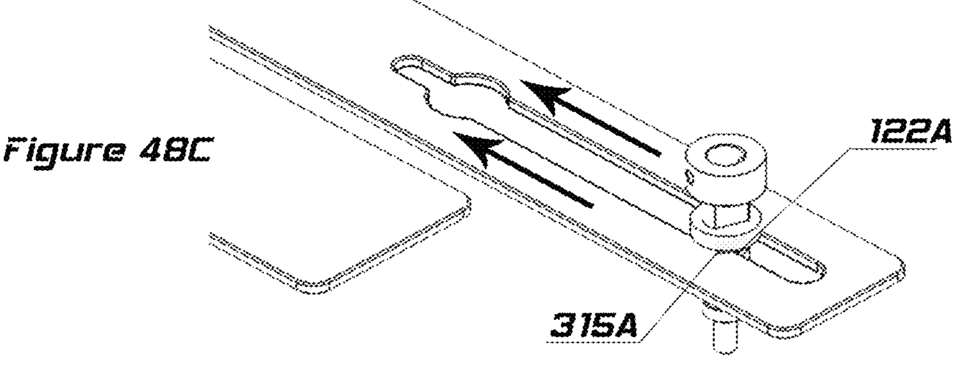
FIG. 48C illustrates the locking bar with the second non-limiting embodiment slot configuration moved to the contact point of the slot in accordance with the present disclosure.
Figure 49:
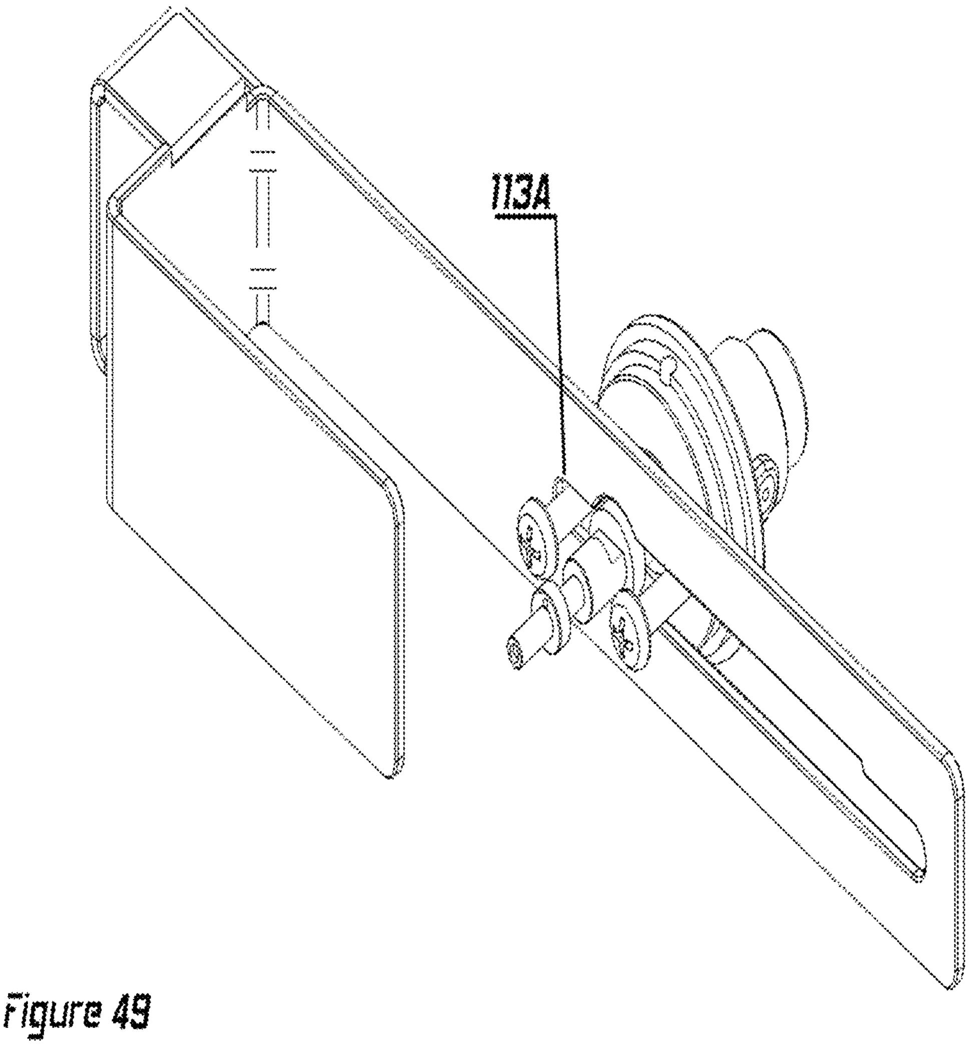
FIG. 49 is a perspective view of the lock and second non-limiting embodiment slot configuration.

Locking device 100 can be provided with an electronic system that can increase the performance or features of locking device 100. The electronic system can preferably be housed within box 400 of main frame 275. As seen in FIG. 45, the preferred main components of the electronic system can be:

- Processing unit:—for managing all the tasks and operating states based on the information received by the different blocks. It can also manage the interface with the user through a touch keyboard, LEDs and/or a buzzer.
- Energy storage unit—in a preferred embodiment can comprise two lithium ion battery packs. Each battery comes into operation depending on the energy needs of the equipment. Other energy sources can be used and are considered within the scope of the disclosure.
- Management and power switching unit—responsible for the charging process of the energy storage unit. This unit can inform the state of charge to the processing unit in all of the operating states of the equipment.
- Cutting, separation and opening sensors: Each one of these sensors indicates their status to the processing unit. Depending on the status or the data sent by one or more of these sensors, the operating conditions of the equipment can be determined. The cutting sensor can indicate if locking device 100 and/or locking bars 50 are being cut at some point of their external structure. The separation sensor detects if the equipment has been separated from the container. The opening sensor is part of the opening system and allows to verify to the processing unit that if the user has activated the equipment.
- Accelerometer—can be an active sensor and provides the processing unit with information corresponding to the levels of vibration to which the locking device 100 is subjected to help determine if locking device 100 is in movement or is subjected to strong shocks or vibrations from an inappropriate or unauthorized opening.
- Memory—memory can be provided to store information that locking device 100 must transmit in areas of absence of cell phone coverage.
- Opening system—controls the activation/deactivation of the solenoid used as part of the opening mechanism for lock 110.
- GPS Module—provides the processing unit with geolocation information. In one non-limiting embodiment every 60 seconds the received information can be processed and transmitted by means of the GPRS modem. Other time intervals can be used and are considered within the scope of the disclosure.
- GPRS Modem—allows interconnection/communication with a cellular network for the transmission of position frames to a defined server. It also allows the reception of the opening command and assignment command.

Touch Keyboard—allows a user to enter a password to execute the process of authorized opening of the equipment. In addition, by preferably using LEDs it is possible to check the connection status and the status of locking device's batteries. Under certain circumstances it is also possible to start a test routine of the equipment to identify the operability of the sensors and the main blocks that comprise it.

The various blocks/modules can be integrated to form the electronic system of locking device 100. A correct integration of these blocks can be achieved by the implementation of physical interconnections resistant to vibration and humidity conditions. The interconnections can also implement by practices used to electromagnetic interference between each block.

Locking device 100 can be provided with several operating states depending on the inputs received from the sensor(s). Each operating state can correspond to a set of conditions in which locking device 100 operates. Non-limiting operating states can include:

a. CHARGING state: in this state the energy storage unit is charged. All other functions of the equipment can be disabled. The completion of the charging process can be visible by a light indicator (preferably included in the charger).

b. IDLE state: In this state the locking device 100 turns off all its main modules and can be waiting for activation based on data or information received from one or more sensor or keyboard manipulation.

c. ON/PROTECTION state: in this state the locking device 100 remains electronically connected to or in electronic communication with a cellular network preferably by means of the GPRS modem. For each defined period of time, one data frame can be transmitted over the internet to a server. Each data frame can contain information corresponding to the geolocation of the locking device 100 and the state of charge of the storage unit, the current password and also the status of the sensors. Preferably, by means of the LEDs and the buzzer a user can be informed of the transition to this state.

d. TEST state: By pressing the ENTER key on the keyboard it is possible to start a test routine for locking device 100. During this state the interconnection/communication with the cellular network can be verified, the state of charge of the energy storage unit and also the operability of the sensors.

e. ALARM state: In this state, an alert pattern can be transmitted every 60 seconds (or other preconfigured longer or shorter time period) over the Internet. This status is entered if an unauthorized opening is made. The unauthorized opening can include, without limitation, events such as the deactivation of some of the sensors or the detection of forced manipulation with the accelerometer.

f. POST OPENING state: in this state, the geolocation and the information corresponding to the sensors can be transmitted for 5 minutes or some other short or longer time period. This state can be used to verify that locking device 100 has been opened rightly.

Preferably, a change to any one of these operating states can depend on the sensors, the manipulation on the keyboard, the elapsed time and the charge connections. The transition events can include, without limitation, are the following:

a. Disconnection of the charger b. Opening sensor activated—this event indicates that lock 110 of locking device 100 has been activated and a protection is required.

c. ENTER key pressed: This event generates a transition to the TEST state. If the user of locking device 100 wishes to execute a test routine, the ENTER key must be pressed for more than 5 seconds (or some other preconfigured short or longer time period) when the equipment is in the off state.

d. Authorized Opening: This event is generated when the sensors (opening sensor and separation sensor) are deactivated due to an authorized opening. The authorized opening is generated by keyboard or remote command. The opening of locking device 100 can be achieved by deactivating electric lock 110. Electric lock 110 can be part of the opening system, Electronic lock 110 can include a solenoid that receives the opening signal and operates accordingly to the opening signal. The process of opening can be done through several ways, which include, without limitation, opening by remote command or opening by typing a password generated by the monitoring center. Opening by remote command can be achieved when the monitoring center generates a command and through the cellular network it is transmitted to locking device 100. Once this command is received and processed, the solenoid is activated releasing the mechanism of electric lock 110. One way for locking device 100 to receive the command is by having locking device connected to/in communication with a cellular network. Keyboard opening can be used in areas where is a lack of cellular coverage or as an alternative or additional method to receiving a remote command. In one non-limiting example for keyboard opening, a monitoring center can send a 5-digit password to the user (or other smaller or greater number of digits), who proceeds to enter it by the keyboard. Once the correct password is entered and validated by the processing unit, electric lock 110 can be released. The password can change with each opening and be linked to a logistics software. Customers can have access to the password anywhere in the world by internet. In both opening procedures, the user can be informed of the release of electric lock 110 by activating LEDs and/or a buzzer.

FIG. 45 provides a flow diagram of the preferred operating states for locking device 100.

FIGS. 47A, 47B, 48A, 48B, 48C, 49, 50A and 50B illustrate locking bar 300 first non-limiting slot configuration described above and a second non-limiting slot configuration for locking bar 300A. The first slot configuration is provided for easier comparison to the second slot configuration. Locking bar 300A in conjunction with electric lock 110A and the other locking bar generally provide for the opening/closing mechanism of the padlock bar for the shipping container. The principles of operation of the locking bar with respect to the padlock bars of the shipping container using the second slot configuration do not change the general principles of operation of the locking bars described above for the first slot configuration. However, the second slot configuration provides for improved performance efficiency as compared to the first slot configuration.

With respect to the overall shipping container securement assembly embodiment shown in FIGS. 47B, 48A, 48B, 48C, 49, 50B, 51B, 52B and 53B, as generally compared to the earlier described embodiment, the following modifications/updates/improvements have been to the slot configuration in J-shape plate/bar 300A, main shaft 111A of lock mechanism/assembly 110A, the mechanism of lock 110A opening and closing sensor has been simplified, and button 4B of lock mechanism 110A.

The internal guide/slot 310A for i-shaped plate 300A is configured differently as compared to internal guide/slot 310 for J-shaped plate 300 in the earlier described non-limiting embodiment. Specifically, hole 312A is provided and has a similar/same function as the earlier embodiment, and allows main shaft 111A of lock 110A to pass through the j-shaped plate 300A, when main shaft 111A slides forwards or backward during the function of opening or closing lock mechanism/assembly 110A. Different from slot/internal guide 310, hole 312A of slot/internal guides 310A is preferably provided with a circular shape for an improved blocking area for i-shaped plate 300A. This allows for locking/blocking J-shaped plate 300A in two points (i.e. top and bottom element 314A), which helps to prevent J-shaped plate 300A from being pulled out towards its open position, when the main shaft locking/blocking disc 126A, which preferably also has a cylindrical shape, is aligned within hole 312A of the J-Shape Plate 300A (See FIG. 48A).

In the earlier described embodiment, the right screw that fixes the housing to the body of the padlock passed through hole 312. In the improved embodiment, hole 312A is preferably circular shape to provide for a better lock/block with the Main Shaft 111A. In view of the preferred circular shape for hole 312A, internal guide/slot 310A can be preferably extended to the left of hole 312A to allow the passage of the screw that, fixes the housing (See FIG. 49).

Contact area 315/315A in J-plate 300/300A provides for an opening angle that affects a cutout in main shaft 111/111A causing shaft 111/111A to rotate upon contact with contact area 315/315A. In the earlier described embodiment, contact area 315 is provided as part of hole 312 in i-plate 300 and also provided the function of preventing J-shaped plate 300 from sliding to its open position by obstructing it when making contact with cylindrical area 126 of main shaft 111 in the closed position.

However, with the embodiment shown in FIG. 50B, the opening contact angle 315A can be moved preferably almost to the end of the travel path for internal guide/slot 310A. This position can preferably serve two purposes. First, as contact area 315A is not part of hole 312A, it does not function to obstruct the movement of J-shape plat 300A towards its open position when element 126A of Main Shaft 111A is inside hole 312A. Accordingly, more care is provided so that opening contact angle 315A is not hit especially with poor handling of the device openings. Secondly, by being displaced preferably almost to the end of the internal guide/slot 310A, the contact area between element 122A of Main Shaft 111A and the upper part of internal guide/slot 310A can be reduced. Thus, when moving towards its opening position, the amount of friction between both parts can be reduced, resulting in reduced wear and tear. Also, by reducing the contact area, improved operation of the device when opening is also provided.

Figure 53A:
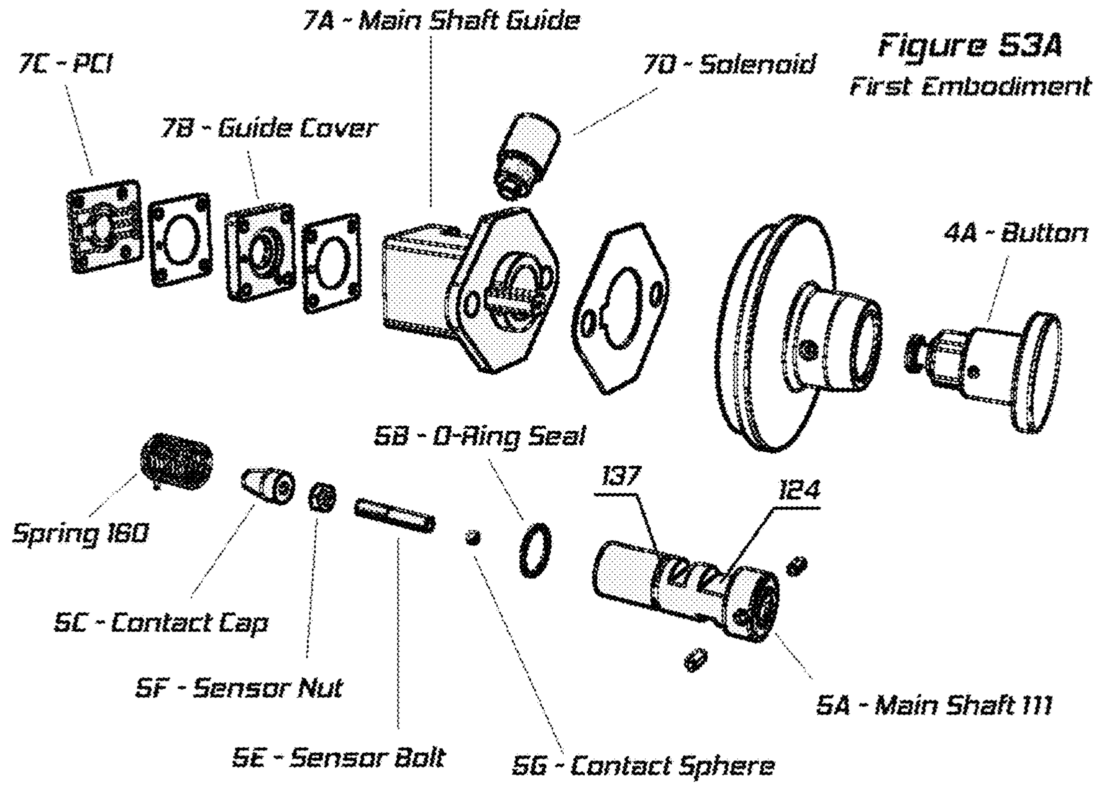
FIG. 53A is an exploded perspective view of the first embodiment for the lock in accordance with the present disclosure.
Figure 53B:
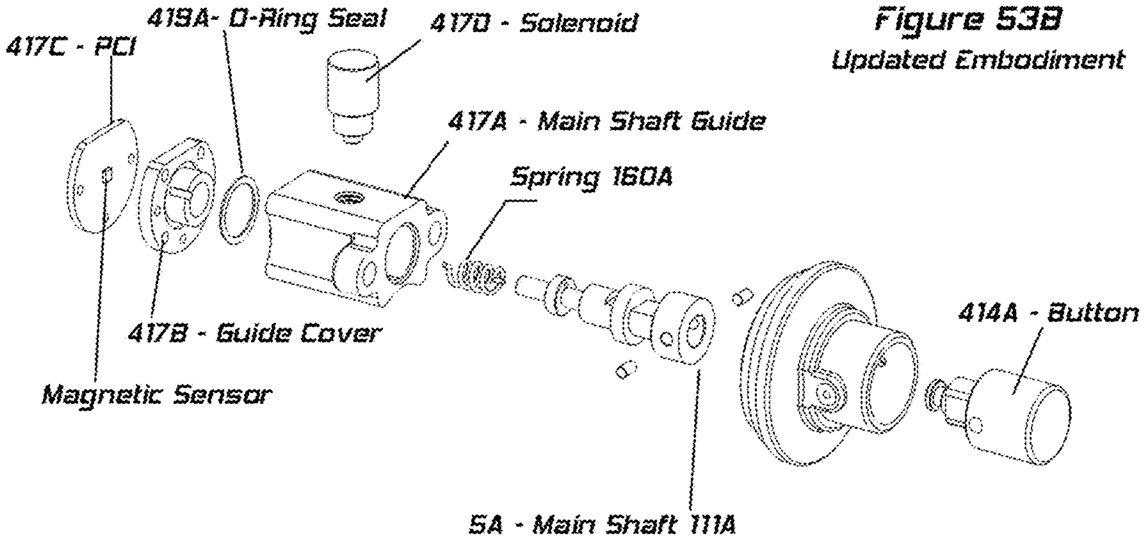
FIG. 53B is an exploded perspective view of a second embodiment for the lock in accordance with the present disclosure.

As seen in FIGS. 51B, 52B and 53B a further embodiment for main shaft 111A and lock 110A is shown and compared to an earlier embodiment for main shaft 111 and lock 110 which is shown in FIGS. 51A, 52A and 53A. In either embodiment, the operating principle for lock 110/110A remain the same. However certain functionality of main shaft 111A/lock 110A as compared to main shaft 111 and lock 110 has been changed/improved.

As seen in FIG. 51A, element 121 of shaft 111 was preferably a cylindrical area 129. As seen in FIG. 51B, element 121A is now provided with cutouts (i.e. milled) to create a preferably rectangular milled hole to create cutout/receiving 129A where the solenoid actuator (i.e. blocking member) enters preventing Main Shaft 111A from moving forward to its opening/open position.

To reduce the cost and improve the manufacturing process for main shaft 111A, disc/element 121A can be preferably the same or similar diameter of Main Shaft 111A, and divides to form a cutout 129A and reduced diameter outer shaft portion 123A. In use outer shaft portion 123A serves as a base and support for spring 160A (FIG. 53B).

As seen in FIG. 52B, on an outer face of disc 121A, preferably that contacts spring 160A, can be provided with a hole/opening 137A, which can be preferably located at a certain angle. Preferably a first or lower leg (i.e. first end) of the spring wire/spring 160A is anchored within hole 137A or otherwise secured to disc 121A. The upper leg or opposite end of the spring wire/spring 160A can be anchored or otherwise secured to Guide Cover 417B (FIG. 53B). The anchoring/securement of the spring ends in this preferred manner, allows for the necessary twist to be performed for rotating main shaft 111A, to allow main shaft 111A to properly function.

Disc 126A is preferably provided with a larger diameter as the diameter of main shaft 111A and/or disc 121A. Preferably, the size of the diameter of disc 126A is smaller or slightly smaller than the diameter of hole 312A of J-shaped plate 300A, such that disc 126A can be positioned within hole 312A during use. Specifically, when lock 110A/main shaft 111A is in its closed position, the cylindrical area of disc 126A can be preferably disposed within the preferably circular shape that forms/creates hole 312A. In this position, lock 110A/main shaft 111A, can be effectively prevented from sliding to the right, towards its open position. Using, hole 312A and disc 126, a better lock can be achieved by increasing the contact surface between both pieces (i.e. upper and lower contact points as compared to just a single upper contact point for the first embodiment—compare FIG. 47A to FIG. 47B) and thus improving the security of the closure.

Outer shaft portion 123A at one end of main shaft 111A provides for a cylinder that extends outward from disc 121A, and provides for a guide and direction for spring 160A. Outer shaft portion 123A is positioned within spring 160A such that it aligns spring 160A to improve the performance of spring 160A. Additionally, at the tip or outer end of outer shaft portion 123A a cavity, preferably cylindrical shaped (though not considered limiting and other shapes can be used and considered within the scope of the disclosure), a cavity 133A can be provided cavity for housing a magnet (See FIG. 52B), that can interact or otherwise communicate with a magnetic sensor (See FIG. 53B) that can be included in the printed circuit board 417C (See FIG. 53B) which can be fixed or otherwise secured to Guide cover 417B by bolts or other conventional fasteners.

The new magnetic sensor preferably interacts/communicates with the magnet placed within cavity 133A of main shaft 111A, simplifies manufacturing and improves reliability over the first embodiment (see FIG. 53A) by eliminating several mechanical parts of the sensor that worked by contact in the first embodiment. Specifically, contact cap 5C, sensor bolt 5E, sensor nut 5F and contact sphere 5G are eliminated in the embodiment shown in FIG. 53B.

Button 414A for lock 110A has also been modified as compared to button 4A for lock 110 (Compare FIGS. 51A, 52A and 53A with FIGS. 51B, 52B and FIG. 53B). As seen in FIG. 51A and FIG. 51B, end disc/flange 171 for button 4A has been eliminated for button 414A. By eliminating disc 171, button 414A provides for an improve grip and also reduce the ability for improper opening of lock 110A (i.e. disc 171 provided for a spot for attempted to pry opening of lock 110).

It should be understood that the exemplary embodiments described herein should be considered in a descriptive sense only and not for purposes of limitation. Descriptions and operation of features, components, parts or aspects within each embodiment should typically be considered as available and applicable to other similar features, components, parts or aspects in other embodiments and are considered incorporated by reference as if fully set forth therein for the description of the other embodiment(s). While one or more embodiments have been described with reference to the figures, it will be understood by those of ordinary skill in the art that various changes in form and details may be made therein without departing from their spirit and scope.

Dimensions of certain parts as shown in the drawings may have been modified and/or exaggerated for the purpose of clarity of illustration and are not considered limiting.

All measurements, amounts, sizes, shapes, configurations, securement or attachment mechanisms, sensing members, communication and electronic communication methods, sealing members, numbers, ranges, frequencies, values, percentages, materials, orientations, methods of manufacture, etc. discussed above or shown in the drawing figures are merely by way of example and are not considered limiting and other measurements, amounts, sizes, shapes, configurations, securement or attachment mechanisms, sensing members, communication and electronic communication methods; sealing members, numbers, ranges, frequencies, values, percentages, materials, orientations, methods of manufacture, etc. can be chosen and used and all are considered within the scope of the invention.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the disclosure has been described in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A locking assembly for use in a locking device, the locking device adapted for securement to a plurality of locking bars located on a container, the locking device having a main frame and a first plate and a second plate, the main frame having a front opening providing access to an interior area within the main frame, the first plate having a first channel and the second plate having a second channel, in a closed position the locking device is secured to the plurality of locking bars, comprising:

a main shaft having a first upper front cutout and a second upper front cutout, the main shaft having a first front end and a second back end, the main shaft having a main diameter and a first disc disposed between the first and second cutouts, the first disc having a diameter that is larger in size than the diameter of the main shaft, the shaft having a second disc with the second disc contributing to defining a receiving area; the main shaft having an outer shaft portion at the second back end, the outer shaft portion extending outward from the second disc, the outer shaft portion having a diameter smaller in size than the main diameter of the main shaft;

a button member disposed on an external side of the main frame adjacent the front opening of the main frame;

a spring disposed along the outer shaft portion and having one end in contact with or second to the second disc; and a movable blocking member having a first end and a second end;

wherein in the closed position the main shaft is inserted through the front opening and is disposed within the interior area of the main frame by pressing the button member causing the spring to compress and the blocking member is moved such that the first end of the blocking member is received within the receiving area of the main shaft and prevents the main shaft front from being pulled out of the interior of the main frame through the front opening;

wherein in the closed position the main shaft prevents the first plate and the second plate from being pulled outward.

2. The locking assembly of claim 1 wherein in the closed position the main shaft is adapted to be secured to the first plate by disposing the first cutout within the first channel of the first plate and the main shaft is adapted to be secured to the second plate by disposing the second cutout within the second channel of the second plate.

3. The locking assembly of claim 2 wherein the relationship of the first channel and the first cutout prevents the first plate from being pulled outwards in the closed position and the relationship of the second channel and the second cutout prevents the second plate from being pulled outwards in the closed position.

4. The locking assembly of claim 3 wherein the first plate is a first J-shaped member having a first U portion at a first end extending into a first elongated arm portion, the first channel disposed within the first elongated arm portion and wherein the second plate is a second J-shaped member having a second U portion at a first end and extending into a second elongated arm portion, the second channel disposed within the second elongated arm portion.

5. The locking assembly of claim 4 wherein the first channel having a first portion having a first width, a second portion having a second width that is larger in size than the first width, a third circular shaped portion extending beyond both sides of the second portion and a fourth portion having a width that is smaller in size than the second width, a diameter of the circular third portion slightly larger than the diameter of the first disc of the main shaft, wherein when the first disc is received within the circular third portion the first disc extends beyond both sides of the second portion of the first channel.

6. The locking assembly of claim 4 wherein an upper edge of the second channel having a serrated or tooth pattern and the second channel having a first portion having a first width and a second portion having a second width, wherein the first width is larger than the second width such that the second channel is wider in size at the first portion.

7. The locking assembly of claim 1 wherein in use of the locking device to secure a plurality of doors associated with the locking bars in a closed position, the main frame and the first plate create a first enclosure to secure the locking device to a first locking bar of the plurality of locking bars and the main frame and the second plate create a second enclosure to secure the locking device to a second locking bar of the plurality of locking bars.

8. The locking assembly of claim 1 further comprising:

an electronic or electrical component having a switch and including a magnetic sensor;

a magnet secured at the outer end of the outer shaft portion;

wherein in the closed position by pressing the button the magnet interacts with the magnetic sensor.

9. The locking assembly of claim 8 wherein the magnetic sensor is provided on a printed circuit board.

10. The locking assembly of claim 1 further comprising a housing member having a central passageway, said housing member secured to an external surface of the main frame such that the central passageway is aligned with the front opening, the housing member providing support for the button member.

11. The locking assembly of claim 1 wherein the button member having a first end that is externally exposed during use and second end and the main shaft having a central opening at the first end of the main shaft, the button member is secured to the main shaft by inserting the second end of the button member within the central opening at the first end of the main shaft.

12. The locking assembly of claim 1 wherein the blocking member is a solenoid having an actuator.

* * * * *